(12) United States Patent
Pompili et al.

(10) Patent No.: US 11,884,145 B2
(45) Date of Patent: *Jan. 30, 2024

(54) STACKING RIGID COVER

(71) Applicant: BOS Automotive Products, Inc., Rochester Hills, MI (US)

(72) Inventors: William P. Pompili, Shelby Township, MI (US); Edwin Joseph Steinmetz, Fair Haven, MI (US)

(73) Assignee: BOS AUTOMOTIVE PRODUCTS, INC., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,756

(22) Filed: May 3, 2022

(65) Prior Publication Data

US 2022/0258580 A1 Aug. 18, 2022

Related U.S. Application Data

(63) Continuation-in-part of application No. 16/936,976, filed on Jul. 23, 2020, now Pat. No. 11,318,826, (Continued)

(51) Int. Cl.
*B60J 7/14* (2006.01)
*B60R 5/04* (2006.01)
(Continued)

(52) U.S. Cl.
CPC ............... *B60J 7/141* (2013.01); *B60J 7/041* (2013.01); *B60J 7/0573* (2013.01); *B60J 7/198* (2013.01); *B60P 7/02* (2013.01); *B60R 5/048* (2013.01)

(58) Field of Classification Search
CPC ....... B60J 7/02; B60J 7/028; B60J 7/04; B60J 7/041; B60J 7/0573; B60J 7/14;
(Continued)

(56) References Cited

U.S. PATENT DOCUMENTS 1,627,716 A 5/1927 Teachout
1,718,183 A 6/1929 Smith
(Continued)

FOREIGN PATENT DOCUMENTS

EP 0427677 A1 5/1991
EP 0834414 A2 4/1998
(Continued)

OTHER PUBLICATIONS

Non-Final Office Action from U.S. Appl. No. 15/013,352, filed Feb. 2, 2016.
(Continued)

*Primary Examiner* — Jason S Daniels
(74) *Attorney, Agent, or Firm* — Carlson, Gaskey & Olds, P.C.

(57) ABSTRACT

A retractable cover system includes laterally spaced apart guide rails that define an opening and each provide a track. The system further includes a cover that has multiple slats that are configured to interlock with one another in a deployed configuration. The slats cooperate with the drive assembly and are slidable in the tracks between first and second positions within the opening in response to actuation of the drive assembly. The slats are stacked onto one another in a stowed configuration. The system further includes a follower that supports the slats. The system further includes a spring-biased pulley system that is configured to cooperate with the follower and biases the slats toward the tracks.

20 Claims, 46 Drawing Sheets

Related U.S. Application Data which is a continuation-in-part of application No. 16/735,310, filed on Jan. 6, 2020, now Pat. No. 11,091,013, and a continuation-in-part of application No. 16/448,981, filed on Jun. 21, 2019, now Pat. No. 11,142,050, said application No. 16/735,310 is a continuation of application No. 16/293,156, filed on Mar. 5, 2019, now Pat. No. 10,525,804, which is a continuation of application No. PCT/US2018/019460, filed on Feb. 23, 2018.

(60) Provisional application No. 62/877,564, filed on Jul. 23, 2019, provisional application No. 62/688,178, filed on Jun. 21, 2018, provisional application No. 62/526,872, filed on Jun. 29, 2017, provisional application No. 62/491,055, filed on Apr. 27, 2017, provisional application No. 62/462,971, filed on Feb. 24, 2017.

(51) Int. Cl.
　　*B60J 7/19* (2006.01)
　　*B60P 7/02* (2006.01)
　　*B60J 7/04* (2006.01)
　　*B60J 7/057* (2006.01)

(58) Field of Classification Search
CPC ... B60J 7/141; B60J 7/198; B60P 7/02; B60R 5/048
USPC ............ 296/100.02, 100.03, 100.05, 100.06, 296/100.09
See application file for complete search history.

(56) References Cited

U.S. PATENT DOCUMENTS

| | | | |
|---|---|---|---|
| 1,969,595 A | 8/1934 | D'Ornellas | |
| 3,488,087 A | 1/1970 | Cox | |
| 4,210,361 A | 7/1980 | Marvin et al. | |
| 4,518,194 A | 5/1985 | Kirkham et al. | |
| 4,563,034 A | 1/1986 | Lamb | |
| 4,611,848 A | 9/1986 | Romano | |
| 4,634,172 A | 1/1987 | Duda | |
| 4,786,099 A | 11/1988 | Mount | |
| 4,792,178 A | 12/1988 | Kokx | |
| 4,889,381 A | 12/1989 | Tamblyn et al. | |
| 4,923,240 A | 5/1990 | Swanson | |
| 5,040,843 A | 8/1991 | Russell et al. | |
| 5,096,250 A | 5/1992 | Menz | |
| 5,121,960 A | 6/1992 | Wheatley | |
| 5,301,995 A | 4/1994 | Isler | |
| 5,330,246 A | 7/1994 | Bernardo | |
| 5,375,900 A | 12/1994 | Tessenyi et al. | |
| 5,758,921 A | 6/1998 | Hall | |
| 5,909,921 A | 6/1999 | Nesbeth | |
| 6,000,740 A | 12/1999 | Hall et al. | |
| 6,030,021 A | 2/2000 | Ronai | |
| 6,053,556 A | 4/2000 | Webb | |
| 6,126,226 A | 10/2000 | Wheatley | |
| 6,217,102 B1 | 4/2001 | Lathers | |
| 6,224,138 B1 | 5/2001 | Adsit et al. | |
| 6,234,561 B1 | 5/2001 | Huotari | |
| 6,276,735 B1 | 8/2001 | Champion | |
| 6,309,005 B1 | 10/2001 | Priest et al. | |
| 6,315,346 B1 | 11/2001 | Martin | |
| 6,322,129 B2 | 11/2001 | Huotari | |
| 6,416,103 B1 | 7/2002 | Audenbach et al. | |
| 6,527,331 B2 | 3/2003 | Searfoss | |
| 6,568,739 B1 | 5/2003 | Burch | |
| 6,582,007 B2 | 6/2003 | Gothier et al. | |
| 6,623,062 B1 | 9/2003 | Hoffman | |
| 6,719,353 B1 | 4/2004 | Isler et al. | |
| 6,830,281 B2 | 12/2004 | Hoffman | |
| 6,846,032 B2 | 1/2005 | de Gaillard et al. | |
| 6,893,072 B1 | 5/2005 | Graves | |
| 6,929,303 B1 | 8/2005 | Sharples | |
| 6,948,760 B2 | 9/2005 | Marx et al. | |
| 7,275,779 B2 | 10/2007 | Tebron | |
| 7,384,090 B1 | 6/2008 | Weldy | |
| 7,445,264 B2 | 11/2008 | Spencer et al. | |
| 7,513,562 B2 | 4/2009 | Hardy et al. | |
| 7,530,614 B2 | 5/2009 | Nichols | |
| 7,568,752 B1 | 8/2009 | Lin | |
| 7,815,239 B1 | 10/2010 | Schmeichel et al. | |
| 7,946,643 B2 | 5/2011 | Getschel et al. | |
| 8,100,615 B1 | 1/2012 | Freeborn | |
| 8,186,739 B2 | 5/2012 | Bruestle et al. | |
| 8,308,218 B2 | 11/2012 | Kneifl et al. | |
| 8,424,951 B1 | 4/2013 | Martin | |
| 8,523,266 B2 | 9/2013 | Yue | |
| 8,657,358 B2 | 2/2014 | Garska | |
| 8,672,388 B2 | 3/2014 | Rusher et al. | |
| 8,702,151 B2 | 4/2014 | Mayfield et al. | |
| 8,746,321 B2 | 6/2014 | Miller | |
| 8,777,293 B2 | 7/2014 | Garska | |
| 8,807,624 B2 | 8/2014 | Garska | |
| 8,807,625 B2 | 8/2014 | Garska | |
| 8,939,494 B2 | 1/2015 | Maimin et al. | |
| 9,004,571 B1 | 4/2015 | Bernardo et al. | |
| 9,266,416 B1 | 2/2016 | Nania | |
| 10,603,993 B2 * | 3/2020 | Ford | B60J 7/20 |
| 11,142,050 B2 * | 10/2021 | Pompili | B60J 7/198 |
| 2004/0212212 A1 | 10/2004 | Spencer et al. | |
| 2005/0205221 A1 | 9/2005 | Miller | |
| 2007/0056696 A1 | 3/2007 | Lin | |
| 2007/0175603 A1 | 8/2007 | Lin | |
| 2008/0006373 A1 | 1/2008 | Lin | |
| 2008/0211266 A1 | 9/2008 | Bergmiller et al. | |
| 2008/0289776 A1 | 11/2008 | Starzmann et al. | |
| 2010/0148540 A1 | 6/2010 | Hotta et al. | |
| 2011/0232851 A1 | 9/2011 | Uehara et al. | |
| 2012/0048489 A1 | 3/2012 | Oh et al. | |
| 2012/0049568 A1 | 3/2012 | Wolf et al. | |
| 2012/0255690 A1 | 10/2012 | Zeo et al. | |
| 2012/0274093 A1 | 11/2012 | Yue | |
| 2013/0204461 A1 | 8/2013 | Kartes | |
| 2013/0341954 A1 | 12/2013 | Maimin et al. | |
| 2013/0341955 A1 | 12/2013 | Garska | |
| 2013/0341956 A1 | 12/2013 | Garska | |
| 2013/0341957 A1 | 12/2013 | Garska | |
| 2013/0341958 A1 | 12/2013 | Mayfield et al. | |
| 2013/0341959 A1 | 12/2013 | Garska | |
| 2013/0341960 A1 | 12/2013 | Garska | |
| 2014/0252794 A1 | 9/2014 | Aho et al. | |
| 2016/0236549 A1 | 8/2016 | Stewart et al. | |
| 2016/0236552 A1 | 8/2016 | Hannan et al. | |
| 2016/0236554 A1 | 8/2016 | Stewart et al. | |
| 2016/0280123 A1 | 9/2016 | Rohr et al. | |

FOREIGN PATENT DOCUMENTS

| | | |
|---|---|---|
| EP | 2221429 A2 | 8/2010 |
| FR | 2527465 A1 | 12/1983 |
| FR | 2604203 A2 | 3/1988 |
| JP | 2011051528 | 3/2011 |
| WO | 2007082091 | 7/2007 |

OTHER PUBLICATIONS

Non-Final Office Action from U.S. Appl. No. 15/013,363, filed Feb. 2, 2016.

Non-Final Office Action from U.S. Appl. No. 15/013,369, filed Feb. 2, 2016.

Final Office Action from U.S. Appl. No. 15/013,369, filed Feb. 2, 2016.

Non-Final Office Action from U.S. Appl. No. 15/042,374, filed Feb. 12, 2016.

Non-Final Office Action from U.S. Appl. No. 15/042,358, filed Feb. 12, 2016.

Non-Final Office Action from U.S. Appl. No. 15/042,383, filed Feb. 12, 2016.

(56) References Cited

OTHER PUBLICATIONS

Notice of Allowance from U.S. Appl. No. 15/042,383, filed Feb. 12, 2016.
Notice of Allowance from U.S. Appl. No. 15/042,358, filed Feb. 12, 2016.
Notice of Allowance from U.S. Appl. No. 15/042,374, filed Feb. 12, 2016.
International Search Report and Written Opinion for International Application No. PCT/US18/19460 dated Jul. 3, 2018.
International Preliminary Report on Patentability for International Application No. PCT/US2018/019460 dated Sep. 6, 2019.

* cited by examiner

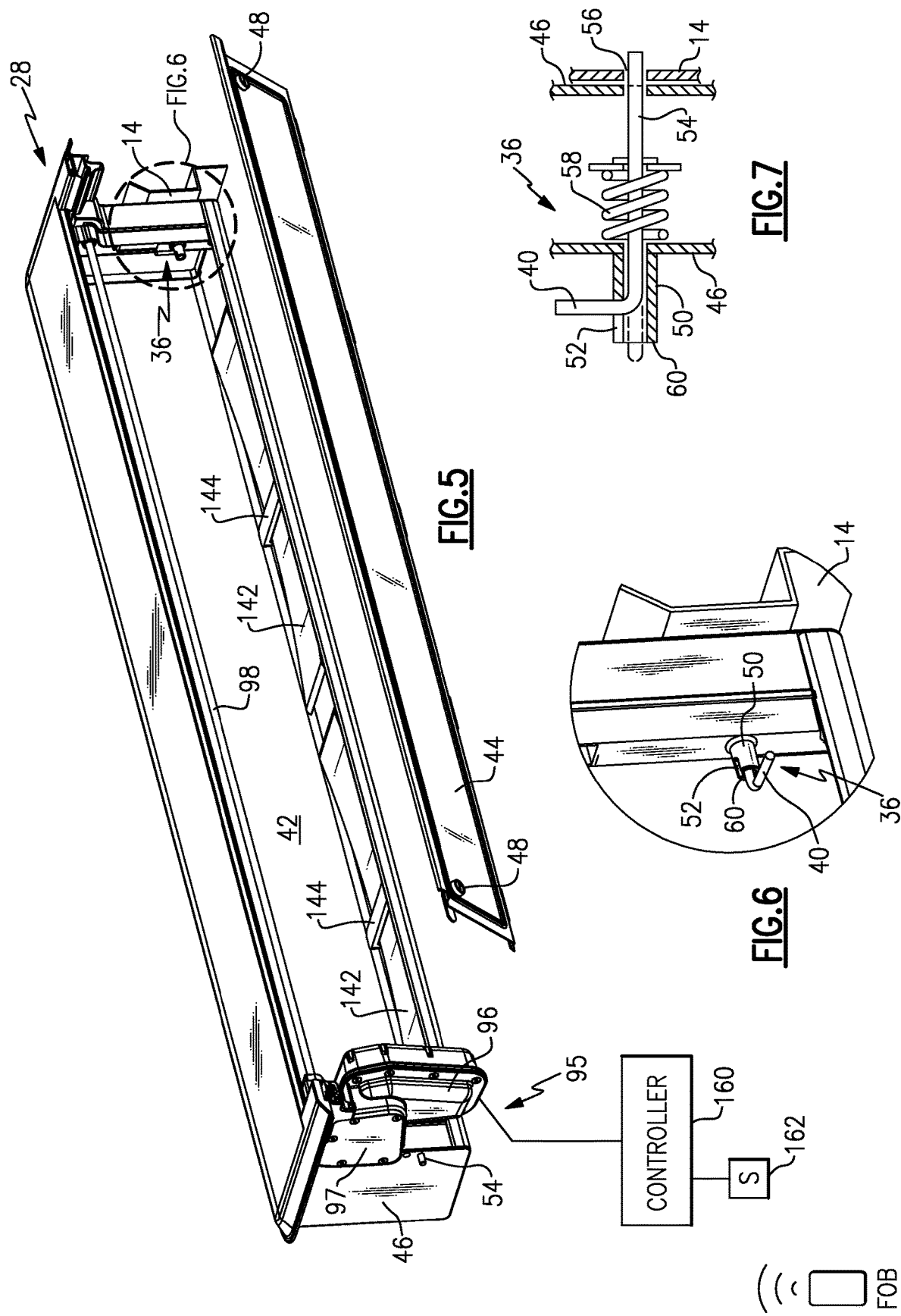

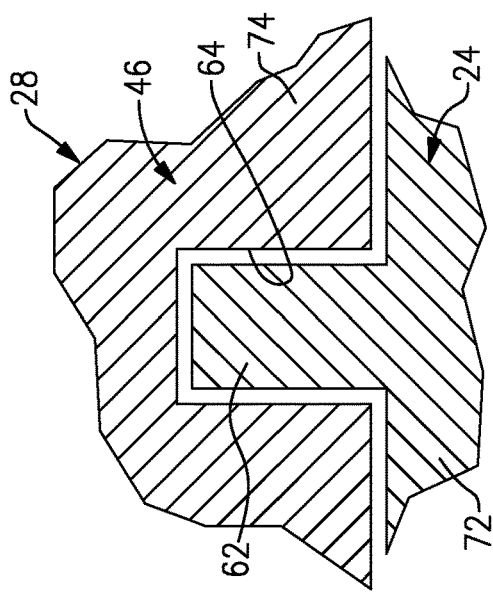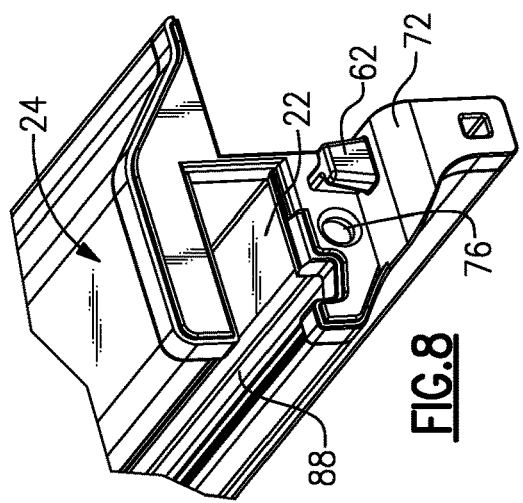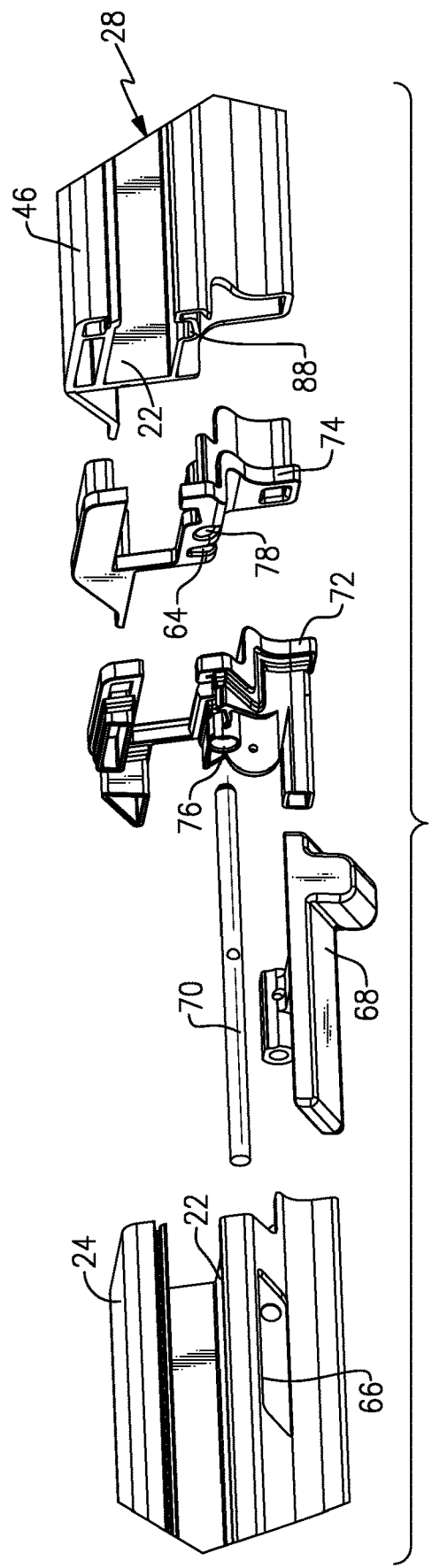

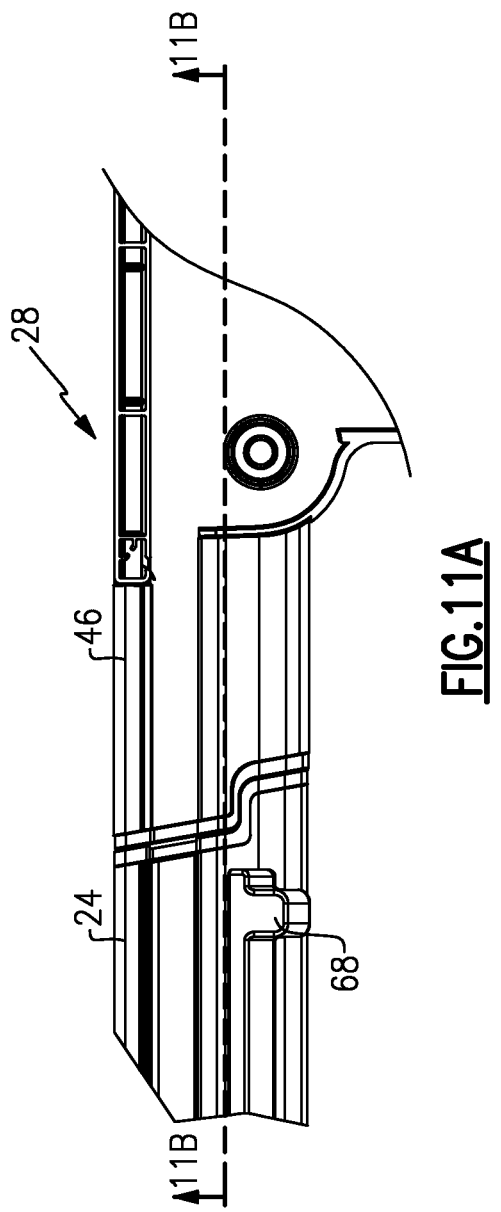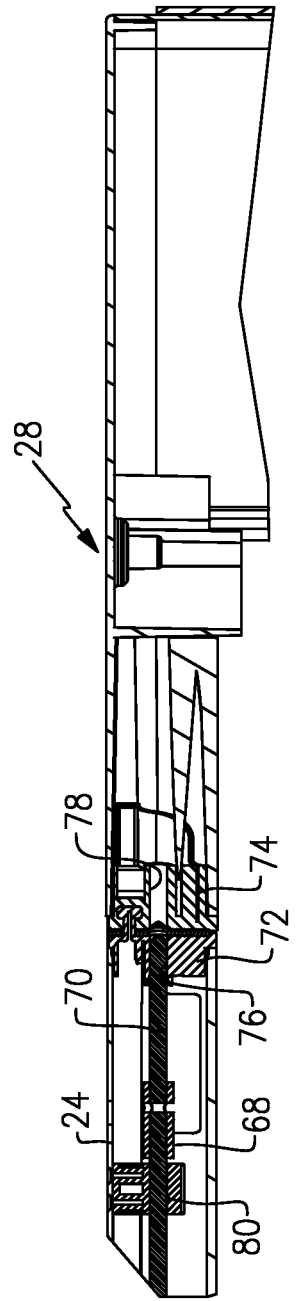

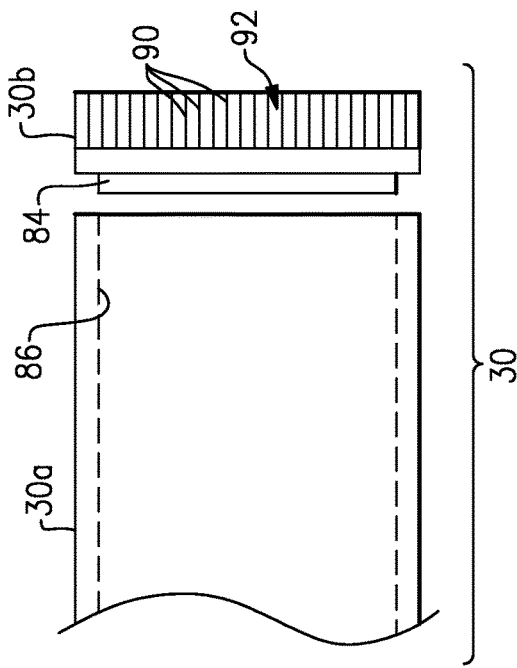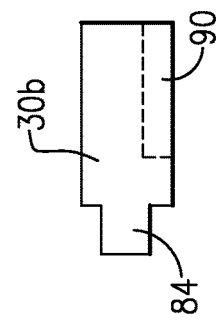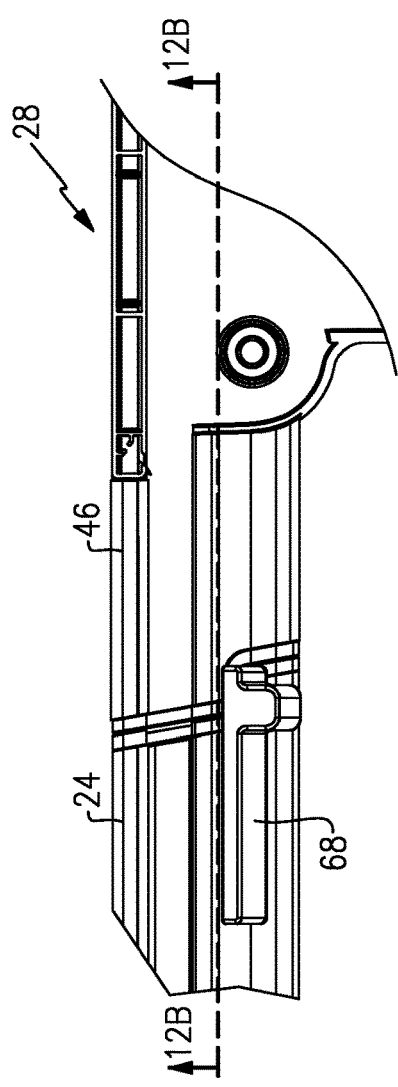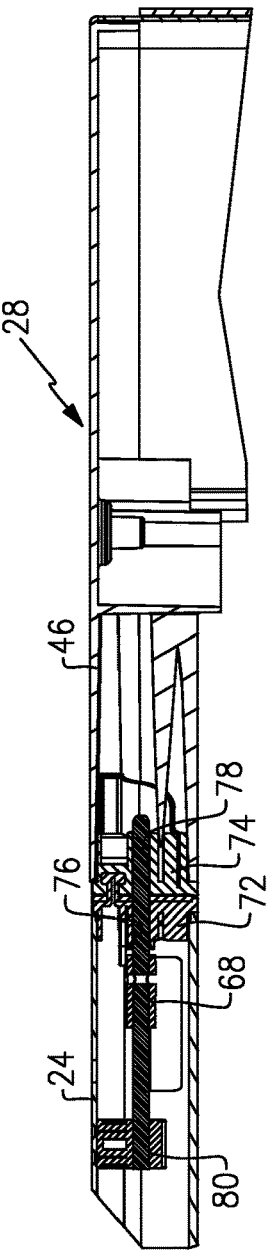
FIG.13A
FIG.13B
FIG.12A
FIG.12B

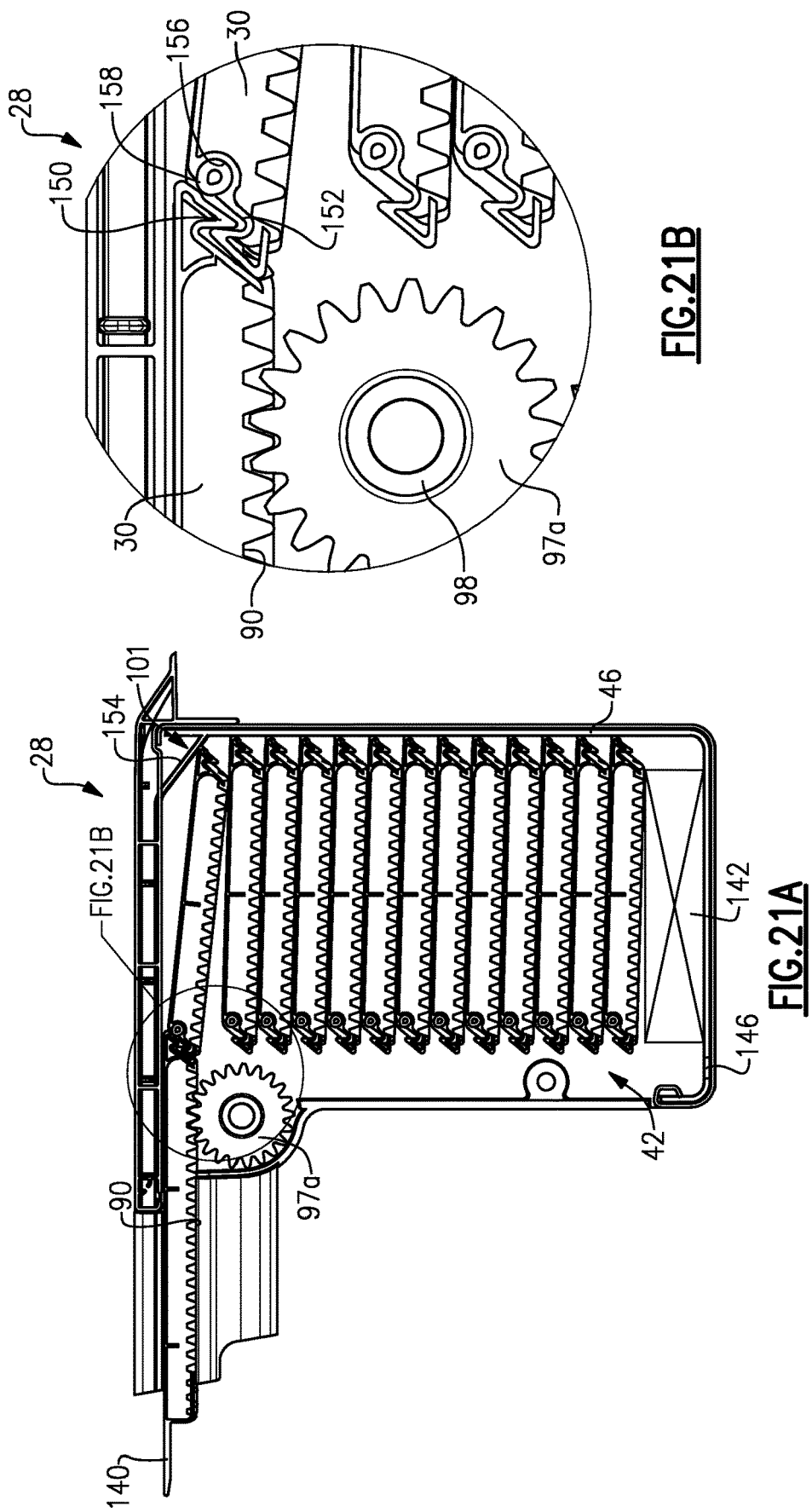

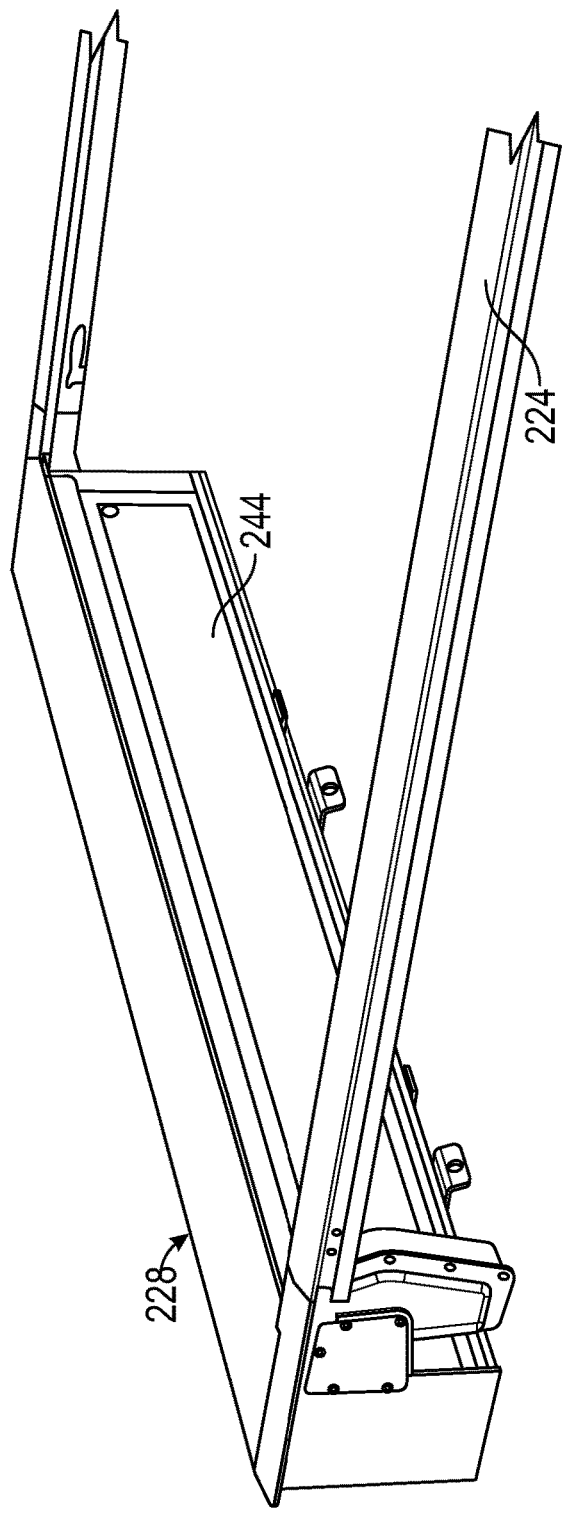
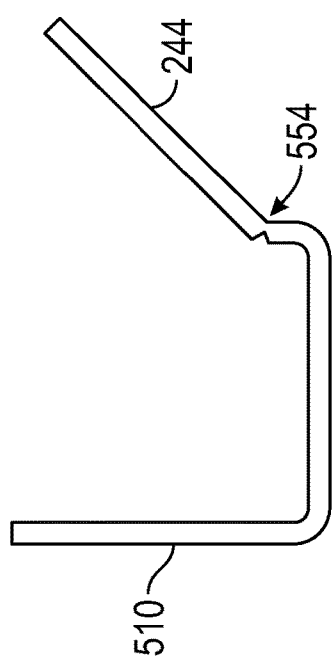
FIG. 29A
FIG. 29B

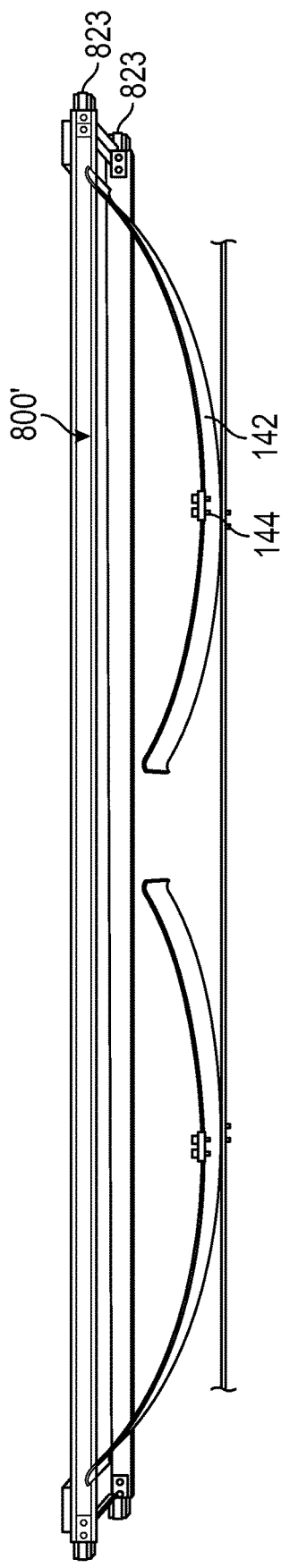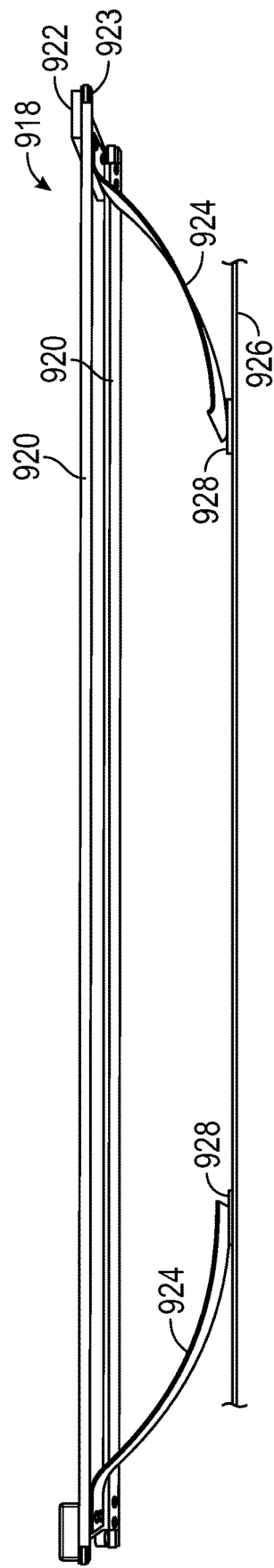

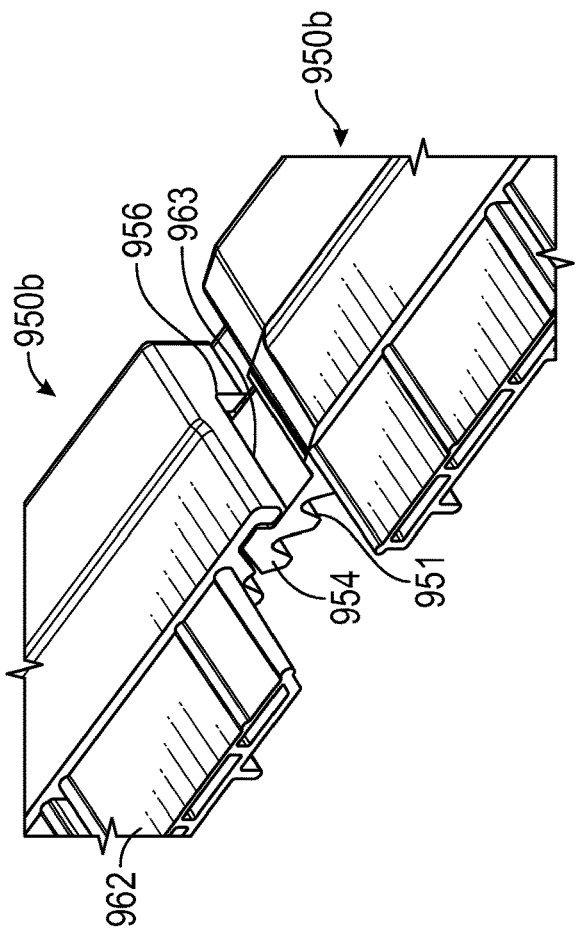
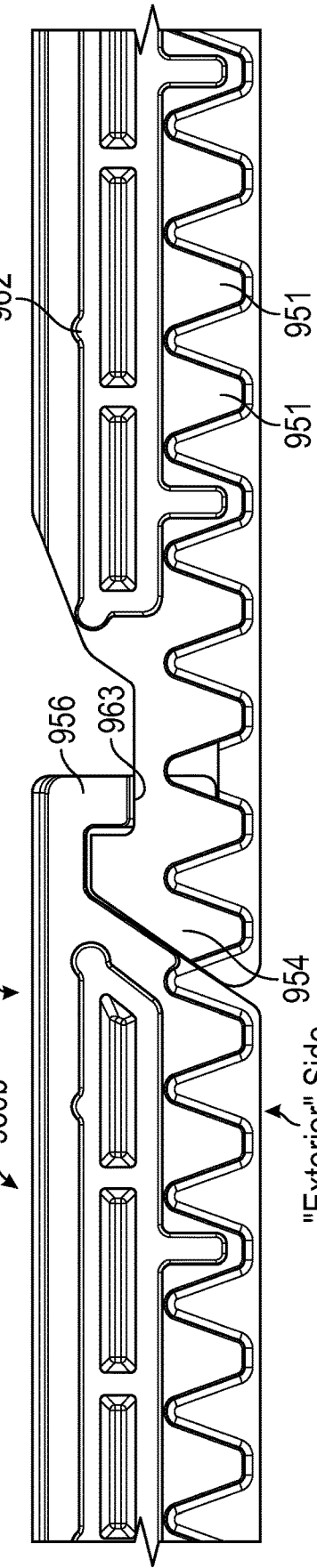
FIG. 40A
FIG. 40B

STACKING RIGID COVER

CROSS-REFERENCE TO RELATED APPLICATIONS

This application is a Continuation-in-part of U.S. patent application Ser. No. 16/936,976 filed on Jul. 23, 2020, which claims priority to U.S. Provisional Application No. 62/877,564 filed on Jul. 23, 2019 and is a continuation in-part of U.S. patent application Ser. No. 16/735,310 filed on Jan. 6, 2020 which has now issued as U.S. Pat. No. 11,091,013 issued on Aug. 17, 2021, which is a continuation of U.S. patent application Ser. No. 16/293,156 filed on Mar. 5, 2019 which has now issued as U.S. Pat. No. 10,525,804 issued on Jan. 7, 2020, which is a continuation of International Application No. PCT/US18/19460 filed on Feb. 23, 2018, which claims priority to U.S. Provisional Application No. 62/462,971 filed on Feb. 24, 2017, U.S. Provisional Application No. 62/491,055 filed on Apr. 27, 2017, and U.S. Provisional Application No. 62/526,872, filed on Jun. 29, 2017. U.S. patent application Ser. No. 16/936,976 filed on Jul. 23, 2020 is also a continuation in-part of U.S. patent application Ser. No. 16/448,981 filed Jun. 21, 2019 which has now issued as U.S. Pat. No. 11,142,050 issued on Oct. 12, 2021, which claims priority to U.S. Provisional Application No. 62/688,178 filed Jun. 21, 2018, and all are incorporated herein by reference.

BACKGROUND

This disclosure relates to cover systems used, for example, as a tonneau cover of a pickup truck bed. The cover system may also be used, for example, as a roof, sunshade, load floor, or load space cover for vehicle applications, or for non-vehicle applications as well.

Tonneau covers are frequently used to enclose a pickup truck bed. Soft tonneau covers provide the advantage over hard covers of being able to be stowed in a relative small space when the cover is not in use. However, soft tonneau covers do not provide security when closed as the soft cover can be cut to gain access to the truck bed. Prior art hard covers have been heavy and bulky, occupying a significant portion of the truck bed. Moreover, solely manual hard covers are not a desirable truck bed option for many customers. What is needed is a motorized rigid tonneau cover that provides security, is compact, weather resistant and sufficiently robust to withstand common load conditions.

SUMMARY

In one exemplary embodiment, a retractable cover system includes laterally spaced apart guide rails that define an opening and each provide a track. The system further includes a cover that has multiple slats that are configured to interlock with one another in a deployed configuration. The slats cooperate with the drive assembly and are slidable in the tracks between first and second positions within the opening in response to actuation of the drive assembly. The slats are stacked onto one another in a stowed configuration. The system further includes a follower that supports the slats. The system further includes a spring-biased pulley system that is configured to cooperate with the follower and biases the slats toward the tracks.

In a further embodiment of any of the above, the retractable cover system includes a leaf spring that is arranged beneath the follower and is configured to assist the pulley system in biasing the slats toward the tracks.

In a further embodiment of any of the above, the retractable cover system includes a shaft that extends laterally along a rotational axis. The shaft includes a gear that is arranged at its opposing ends. Each slat includes an end with teeth that cooperate with the gear.

In a further embodiment of any of the above, the retractable cover system includes a motor that is operatively coupled to the shaft. The motor is configured to rotationally drive the shaft about the rotational axis to move the slats between the deployed and stowed configurations.

In a further embodiment of any of the above, the pulley system includes a cable that is configured to wrap and unwrap about the rotational axis during operation of the retractable cover system.

In a further embodiment of any of the above, the pulley system includes a pulley that is coaxial with the shaft. The pulley system includes a cable that cooperates with the pulley and is configured to rotate the pulley about the rotational axis during operation of the retractable cover system.

In a further embodiment of any of the above, the pulley system includes a cable with a spring tensioner.

In a further embodiment of any of the above, the spring tensioner is a torsion spring that is arranged at one end of the cable.

In a further embodiment of any of the above, the multiple slats includes first and second slats. The first slat is above and adjacent to the second slat in the stowed configuration, is in a horizontally overlapping orientation with the second slat in a first position, and is in a horizontally planar and interlocked orientation with the second slat in a second position. The spring tensioner is configured to decrease a cable tension in the cable when the first and second slats transition from the first position to the second position and increase the cable tension when the first and second slats transition from the second position to the first position.

In a further embodiment of any of the above, the follower includes first and second sides. The pulley system includes a pair of spaced apart cables. Each cable extends between the first and second sides to support the follower.

In a further embodiment of any of the above, the retractable cover system includes first and second pulleys that are respectively arranged at the first and second sides at each of the lateral ends of the follower.

In a further embodiment of any of the above, the follower includes first and second sides. The pulley system includes first and second cables that are respectively arranged at the first and second sides at each of the lateral ends of the follower. The first and second cables are wound and unwound in response to operation of the retractable cover system.

In a further embodiment of any of the above, the pulley system includes an idler pulley that is operatively mounted to a magazine that houses the slats in the stowed configuration. The idler pulley is spaced from the follower, and a cable cooperates with the idler pulley and extends to the follower.

In a further embodiment of any of the above, the pulley system includes an idler pulley that is mounted to the follower, and a cable cooperates with the idler pulley.

In a further embodiment of any of the above, all of the outer surfaces face one direction, and all of the inner surface face another direction opposite the one direction.

A method of operating a retractable cover system, the method includes providing a cover system that includes laterally spaced apart guide rails that define an opening and each provide a track. The cover system further includes a cover that has multiple slats that are configured to interlock with one another in a deployed configuration. The slats cooperate with the drive assembly and are slidable in the tracks between first and second positions within the opening in response to actuation of the drive assembly. The slats are stacked onto one another in a stowed configuration. All of the outer surfaces face one direction, and all of the inner surface face another direction opposite the one direction. The multiple slats includes first and second slats. The first slat is above and adjacent to the second slat in the stowed configuration. The first slat is in horizontally overlapping orientation with the second slat in a first position, and the first slat is in a horizontally planar and interlocked orientation with the second slat in a second position. The cover system further includes a follower that supports the slats. The cover system further includes a spring-biased pulley system that has a cable that is configured to cooperate with the follower and bias the slats toward the tracks. The method further includes deploying the slats and decreasing a cable tension in the cable when the first and second slats transition from the first position to the second position. The method further includes stowing the slats increasing the cable tension when the first and second slats transition from the second position to the first position.

In a further embodiment of any of the above, the method includes a step of biasing the follower upward toward the tracks with a leaf spring.

In a further embodiment of any of the above, the pulley system includes a torsion spring that provides the cable tension.

In a further embodiment of any of the above, the method includes a step of energizing an electric motor to rotationally drive a shaft. The deploying and stowing steps are performed in response to the energizing step.

In a further embodiment of any of the above, the method includes the step of deploying the slats and increasing the cable tension prior to the first and second slats transitioning from the first position to the second position.

BRIEF DESCRIPTION OF THE DRAWINGS

The disclosure can be further understood by reference to the following detailed description when considered in connection with the accompanying drawings wherein:

FIG. 5 shows the magazine with an access cover displaced and slats removed for clarity.

FIG. 6 is an enlarged view of the first locking mechanism in a released position.

FIG. 7 is a cross-sectional view of the first locking mechanism in a locked position.

FIG. 8 is a perspective end view of a guide rail having a magazine locator.

FIG. 9 is a cross-sectional view of the magazine seated on the magazine locator.

FIG. 10 is an exploded view of a second locking mechanism.

FIGS. 11A and 11B are perspective and cross-sectional views of the second locking mechanism in a released position.

FIGS. 12A and 12B are perspective and cross-sectional views of the second locking mechanism in a locked position.

FIG. 13A is a partially broken, exploded bottom view of a slat.

FIG. 13B is an end view of a slat end.

FIGS. 21A and 21B are cross-sectional and enlarged cross-sectional views of a second slat being decoupled from the first slat during stowage.

FIG. 29A illustrates another example magazine with an integrated access cover.

FIG. 29B illustrates the access cover partially opened and pivoting about a living hinge.

FIG. 35 illustrates a spring arrangement similar to the one illustrated in FIG. 5.

FIG. 36A depicts another example spring arrangement for magazine.

FIGS. 40A and 40B illustrate example end caps shown in FIG. 39A with the slat body removed for clarity.

DETAILED DESCRIPTION

This disclosure relates to a rigid cover system for use in a variety of applications. In one example, the cover system may be used as a tonneau cover to selectively provide access to a vehicle truck bed in both automated and manual modes of operation.

Figure 1:
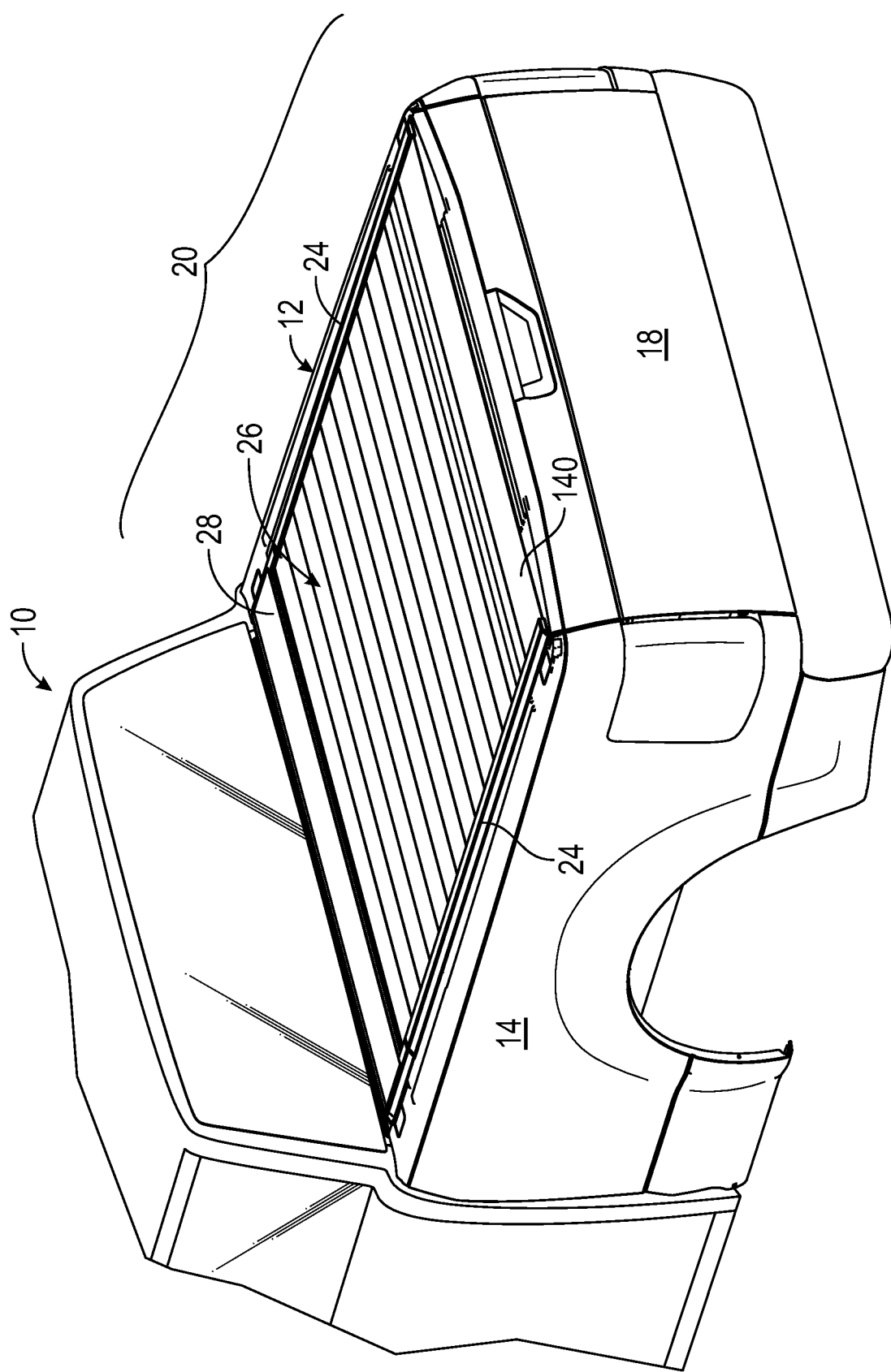
FIG. 1 illustrates a pickup truck with an example cover system having a rigid cover with multiple slats in a closed position with respect to a truck bed.
Figure 2:
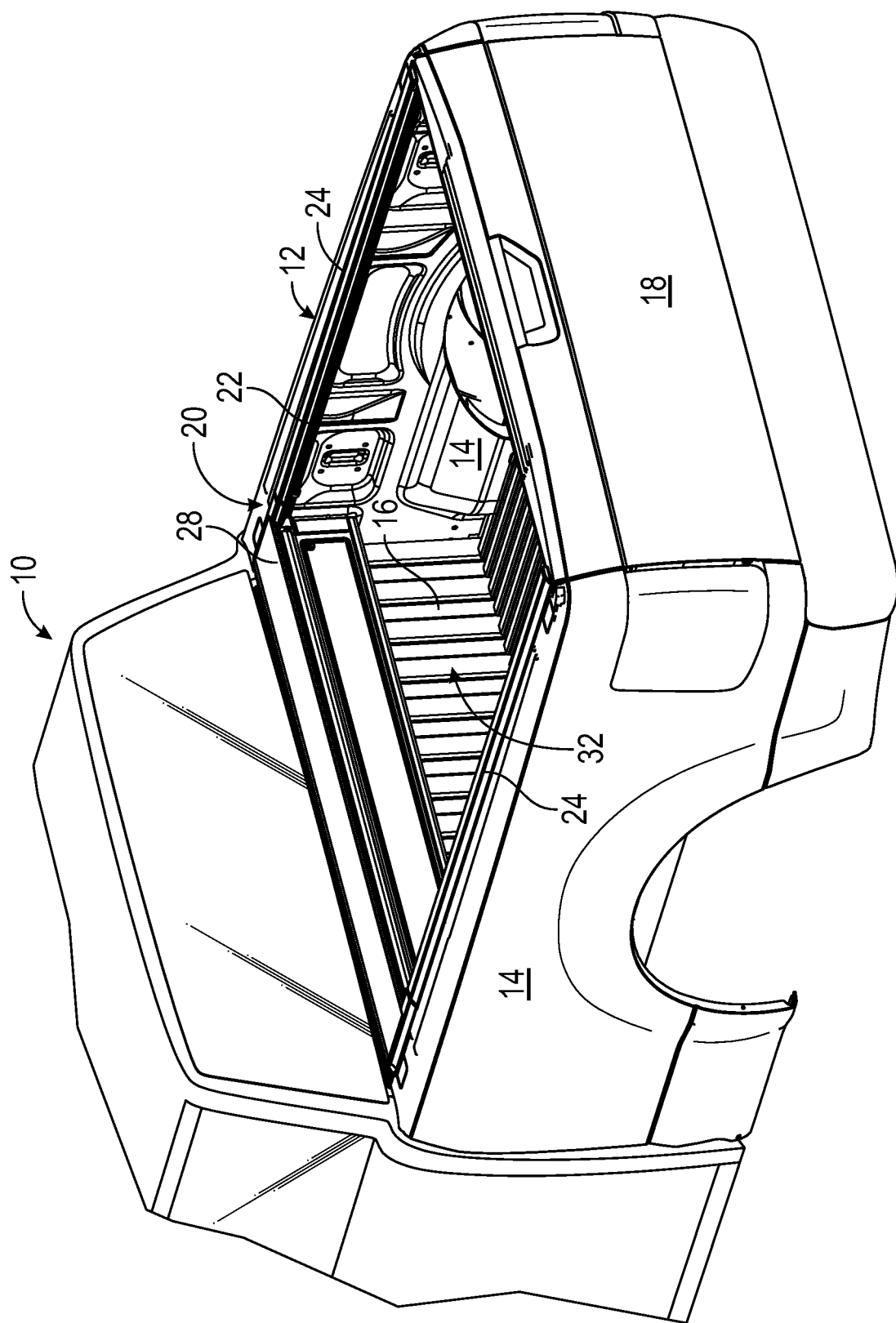
FIG. 2 depicts the cover of the cover system in an open position.
Figure 3:
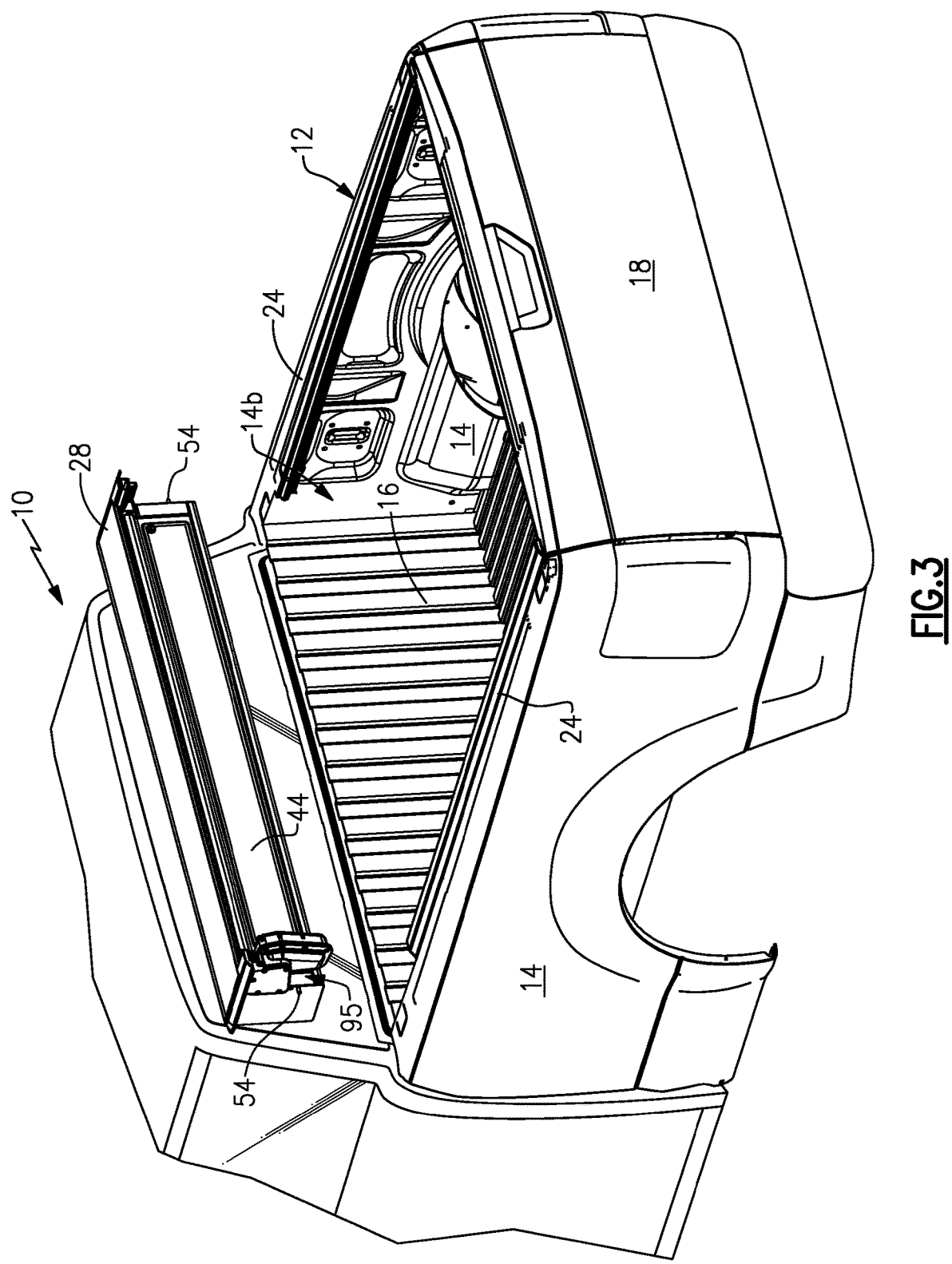
FIG. 3 illustrates removal of a cover system magazine from the truck bed.

A vehicle 10 is schematically illustrated in FIGS. 1-3. The vehicle 10 includes a truck bed 12 having lateral sides 14 and a front wall 16. A tailgate 18 is typically pivotally attached to a rear of the truck bed 12. A cover system 20 is mounted to the top of the truck bed 12 and has a rigid cover 26 that is moveable between a closed position (FIG. 1) and an open position (FIG. 2), including partially open positions in between. If desired, the cover system 20 can be moved between an infinite number of positions between the closed and open positions.

The cover system 20 includes a frame about the truck bed opening provided by laterally spaced apart guide rails 24, which may be provided by, for example, aluminum extrusions of various possible shapes. The guide rails 24 define a path alone which the cover 26 moves and are secured to the lateral sides 14 of the truck bed 12. The cover 26, or hard tonneau cover, which may be constructed from multiple interlocking slats 30, is supported by and can slide along tracks 22 within the guide rails 24. A drive assembly 95 slides the slats 30 between the open and closed positions along a path provided by the tracks 22 in an automated mode of operation. The slats 30 interlock with one another as the cover 26 is deployed over the truck bed. The slats 30 are decoupled from one another and stored within a magazine 28 when the cover 26 is retracted.

A magazine 28 is mounted near the front wall 16 and houses the slats 30 in a stacked relationship when the cover 26 is not fully deployed. The magazine 28 is spaced from the truck bed floor, which provides a space 32 that can accommodate cargo when the magazine 28 is installed in the truck bed 12. The magazine 28 is easily removable from the truck bed 12 to increase storage space. For simplicity, the cover system 20 is designed so that the guide rails 24 may remain secured to the truck bed 12 when the magazine 28 is removed. A first locking mechanism 36 (FIGS. 4-7) and a second locking mechanism 38 (FIGS. 10-12B) are used to secure and release the magazine 28 to and from the truck bed 12.

In the example shown in FIGS. 4-7, the magazine 28 is secured to a portion of the lateral sides 14 (one side shown). A handle 40 of the first locking mechanism 36 is accessible from the interior cavity 42 of the magazine 28 with an access panel 44 removed. The access panel 44 is secured to a housing 46 of the magazine 28 by locks 48. The access panel 44 may be removed from the magazine 28 so that the slats 30 and cavity 42 may be hosed off periodically.

Figure 4:
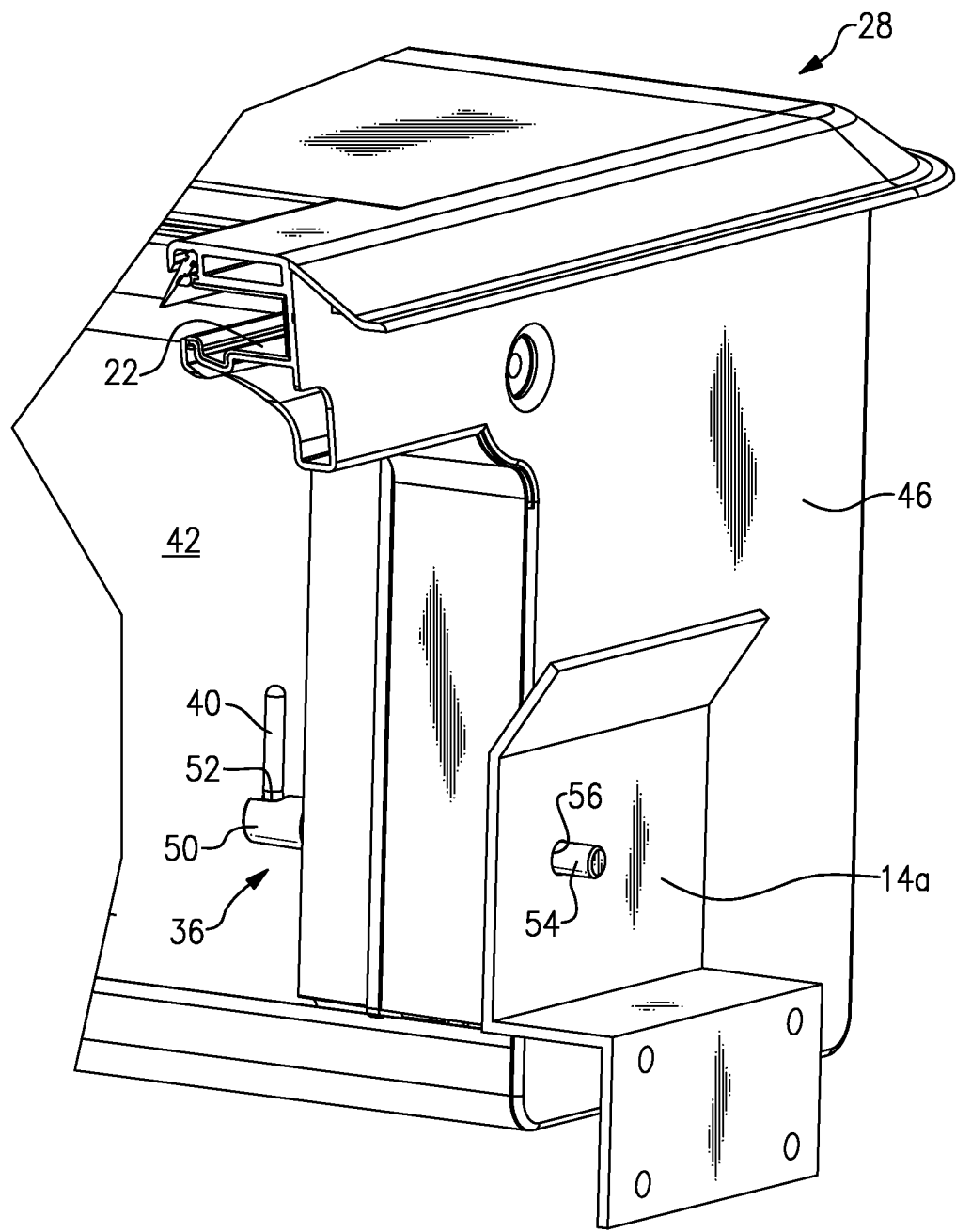
FIG. 4 shows a first locking mechanism securing the magazine to the truck bed.
Figure 15B:
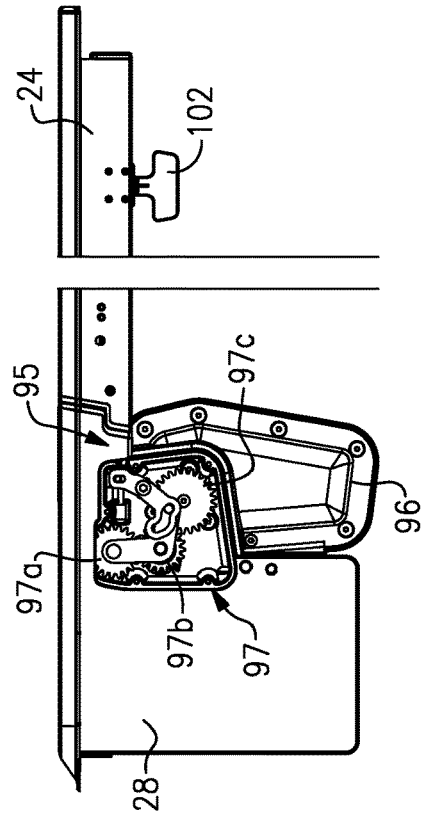
FIGS. 15A-15C are views of the release mechanism in an automatic drive configuration.
Figure 16B:
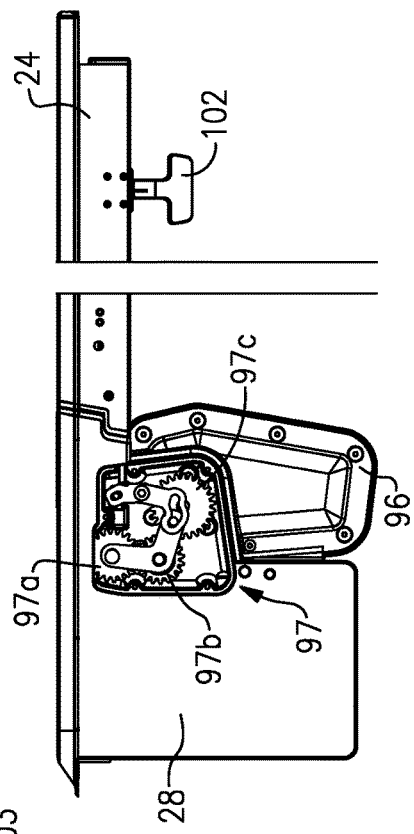
FIGS. 16A-16C are views of the release mechanism in a manual drive configuration.
Figure 14:
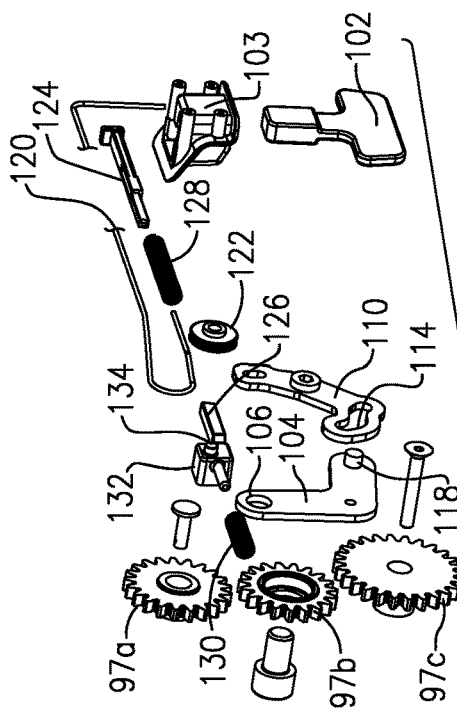
FIG. 14 is an exploded view of a release mechanism, including a portion of the drive system.
Figure 15A:
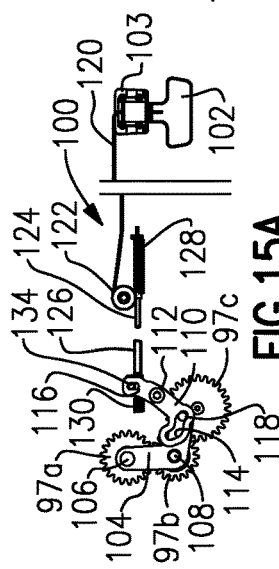
Figure 16A:
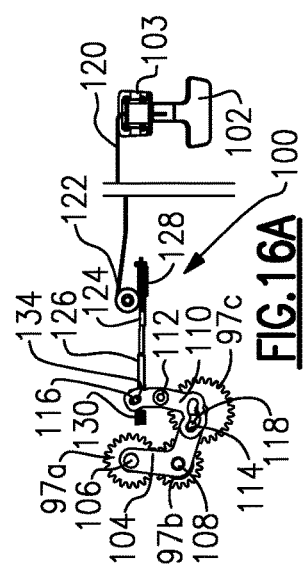
Figure 15C:
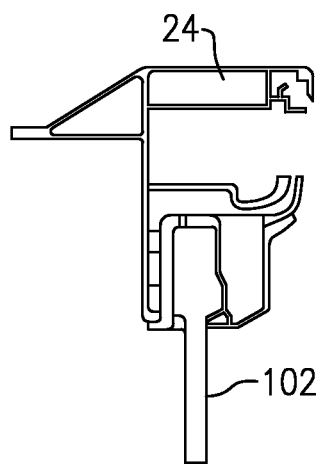
Figure 16C:
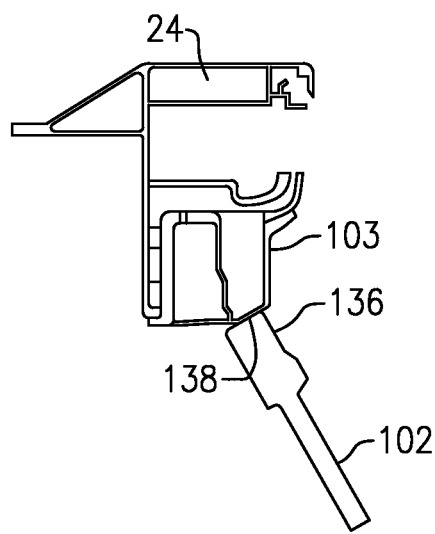
Figure 18:
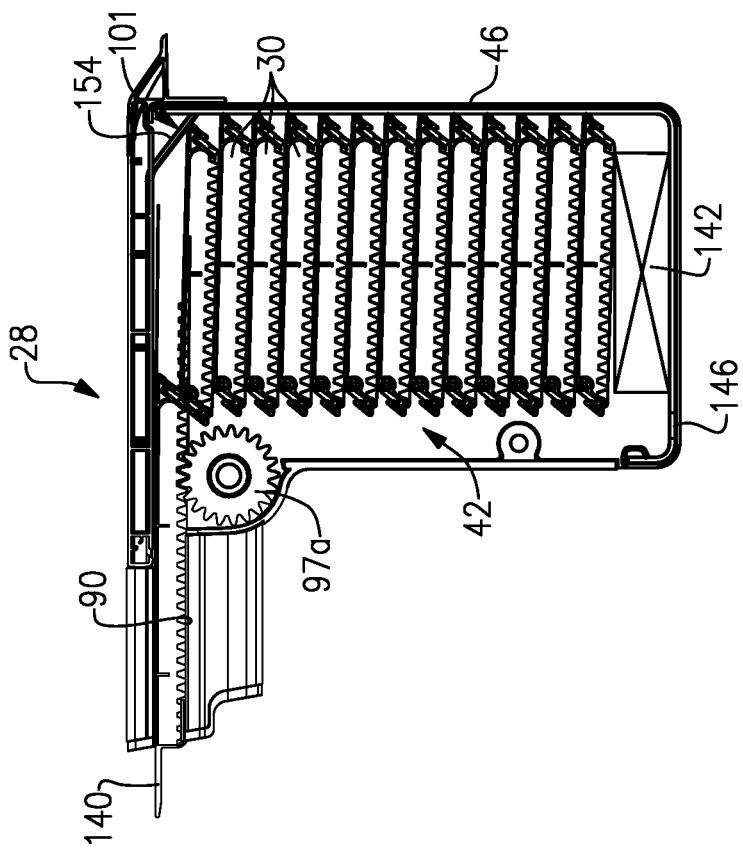
FIG. 18 is a cross-sectional view through the magazine illustrating a first slat deployed.

The first locking mechanism 36 includes a boss 50 with a slot 52. The handle 40 is connected to a pin 54 that extends through the boss 50 and into a hole 56 in bracket 14a secured to the lateral side 14 when in a locked position (FIGS. 4, 5 and 7). The bracket 14a may be a separate structure secured, for example, where a hold down mount 14b (FIG. 3) would be optionally secured to the truck bed 12, or the bracket 14a may be integrated fully into the lateral side 14. A biasing spring 58 urges the pin 54 outward from the magazine 28, and the handle 40 is seated in the slot 52 in the locked position.

The first locking mechanism 36 is moved to a released position (FIG. 6; dashed lines in FIG. 7) by pulling the handle 40 inward, counteracting the biasing spring 58 and rotating the handle 40 such that the handle is misaligned with the slot 52. The biasing spring 58 seats the handle 40 in abutment with a terminal end 60 of the boss 50, maintaining the pin 54 in a retracted position with respect to the hole 56.

Referring to FIGS. 8 and 9, a T-shaped magazine locator 62 is provided on one end of each guide rail 24 (via first end cap 72) to facilitate alignment of the magazine 28 relative to the guide rails 24 upon reinstallation of the magazine 28 into the truck bed 12. The magazine locator 62 is tapered and cooperates with a complementary shaped recess 64 in the housing 46 (via second end cap 74).

The second locking mechanism 38 is provided on each guide rail 24, one of which is shown in FIGS. 10-12B. The second locking mechanism 38 includes an aperture 66 that receives a lever 68 movable between a locked position (FIGS. 12A and 12B) and a released position (FIGS. 11A and 11B). For security, the lever 68 is arranged interiorly and beneath the track 22 so that the second locking mechanism 38 is inaccessible from outside of the cover 26 when closed.

First and second end caps 72, 74 are mounted in ends of the guide rail 24 and the housing 46, respectively. A pin 70 is secured to the lever 68 and is supported at opposing ends by a guide block 80 and a first hole 76 in the first end cap 72. The second locking mechanism 38 is moved from the released position (FIGS. 11A and 11B) to the locked position (FIGS. 12A and 12B) by sliding the lever 68 toward the magazine 28. The pin 70 is received in a second hole 78 in the second end cap 74 in the locked position, preventing the magazine 28 from being lifted upward.

The first and second locking mechanisms 36, 38 secure the magazine 28 to the truck bed 12, directly and indirectly. The magazine locator 62, recess 64 and second locking mechanism cooperate to locate the guide rails 24 and magazine 28 relative to one another in the X-, Y- and Z-directions.

Referring to FIGS. 13A and 13B, the slats 30 may be constructed of a body 30a formed by a plastic or aluminum extrusion having an interior passage 86 that provides a lighter weight structure. Other materials and forming processes may be used for the slat bodies. Ends 30b each include a protrusion 84 that is inserted into the interior passage 86 on opposing sides of the body 30a (only one side shown). The slats 30 may also be molded or cast, for example, if desired. Each end 30b has teeth 90, which are provided on a surface 92 arranged on an underside of the slat 30. As can be appreciated, any suitable slat profile and shape may be used. The ends 30b may be bonded, snapped or otherwise secured to the slat body 30a, or the ends 30b may be integrally formed with the slat body 30a. Additionally, the ends, or end caps, 30b may instead have teeth provided at the lateral extremity or elsewhere rather than an underside of the end 30b.

Returning to FIGS. 8 and 10, in one example, the guide rails 24 include a shaped feature that cooperates with a correspondingly shaped feature in the slat 30 to laterally locate the slat 30 within the track 22. An insert (see, e.g., FIG. 45) or coating may be provided on the track 22 to reduce friction and wear between the slats 30 and the guide rails 24. The track 22 provides a channel 88 used to collect water (see, also, 1020 in FIG. 45) that can be drained through a drain hole (not shown).

Referring to FIGS. 14-16C, a drive assembly 95 cooperates with the teeth 90 on ends 30b of the slats 30 to extend and retract the cover 26. The tonneau cover may also be opened and closed manually, if desired, with or without a power drive option. In one example, the drive assembly 95 includes an electric motor 96 that drives a shaft 98 (FIG. 5) via a gear train 97, which has driven gears 97a mounted on opposing sides of the shaft 98. Each driven gear 97a cooperates with teeth 90 of the slats 30 to slide the slats 30 along the track 22 in the guide rails 24 and the magazine 28.

In the example, the motor 96 is mounted to a magazine 28, which houses the slats 30, in a generally vertical orientation. The motor 96, which may be powered by the vehicle's battery, rotationally drives a gear train having a drive gear 97c that is coupled to the driven gear 97a via an idler gear 97b. The driven gear 97a cooperates with the slats 30 to extend and retract the slats 30 along the guide rails 24. In one example gear train and motor configuration, the gears and motor cannot be back-driven by pushing or pulling the slats 30, effectively locking the slats 30 in place once power to the motor 96 has been cut.

It is desirable to retract the tonneau cover in the event of a power failure to the motor 96. Moreover, it is desirable to be able to release the tonneau cover, particularly when rigid slats 30 are used, to provide an anti-entrapment feature if a person becomes trapped within the truck bed with the tailgate up and the tonneau cover fully closed. The disclosed release mechanism 100 provides an assembly and apparatus for releasing the tonneau cover.

The release mechanism 100 includes a handle 102 mounted to one of the guide rails 24 by a bracket 103. In one example, the handle 102 is glow-in-the-dark. A finger cup (e.g., at 330 in FIG. 22B) may be provided in the guide rail 24 so that the user can brace themselves with one hand in the finger cup while using the other hand to pull the handle 102. The handle 102 may be manipulated by a user to decouple the motor 96 from the slats 30 so that the slats 30 can be extended and retracted from and to the magazine 28 to close and open the tonneau cover without providing power to the motor 96.

A link 104 includes first and second pivots 106, 108 that are respectively coaxial with the driven gear 97a and the idler gear 97b, which is carried by a link 104. An arm 110 is supported by a third pivot 112. Elongated first and second apertures 114, 116 are provided on the arm 110 on either side of the third pivot 112. A pin 118 is supported at one end of the link 104 opposite the first pivot 106. The pin 118 extends through the first aperture 114.

A pulley 122 is supported on the guide rail 24, and a cable 120 has one end connected to the handle 102 and is wrapped about the pulley 122.

First and second rods 124, 126 are respectively provided in the guide rail 24 and the magazine 28. The first and second rods 124, 126 are normally spaced apart from one another during normal operation in which the motor is powered to move the slats 30. The first and second rods 124, 126 cooperate respectively with first and second springs 128, 130 to bias the first and second rods 124, 126 apart from one another. The second rod 124 includes a carrier 132 which provides a projection 134 that is received within the second aperture 116. The two-piece rod arrangement enables the guide rail 24 and magazine 28 to be connected and disconnected for ease of assembly and disassembly of the electric tonneau cover.

When the release mechanism 100 is actuated by the handle 102, the first rod 124 translates to engage the second rod 126, rotating the arm 110 about the third pivot 112, which causes the pin 118 to engage one end of the first aperture 114 forcing the link 104 to rotate about the first pivot 106 thereby decoupling the idler gear 97b from the drive gear 97c. In this manner, the motor 97c is decoupled from the slats 30 enabling the slats to be manually moved along the guide rails 24.

The bracket 103 includes a pocket that receives an inner end 136 of the handle 102 in a normal position. When the handle is pulled and rotated slightly, the inner end 136 abuts a surface 138 of the bracket 103, which overcomes the biasing forces of the first and second springs 128, 130 and maintains the release mechanism 100 in a disengaged position. Once the inner end 136 of the handle 102 is returned to the pocket of the bracket 103, the first and second rods 124, 126 separate and the biasing force of the second spring 130 rotates the arm 110, and in turn the link 104, back to the normal position, which reengages the idler gear 97*b* with the drive gear 97*c*.

Referring to FIGS. 17-21B, the cavity 42 of the magazine 28 stores any slats 30 that have not been deployed. In the example, the magazine 28 includes one or more springs 142 supported by the floor of the housing 46 and secured by retainers 144 (FIG. 5). The springs 142 may be provided by a pair of leaf springs in the example, which bias the slats 30 upward. A drain hole 146 may be provided in the magazine 28 to drain water.

In the example, the endmost slat 30 may be larger than the other slats 30 and may include a lip 140 that overlaps the end tailgate 18 with the cover 26 closed (FIG. 1). As will be appreciated below, an interlocking profile is not needed at the forward edge of the endmost slat where the lip is provided. Similarly, an interlocking profile is not needed at the aft edge of the innermost slat (first slat entering the magazine). However, the innermost slat may be the same as the other slats, if desired, to reduce the number of unique parts for the cover.

Figure 17:
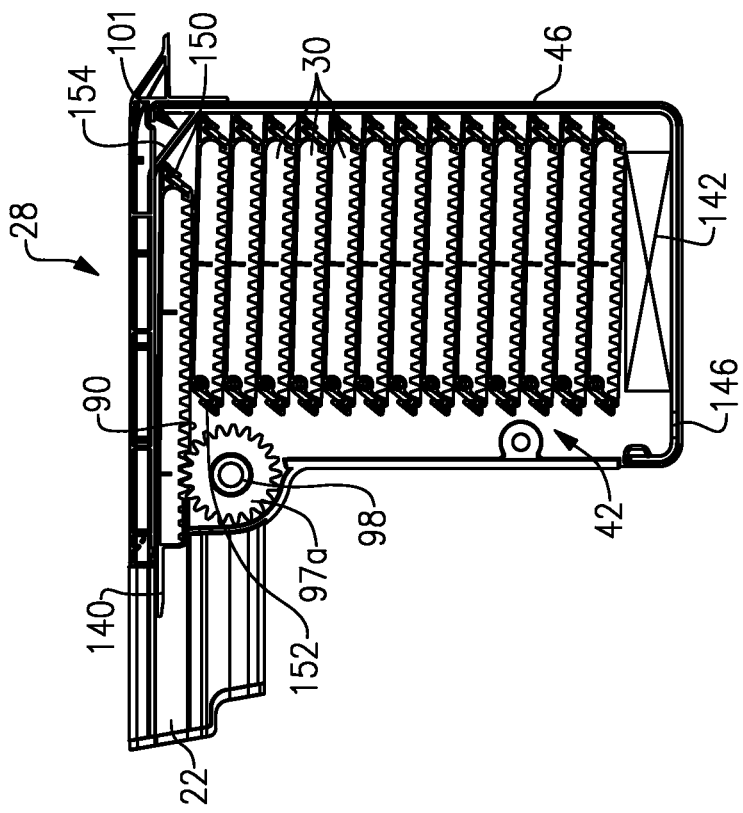
FIG. 17 is a cross-sectional view through the magazine illustrating the slats fully retracted and stowed.
Figure 20:
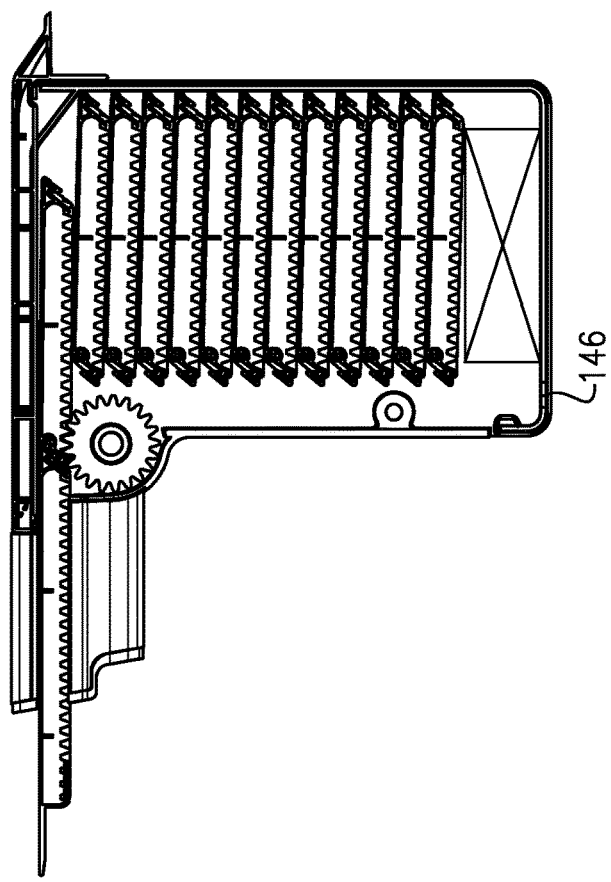
FIG. 20 is a cross-sectional view through the magazine illustrating the second slat partially deployed with the first and second slats interlocked.
Figure 19:
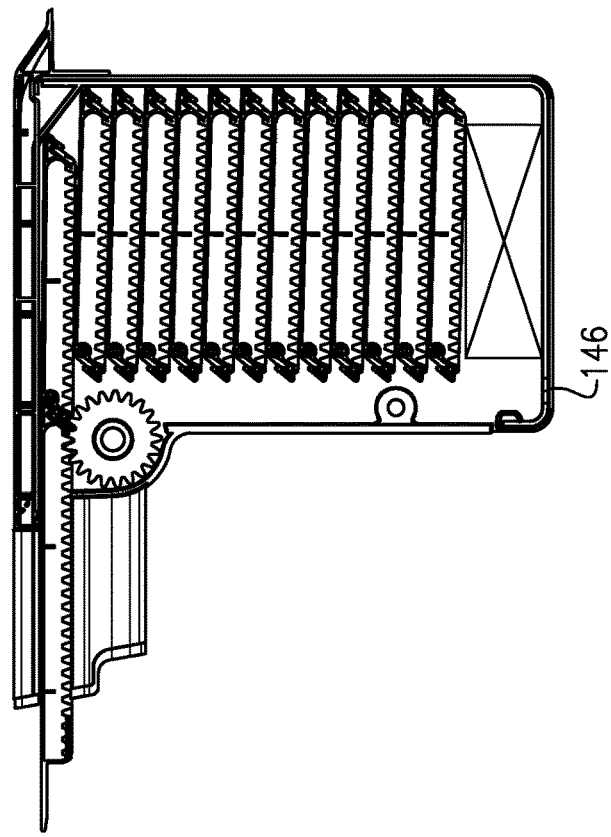
FIG. 19 is a cross-sectional view through the magazine illustrating the first and second slats fully interlocked with one another.

The slats 30 are shown fully stowed within the magazine 28 in FIG. 17. As appreciated from FIG. 18, as the slats 30 are deployed from the magazine 28, the uppermost slat within the cavity 42 is biased upward and into interlocking engagement with the next slat, which is arranged in the guide rail 24. Each slat 30 includes first and second profiles 150, 152 opposite one another that provide a complementary interlocking shape, which also permits easy decoupling when the slats 30 are loaded back into the magazine 28. The slats 30 each have an aft edge and a forward edge. The aft edge of one slat 30 interlocks with a forward edge of an adjacent slat 30 in the deployed position. All the forward edges are arranged on one side of the stack of slats in the stowed configuration, and all of the aft edges are arranged on another side of the stack of slats in the stowed configuration.

Weather seals 158 may be located in a lateral groove 156 in each slat 30 at the second profile 152 to seal between the slats 30, as shown in FIG. 21B. Other example sealing arrangements are illustrated in FIGS. 38A-43B. To better feed the slats 30 into and out of the magazine 28 during retracting and extending of the cover, a ramped surface 154 is provided to slightly cant the slats 30 to provide a slat orienting mechanism 101. During stowage (FIGS. 21A and 21B), as the slat 30 moves into in the cavity 42 the first profile 150 (on the side of the slat 30 farthest from the track 22) will engage the ramped surface 154 in the housing 46 thereby forcing one side down and breaking the engagement between the first and second profiles 150, 152 (best shown in FIG. 21B). Such a configuration reduces noise and lowers the operating forces for the drive assembly 95.

Returning to FIG. 5, the motor 96 communicates with a controller 160 that receives commands from an input 162, such as a two-way switch, to open and close the cover 26. A key fob/remote or other input may be used to open or close the cover 26. The controller 160 can provide a variety of functionality, for example, the controller 160 may be configured to detect an obstruction to the cover 26 within the truck bed 12. The controller 160 commands the motor 96 to open the cover 26 in response to detecting the obstruction. In another example, the controller 160 may be programmed to open/close the cover 26 to a predetermined position, for example, fully opened or fully closed.

It is desirable to provide weather seals between various components to prevent debris from interfering with operation of the tonneau cover and prevent water from entering the truck bed when the tonneau cover is closed. To this end, weather resistant seals are provided between the guide rails 24 and the truck bed lateral sides 14 (see, e.g., FIGS. 38A-43B. Additional weather resistant seals between the guide rails 24 and slats 30 may also be used. A water drainage system (see, e.g., FIGS. 8 and 45) from guide rails 24 through hole in truck bed front wall 16 may also be provided.

A heating element may be incorporated into each of the guide rails 24 to melt any ice that may prevent slats 30 from sliding in the guide rails 24. The controller 160 may be used to automatically energize the heating elements when the temperatures reach freezing.

Solar panels may be provided on one or more of the slats 30 to power lights that illuminate the truck bed or auxiliary power for charging devices or motorized scooters.

Another example drive assembly 295 is shown in FIGS. 22A-23D. The drive assembly 295 including an electric motor 248 (FIG. 22A) slides the slats 230 between the open and closed positions along a path provided by the tracks 222 in an automated mode of operation. A release mechanism 300 may be used to decouple the motor 248 so the slats 230 can be more easily moved manually. The slats 230 interlock with one another as the cover 226 is deployed over the truck bed. The slats 230 are decoupled from one another and stored within a magazine 228 when the cover 226 is retracted.

A magazine 228 is mounted near the front wall 216 and houses the slats 230 in a stacked relationship when the cover 226 is not fully deployed. The magazine 228 is spaced from the truck bed floor, which provides a space 232 that can accommodate cargo when the magazine 228 is installed in the truck bed 212. The magazine 228 is easily removable from the truck bed 212 to increase storage space. For simplicity, the cover system 220 is designed so that the guide rails 224 may remain secured to the truck bed 212 when the magazine 228 is removed.

FIGS. 22A-23D illustrate a release mechanism 300 for a cover system 220. A motor 248 electrically drives multiple slats 230 along a pair of spaced apart guide rails 224. The motor 248 rotationally drives a first gear, or motor gear 266, that is selectively coupled to a second gear, or drive gear 274. Fewer or additional gears may be used if desired. The slats 230 include a slide on each of its opposing ends that ride within its respective rail 224. A shaft 298 interconnects laterally spaced apart drive gears 274 that cooperate with teeth on the underside of the slides of the slats 230. In the example, a drive gear 274 is axially affixed to each of opposing ends of the shaft 298 and rotationally affixed by profile 416 (FIG. 23B). An end of the shaft 298 is mounted in a collar 414 on an end cap 412 at each side of the magazine 228. The motor 248 is secured to the end cap 412. In this manner, a single motor 428 is used to drive the slats 30 at opposing ends 30*b* via the shaft 298 and its gears 274.

With the gears coupled to one another, the motor 248 may be difficult to back-drive, or the motor 248 may also effectively lock against rotation acting as a security feature. The release mechanism 300 can be operated in a variety of ways to decouple the motor gear 266 from the drive gear 274 so that the slats 230 can be manually opened or closed more easily, for example, during an anti-entrapment scenario in which a person is within the enclosed truck bed with the electric motor inoperable. In such instances, the release mechanism 300 is actuated, decoupling the motor 248 from the slats. One or more finger cups 330 may be provided on an underside of the slats 230, as shown in FIG. 22B, enabling a person within the truck bed to slide the slats 230 once the slats have been decoupled from the motor 248.

Figures 22A, 22B:
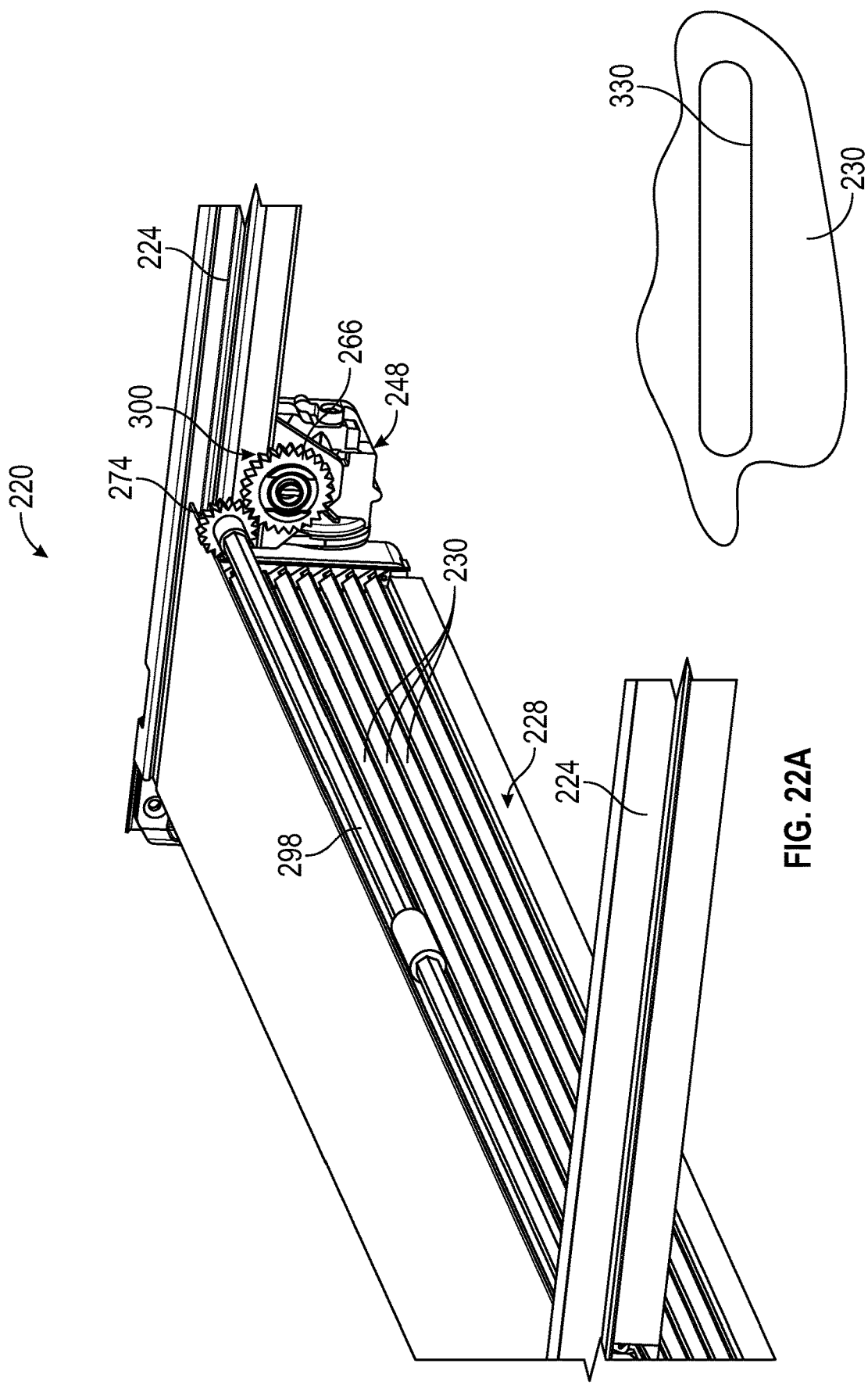
FIG. 22A illustrates an example drive assembly for the cover system.
FIG. 22B illustrates a finger cup on an underside of one of the slats.

Referring to FIG. 22A, in a manual option without a motor, the cover system 220 may still employ the shaft 298 and gears 274, which engage the teeth of the slats 230. This arrangement synchronizes longitudinal movement between the opposing sides of the slats 230 to prevent racking of the cover during operation.

The release mechanism 300 includes a drive lug 400 mounted to a drive shaft 348 of the motor 248. A driven lug 402 rotationally affixes the motor gear 266 to the drive lug 400. Legs 410 of the driven lug 402 are snap-fit into correspondingly shaped recesses 406 in the drive lug 400. The motor gear 266 includes channels 408 that permit sliding movement of the motor gear 266 along the rotational axis of the drive lug 400.

Figure 23A:
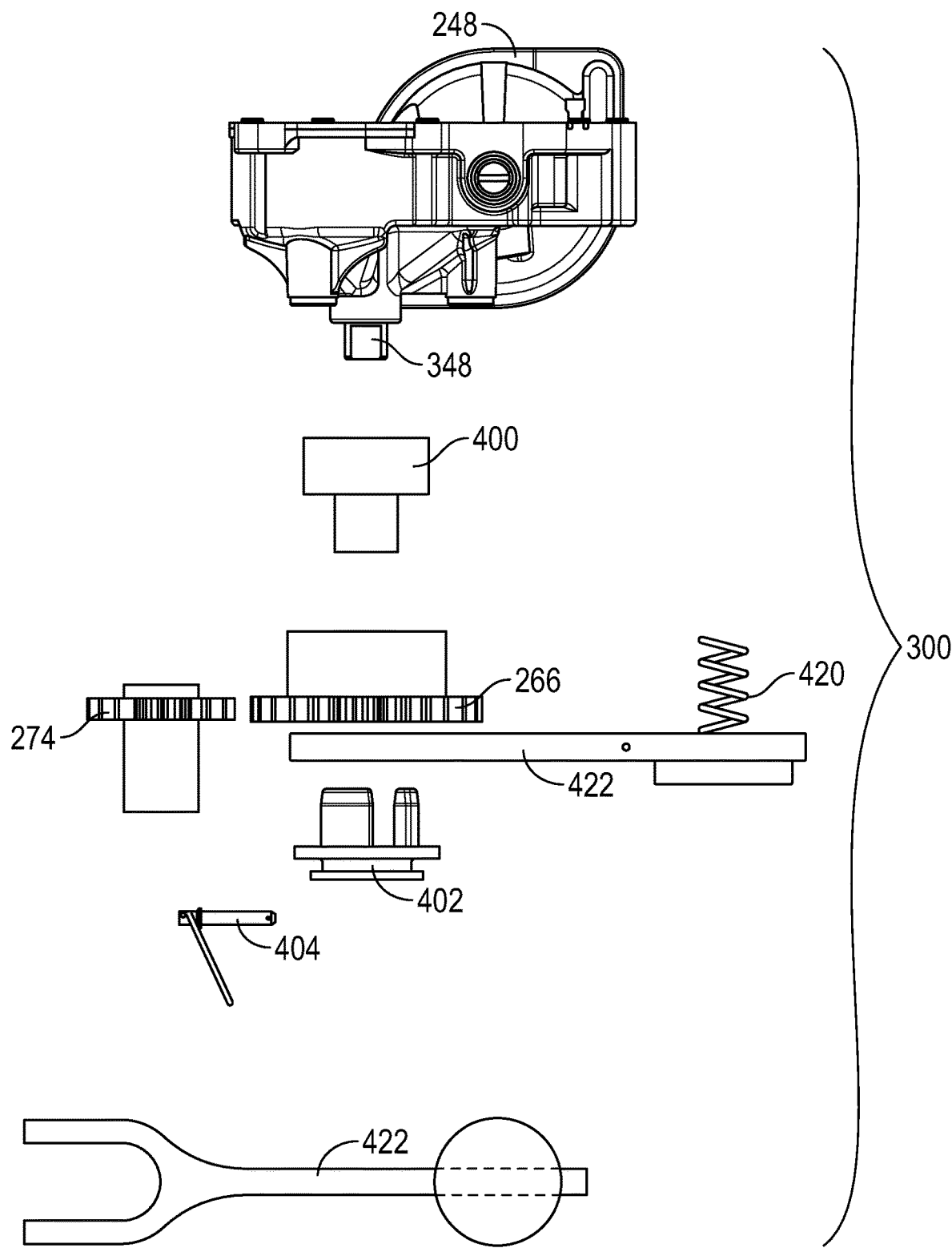
FIG. 23A illustrates an exploded view for an example release mechanism.
Figure 23B:
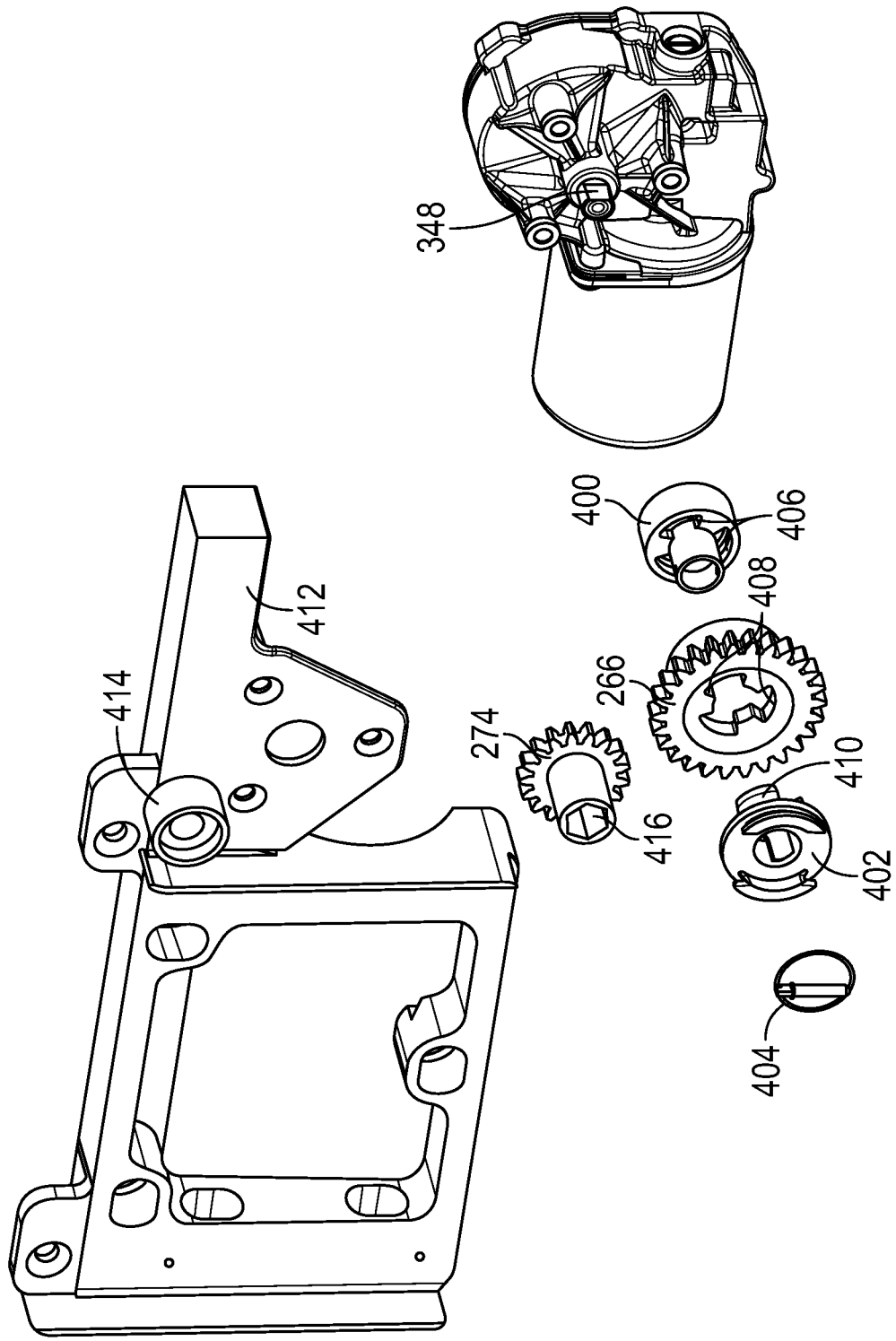
FIG. 23B is a perspective exploded view illustrating the drive assembly with a portion of the release mechanism.
Figure 23C:
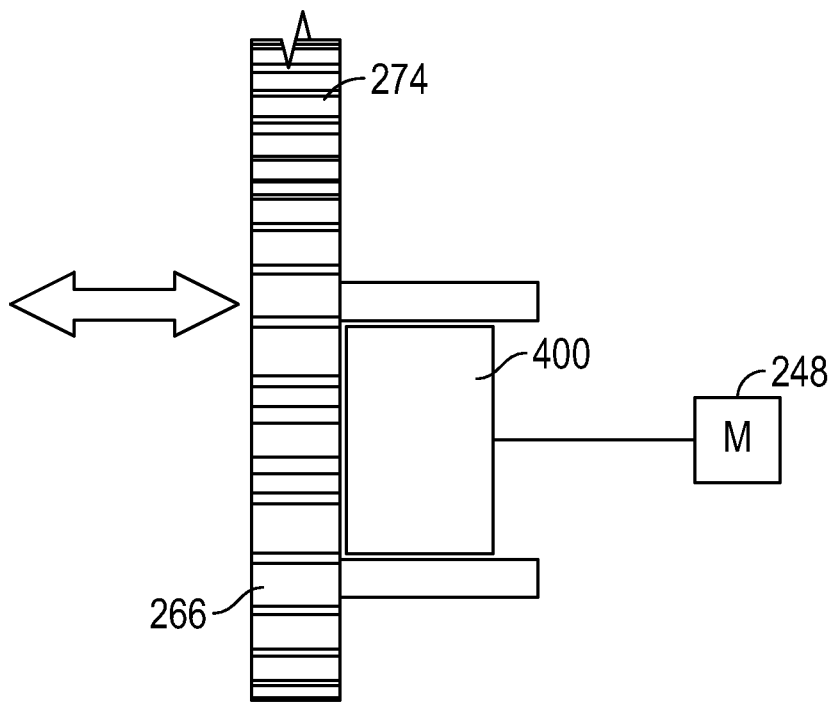
FIG. 23C illustrates a set of gears of the drive assembly engaged with one another in a coupled position.
Figure 23D:
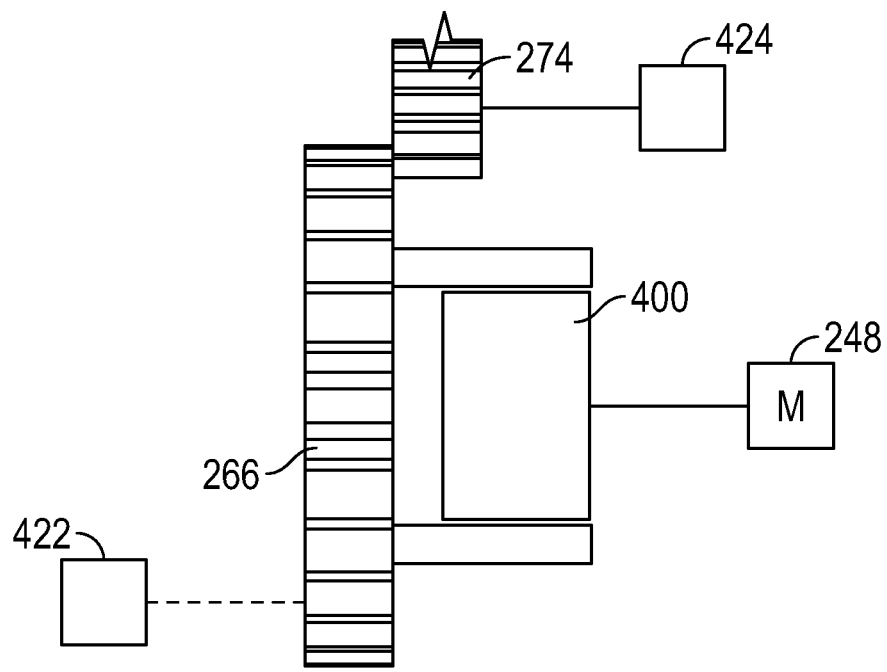
FIG. 23D illustrates the gears shown in FIG. 23C decoupled by the release mechanism.

In a normal operating configuration shown in FIG. 23C, the motor gear 266 is in engagement with the drive gear 274. A retainer 404 prevents further axially outward movement of the motor gear 266 with respect to the drive lug 400. By depressing the driven lug 402 with a device 422, such as a handle, the motor gear 266 can be decoupled from the drive gear 274, as shown in FIG. 23D. In this disengaged position, the slats 230 may be manually operated. A spring 420 biases the motor gear 266 via the device 422 to a location at which it is in engagement with the drive gear 274. One end of the handle includes a fork that is received in an annular slot in the driven lug 402; an opposite end of the handle has a palm pad that can be pushed by a user. The device 422 may be configured to decouple the motor gear 266 from the drive gear 274 remotely. A retracting device, such as a drill motor 424, may be used to retract the slats 230 without the motor 248, for example, if the automated drive malfunctions.

Referring to FIGS. 24A-24D, the spring 342 (e.g., a pair of leaf springs) that biases the slats 230 upward to be deployed, may be difficult to overcome when inserting the slats 230 back into the magazine 228 either manually or when electrically automated. To this end, a pulley system 460 may be used to assist in raising and lowering the slats 230. If desired, the leaf spring may be eliminated entirely and only the pulley system may be used to bias the slats 230 upward. In one example, a cable 464a, 464b is operably connected to the shaft 298 on either side of the follower 462 (collectively, cable 464). The first and second cables 464a, 464b are wound and unwound in response to operation of the retractable cover system. A follower 462 that supports the slats 230 within the magazine 228 includes pulleys 468 about which the cable 464 is wrapped. An opposite end of the cable 464 may be secured to a pulley 466, which is operatively mounted to the magazine 228. As the toothed features of the underside of the slats 230 cooperate with the drive gear 274 on the shaft 298, the cable 464 is wound or unwound about the shaft 298, thereby assisting the raising or lowering of the follower 462 via the pulleys 468.

Figure 24A:
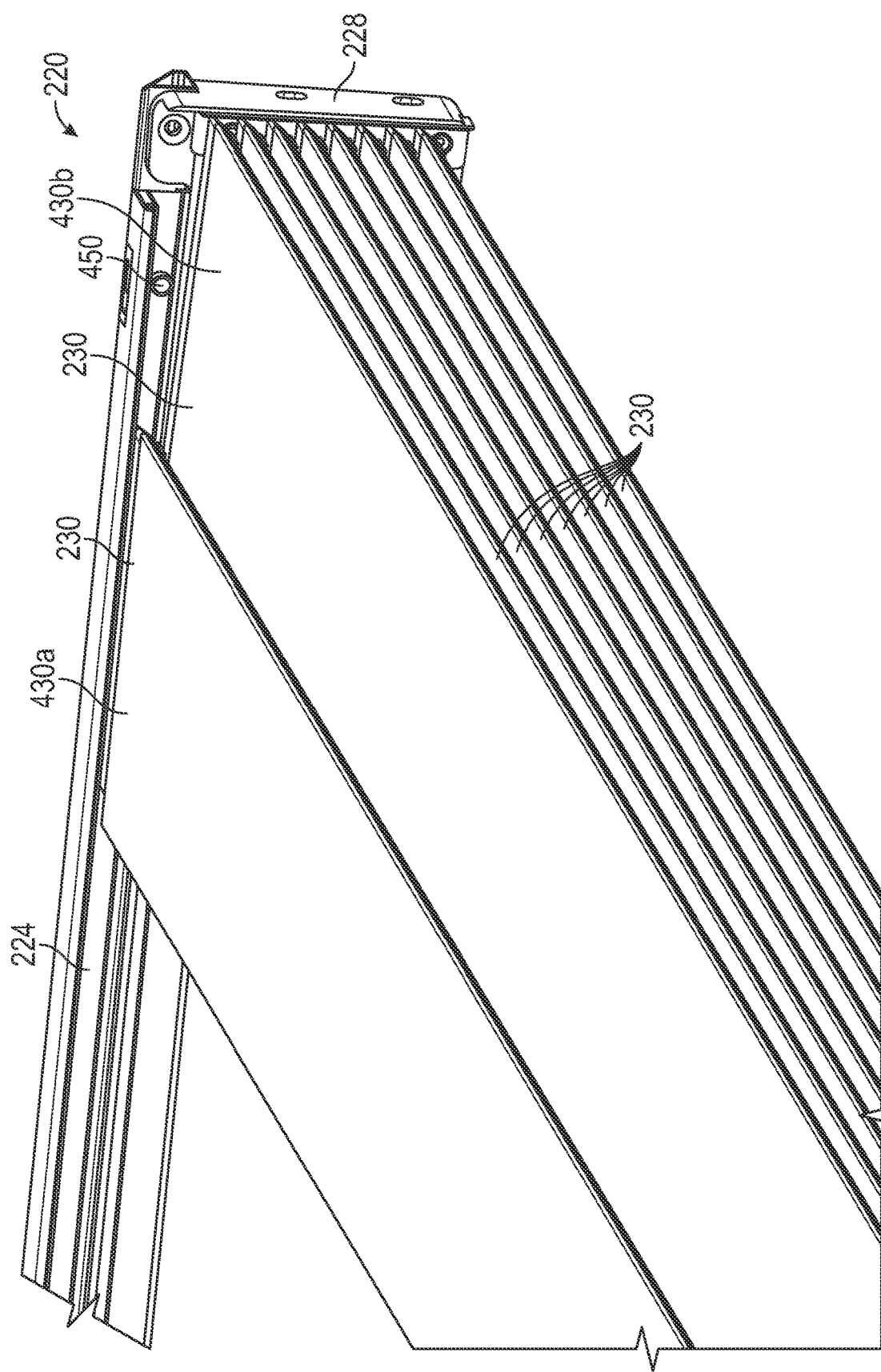
FIG. 24A depicts numerous slats stowed in a magazine.
Figure 24B:
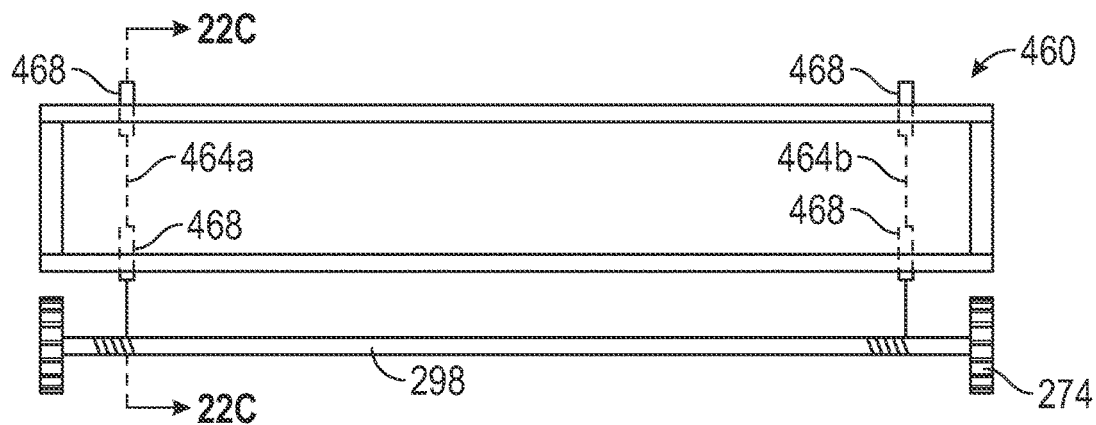
FIG. 24B illustrates an example pulley system for assisting in raising the slats.
Figure 24C:
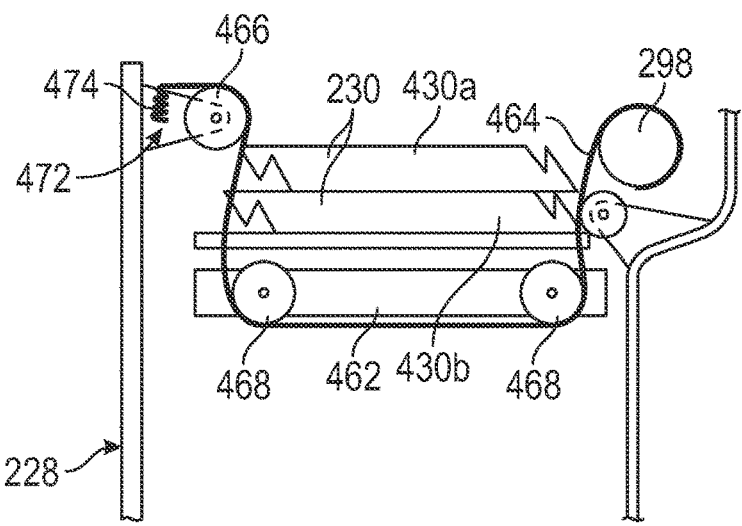
FIG. 24C is a schematic cross-sectional view of the pulley system shown in FIG. 24B taken along line 24C-5C.
Figure 24D:
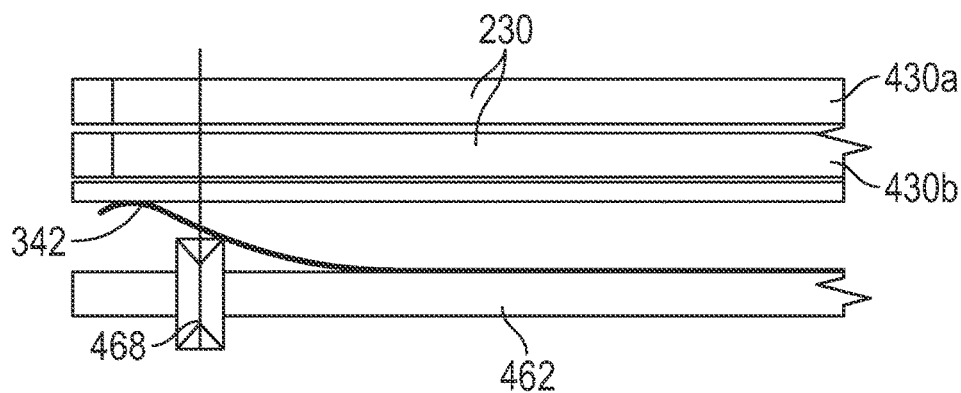
FIG. 24D is another schematic view of the pulley system also depicting a leaf spring.

In the above described embodiment, a spring tensioner 472, which may be provided by a torsion spring 474, acts as a take-up mechanism to accommodate the next slat before it leaves the magazine 228, allowing the next slat to interlock with the slat already in the tracks 224. As shown in FIGS. 24A and 24C-24D, the multiple slats 230 includes first and second slats 430a, 430b. The first slat 430a is above and adjacent to the second slat 430b in the stowed configuration. Furthermore, the first slat 430a is in a horizontally overlapping orientation with the second slat in a first position (e.g., FIGS. 17 and 18), and is in a horizontally planar and interlocked orientation with the second slat in a second position (e.g., FIG. 21A). As can be appreciated from FIGS. 17 and 18, as the cable 464 is wrapped about its pulley or shortened, the second slat 430b cannot travel upward until it is able to latch with the first slat 430a. Assuming the cable itself cannot stretch to accommodate this scenario, the spring tensioner 472 stretches and increases the cable tension until the first and second slats transition from the second position to the first position. Once the second slat 430b is able to interlock with the first slat 430a (FIG. 21A), the spring tensioner 472 contracts to a more relaxed state and decreases the cable tension in the cable.

Figure 51:
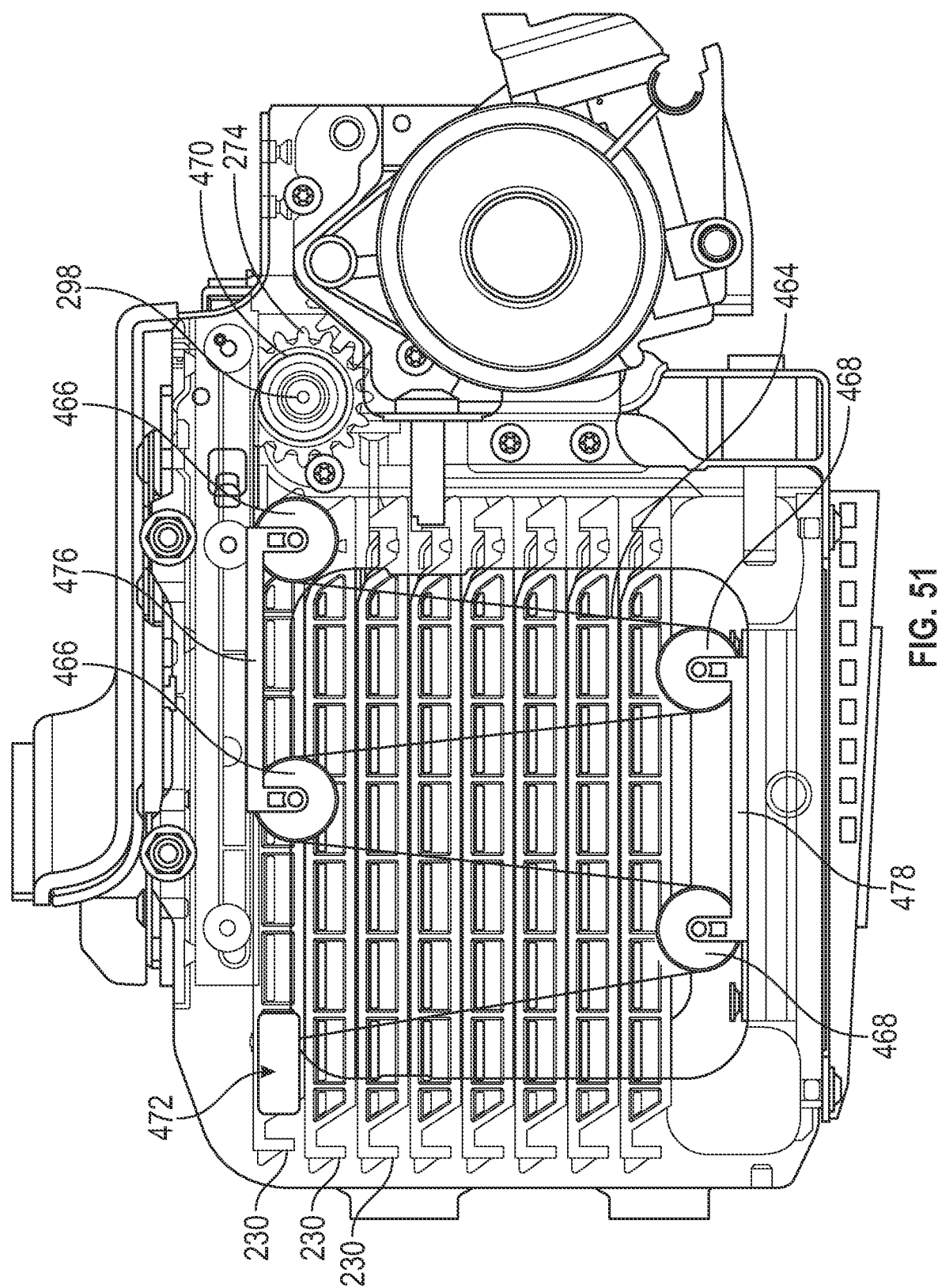
FIG. 51 illustrates a first example spring-biased pulley system.
Figure 52:
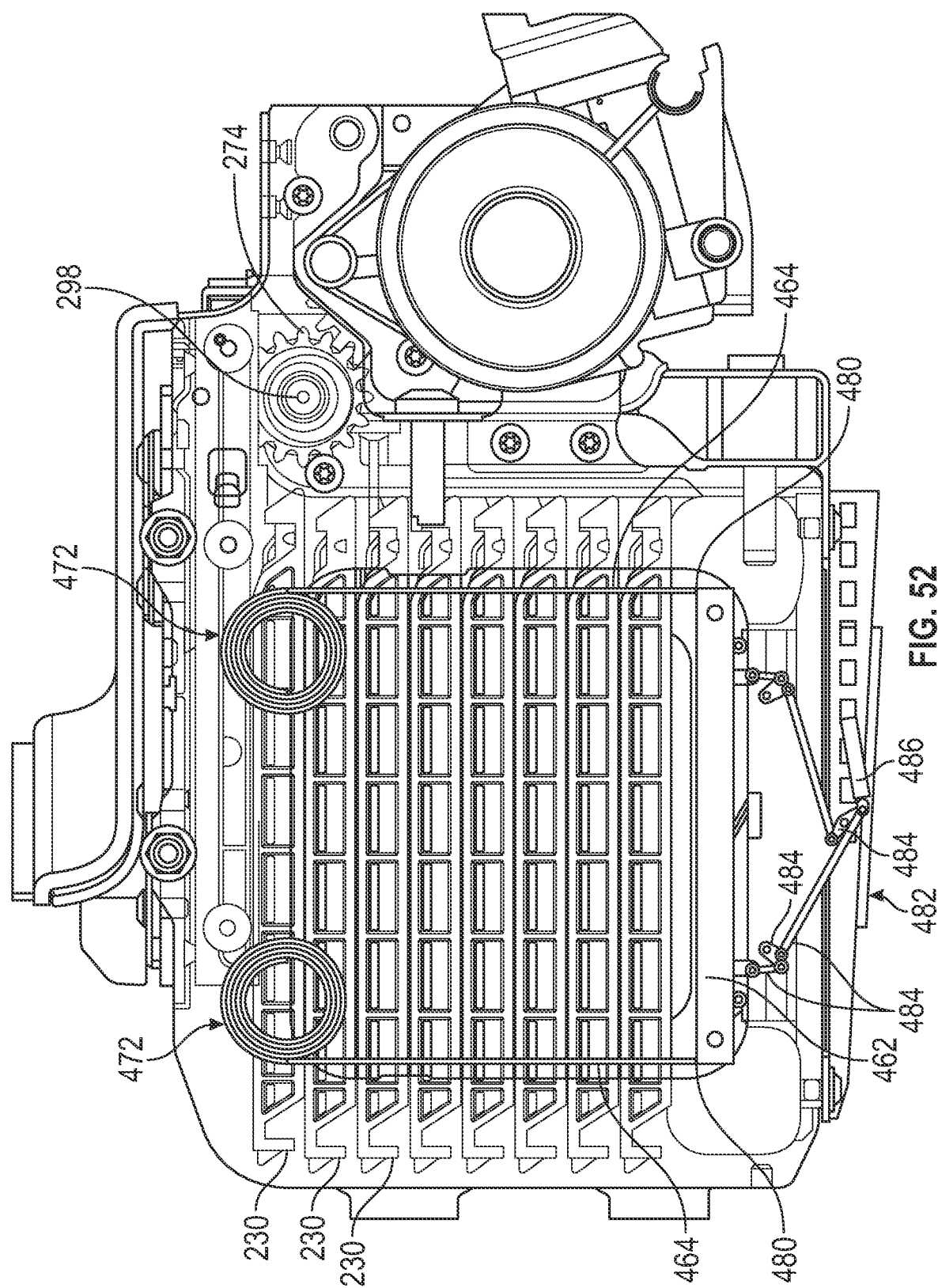
FIG. 52 shows a second example spring-biased pulley system.
Figure 53:
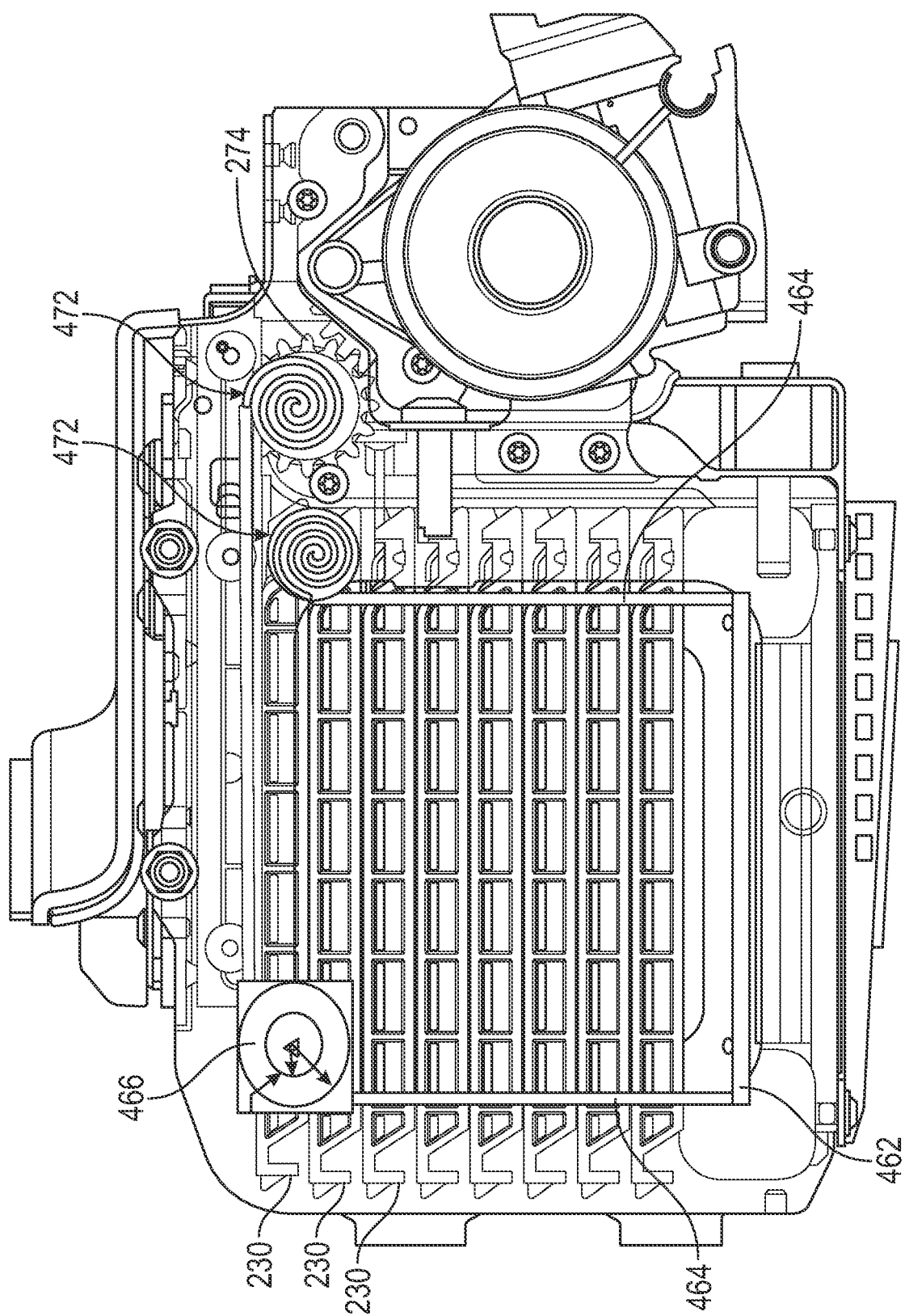
FIG. 53 depicts a third example spring-biased pulley system.

FIGS. 51-53 illustrate three example spring-biased pulley systems.

The pulley system includes a cable 464 that is configured to wrap and unwrap about the rotational axis during operation of the retractable cover system, either directly around the shaft 298, a pulley 470 mounted to the shaft 298, or some other suitable configuration.

In the example shown in FIG. 51, the pulley 470 is coaxial with the shaft 298. The cable 464 has one end cooperates with the pulley 470 and is configured to rotate the pulley 470, and another end of the cable 464 is secured to the spring tensioner 472. A bracket 476 mounted to the magazine supports pulleys 466, and another bracket 478 mounted to the follower 462 supports pulleys 468. The cable 464 is at least partially wrapped around these idler pulleys 466, 468 to provide an improved mechanical advantage.

Referring to FIG. 52, the spring tensioner 472 is a torsion spring (e.g., like clock springs) that is arranged at one end of the cable 464, where a cable is arranged at each of the four corner portions of the follower 462. In this configuration, the cables are not wrapped about the shaft 298 directly or indirectly. Another spring assembly 482 may be arranged beneath the follower 462 to assist the pulley system. The spring assembly 482 includes linkages provided by rods and bellcranks cooperate with one another to bias the follower upward in response to a cylinder (gas or hydraulic) applying an upward load to the follower 462.

FIG. 53 is a hybrid of the arrangement illustrated in FIGS. 51 and 52. One spring tensioner 472 is arranged coaxially with the shaft 298 near gear 274. A cable 464 extends from this spring tensioner 472 around an idler pulley 466 to the follower 462 on one side. Another cable 464 extends from the other side of the follower 462 to another spring tensioner 472 arranged to the other spring tensioner 472.

In operation a method of operating the retractable cover system, includes deploying the slats and decreasing a cable tension in the cable when the first and second slats transition from the first position to the second position, but increasing the cable tension prior to the first and second slats transitioning from the first position to the second position. The method further includes stowing the slats and increasing the cable tension when the first and second slats transition from the second position to the first position.

Figure 25:
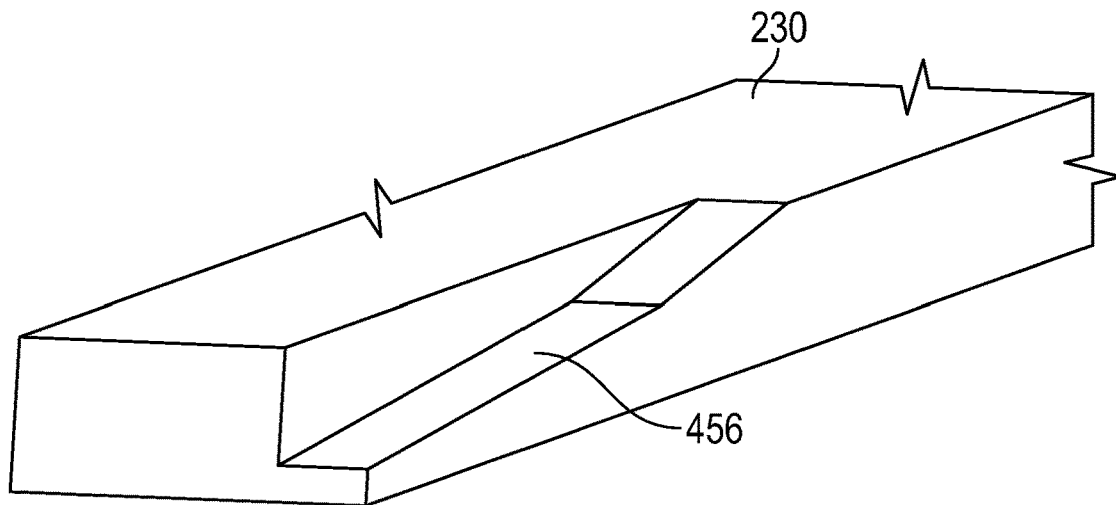
FIG. 25 shows a ramped surface on one of the slats.
Figure 26A:
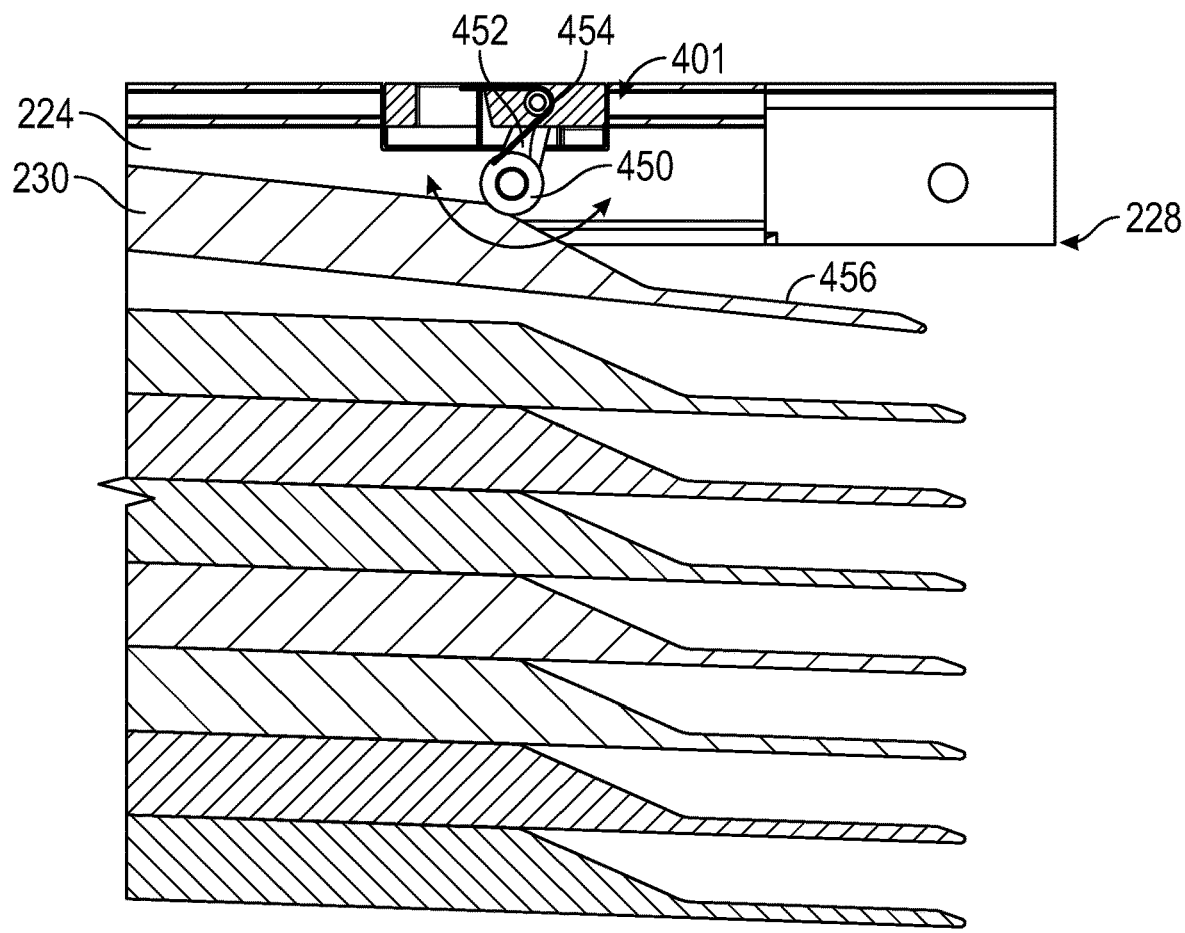
FIG. 26A illustrates a roller engaging the ramped surface in a first position.
Figure 26B:
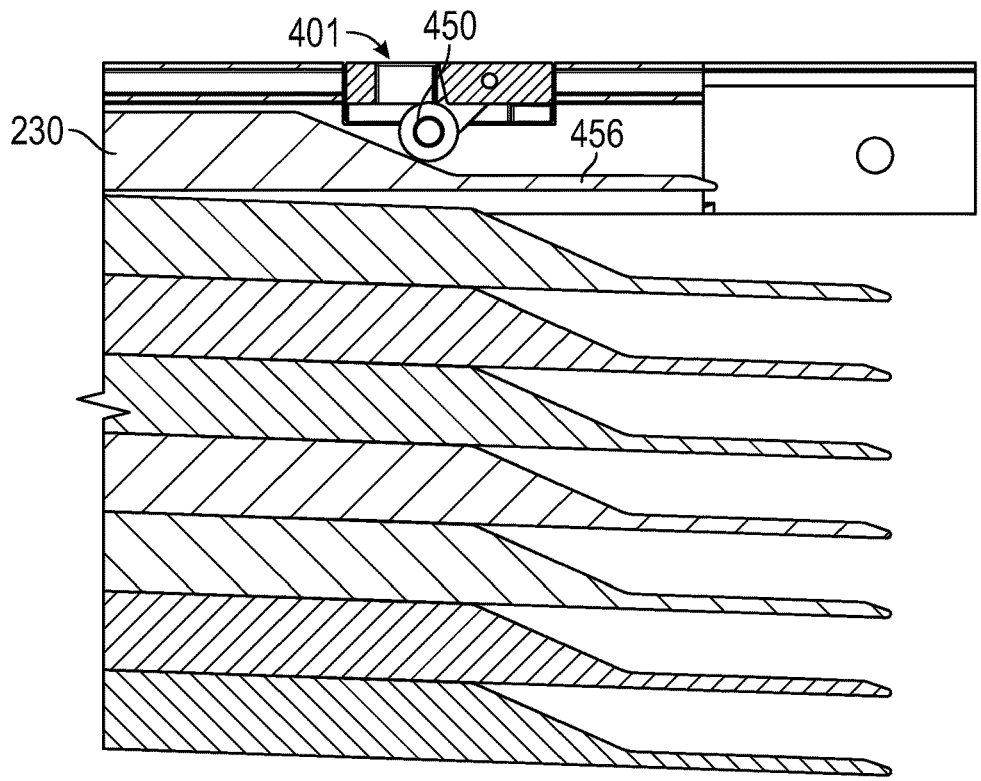
FIG. 26B illustrates the roller and ramped surface in a second position.
Figure 26C:
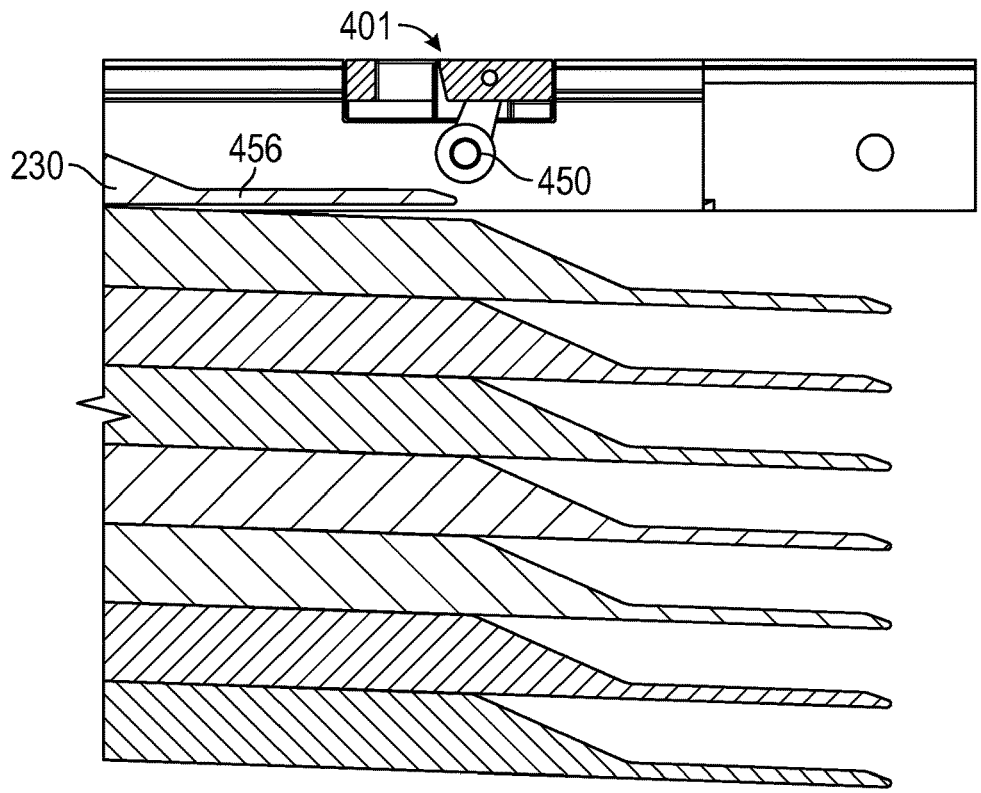
FIG. 26C illustrates the roller and the ramped surface in a third position.
Figure 26D:
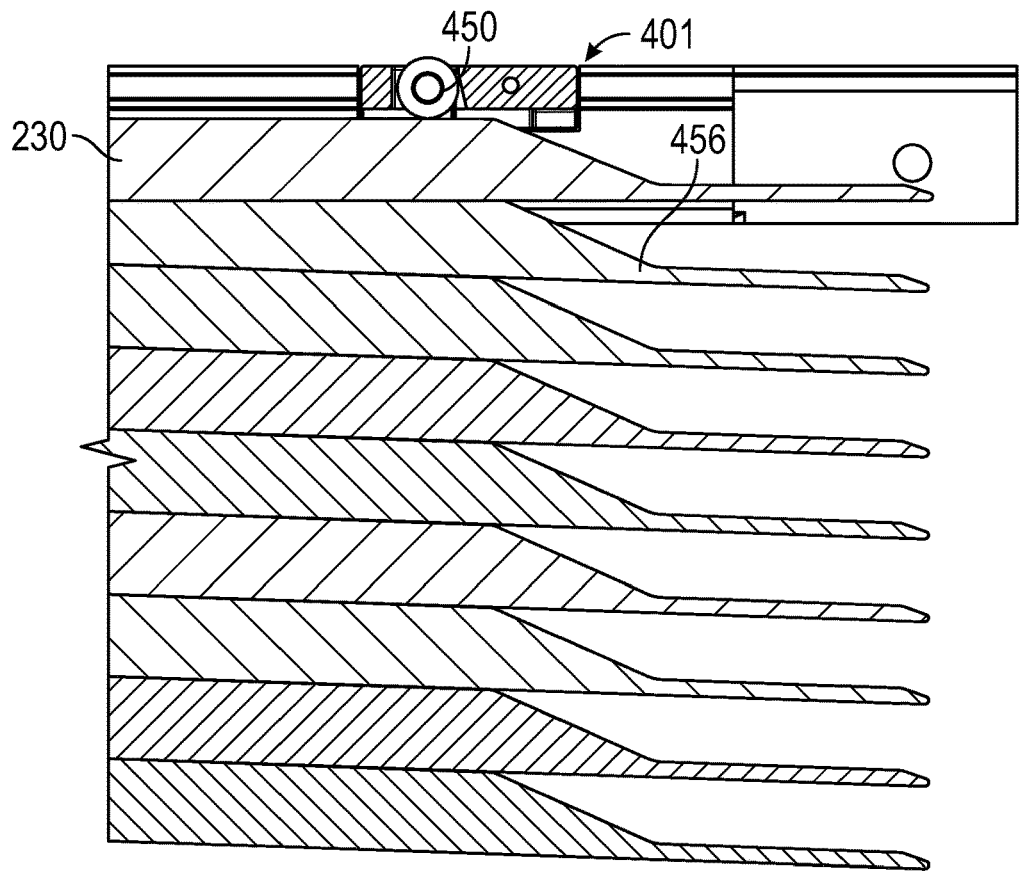
FIG. 26D illustrates the roller and ramped surface in a fourth position.

Referring to FIGS. 25-26D, a slat orienting mechanism 401 is shown. The slats 230 include interlocking profiles that engage one another to form a solid cover. A mechanism 401 includes a roller 450 mounted to an arm 452 that is rotationally biased to an extended position by a spring 454. In the extended position (FIG. 26C), the arm 452 is at an angle such that as a slat 230 is moved into the magazine 228, the arm 452 is urged to the extended position, preventing the roller 450 from being folded to a stowed position (FIG. 26D). By way of contrast, when the slat 230 is moved out of the magazine 228, the arm 452 is encouraged to move toward the stowed position in which the spring 254 is overcome, as illustrated in FIG. 26D.

In operation, the roller 450 cooperates with a ramped surface 456 on the slat 230. In this manner, the slat 230 is urged to an angled position (FIG. 26A) when being inserted into the magazine 228, which helps break the connection between the interlocking profiles of the adjacent slats. By way of contrast, as the slats 230 are moving out of the magazine 228 (sequentially FIG. 26B, then FIG. 26C), the slats 230 are in a generally horizontal orientation, which better enables the interlocking profiles to firmly interconnect and seat with respect to one another.

Figure 27A:
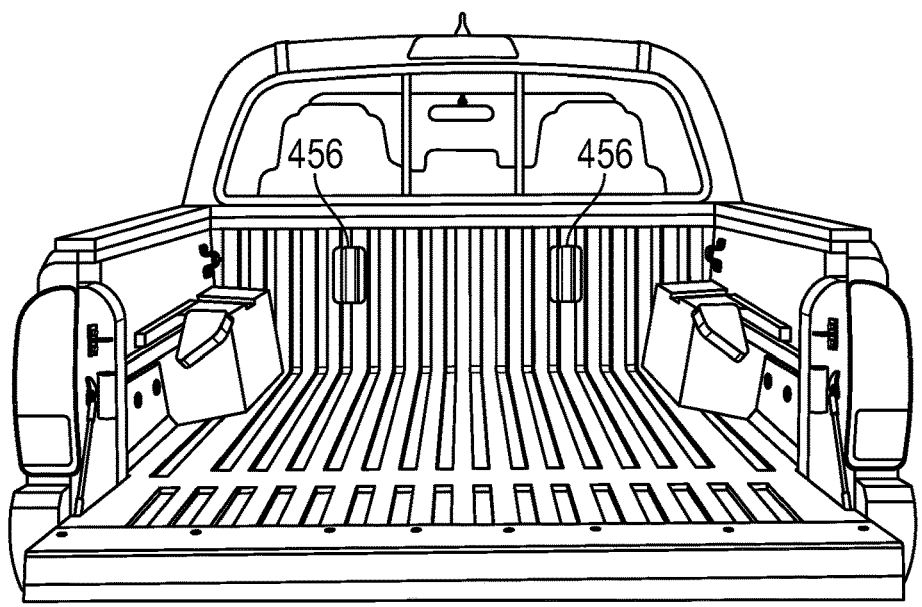
FIG. 27A illustrates mounting brackets for supporting the magazine within a truck bed.
Figure 27B:
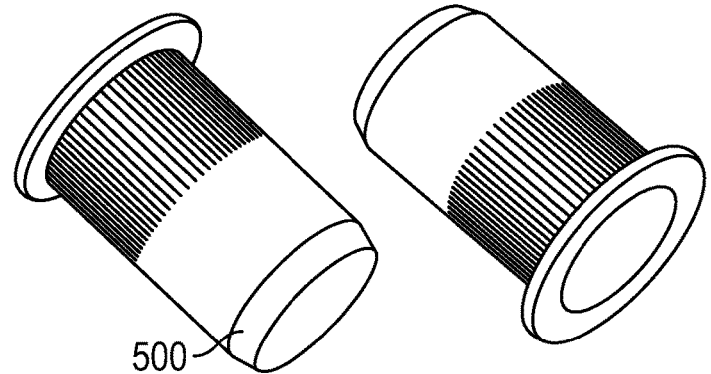
FIGS. 27B and 27C respectively illustrate rivet nuts and the mounting brackets.
Figure 27C:
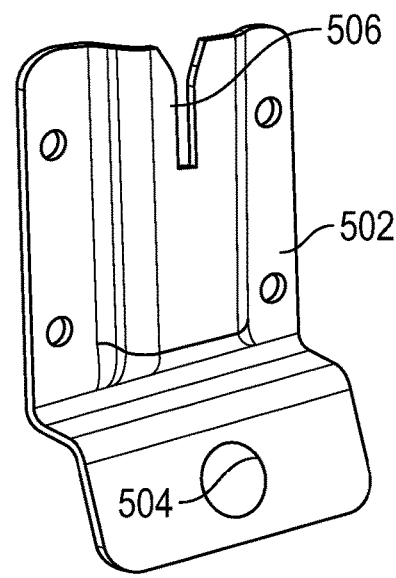
Figure 27D:
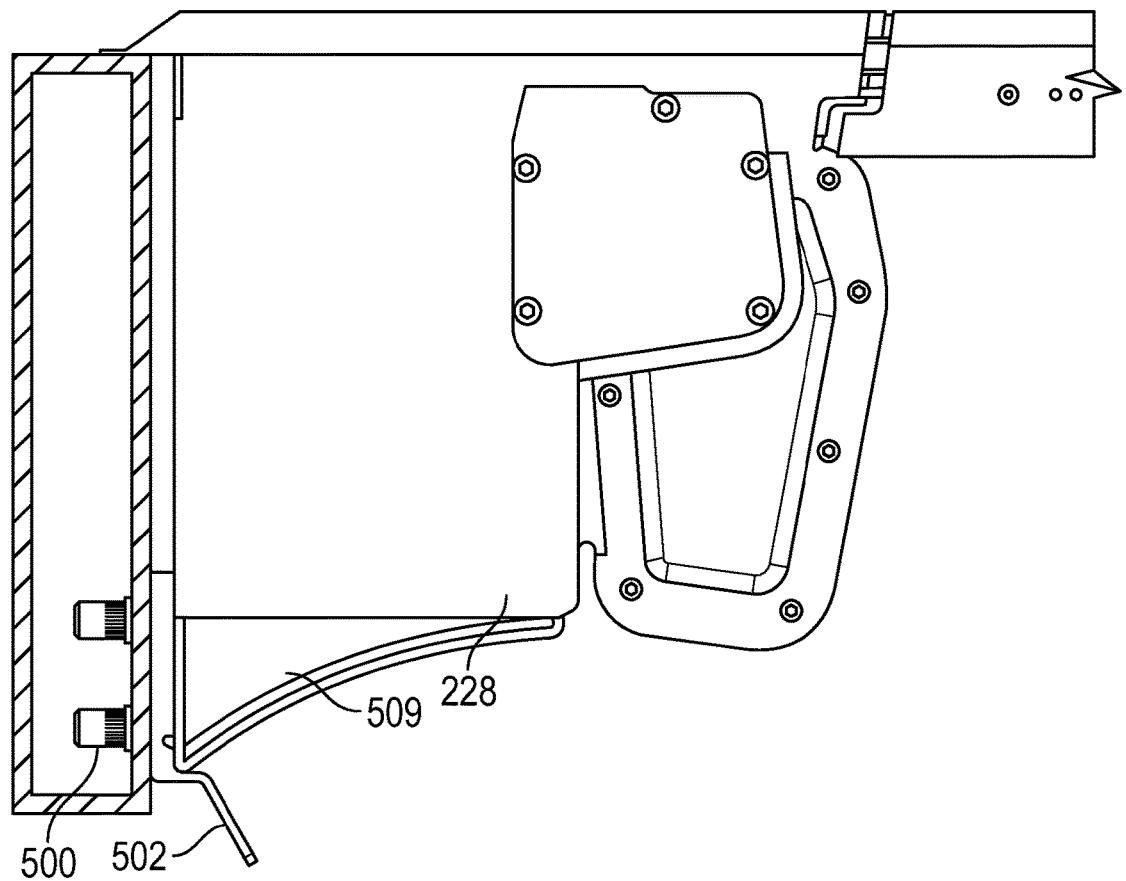
FIG. 27D illustrates an example magazine supported by the mounting brackets within the truck bed.
Figure 28:
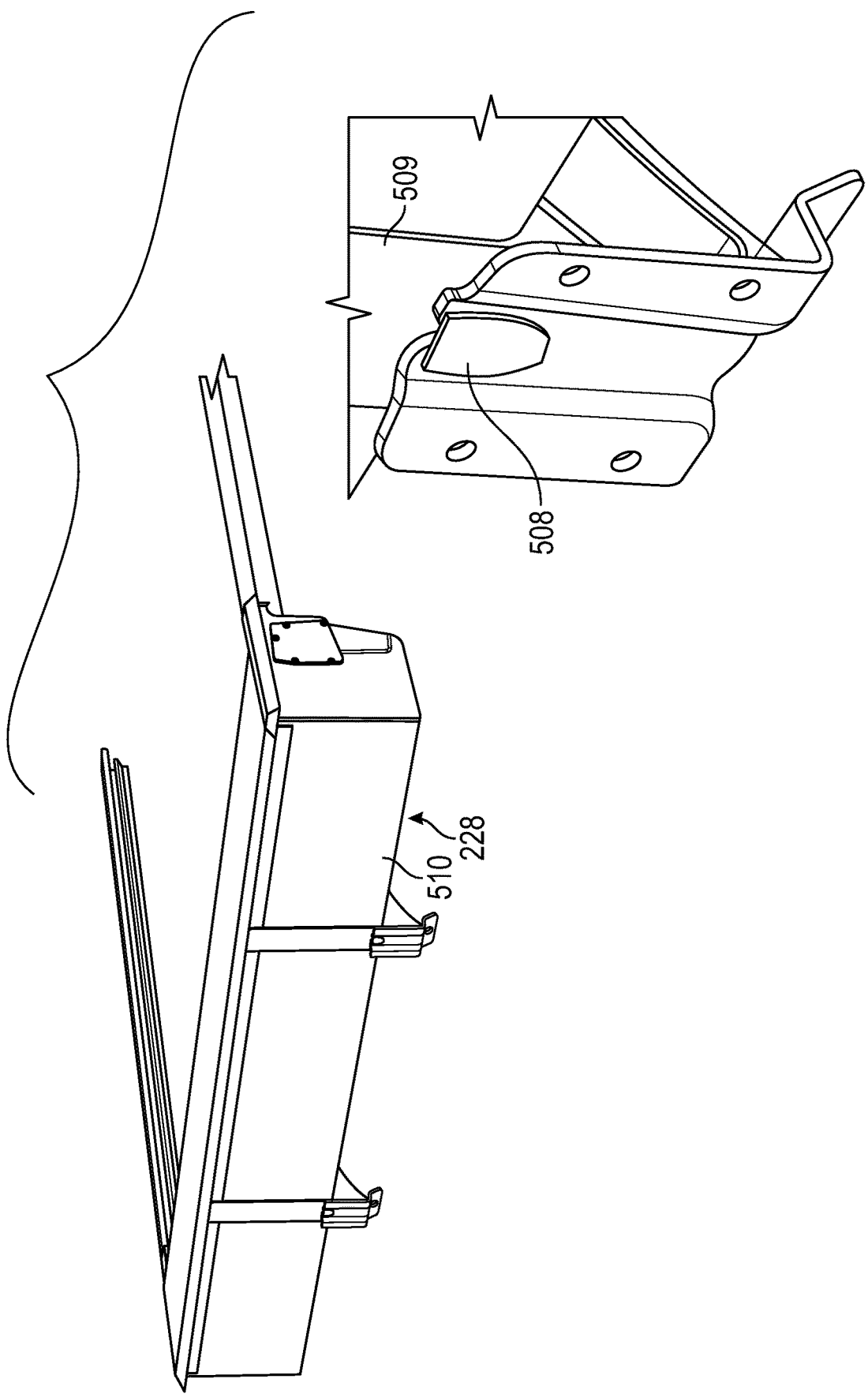
FIG. 28 are views illustrating the magazine supported by the mounting bracket.

Referring to FIGS. 27A-28, the magazine 228 may be mounted to a truck bed using brackets 502 secured to the truck bed with rivet nuts 500 (e.g., RIVNUTS). The brackets 502 may include an aperture 504 that may be used as tie-down. The brackets 502 include a slot 506 that receives a tab 508 extending from a bracket 509 on the magazine 228.

Figure 30A:
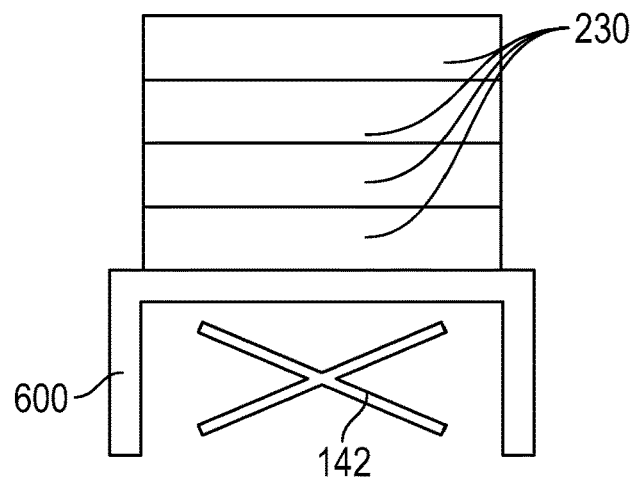
FIGS. 30A-30C depict a follower for supporting the slats within the magazine.
Figure 30B:
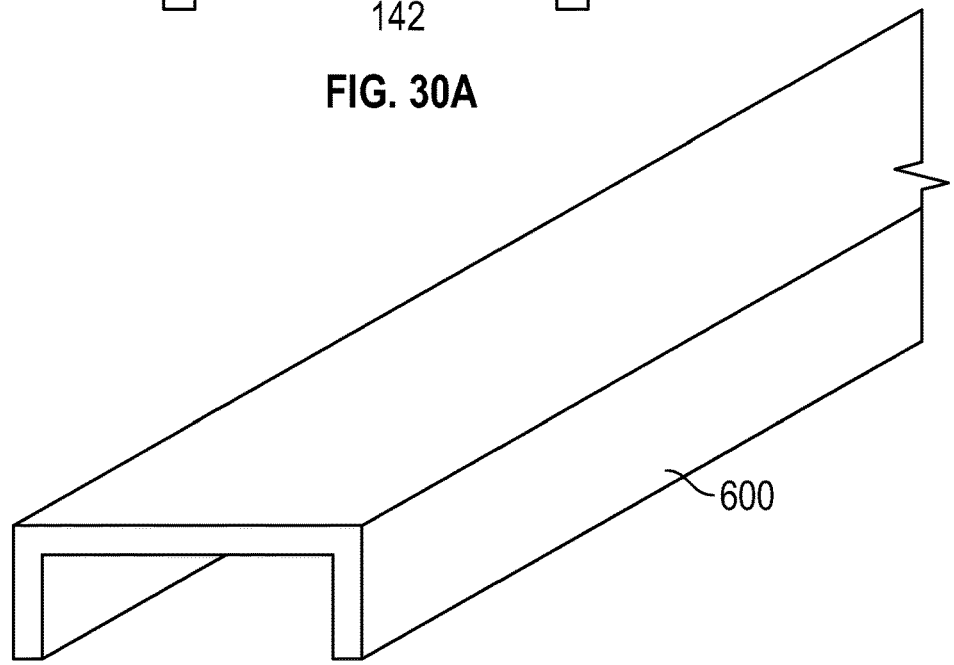
Figure 30C:
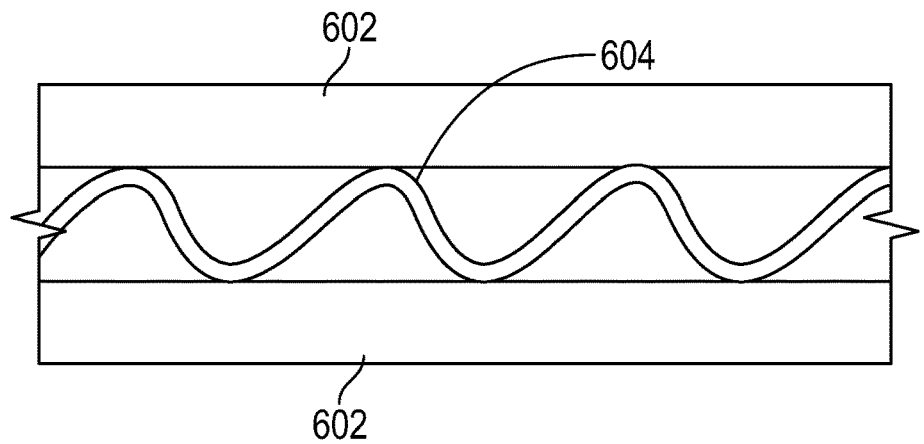

Referring to FIGS. 29A and 29B, light weight structures may be incorporated to reduce the overall weight of the cover system 220. An outer housing 510 of the magazine 228 may be provided by a plastic or AZDEL, as an example, (a polypropylene with 50% glass reinforcement) structure for light weight. For example, an access cover 244 also may be constructed from plastic or AZDEL and secured to the outer housing 510 by a living hinge 554. Of course, other materials may be used. A light weight follower 600 may also be used, as illustrated in FIGS. 30A-30C. The follower 600 supports the slats 230 and cooperates with the spring 342. The follower 600 may be provided by a light weight structure comprising outer walls 602 interconnected by a corrugated element 604, for example, as shown in FIG. 30C.

Figure 31A:
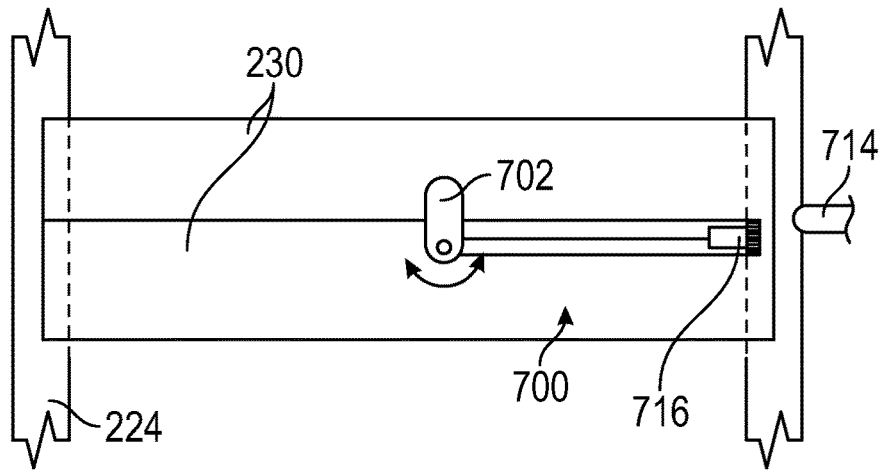
FIGS. 31A-31C respectively illustrate an example reinforcing mechanism for further securing the adjacent slats to one another.
Figure 31B:
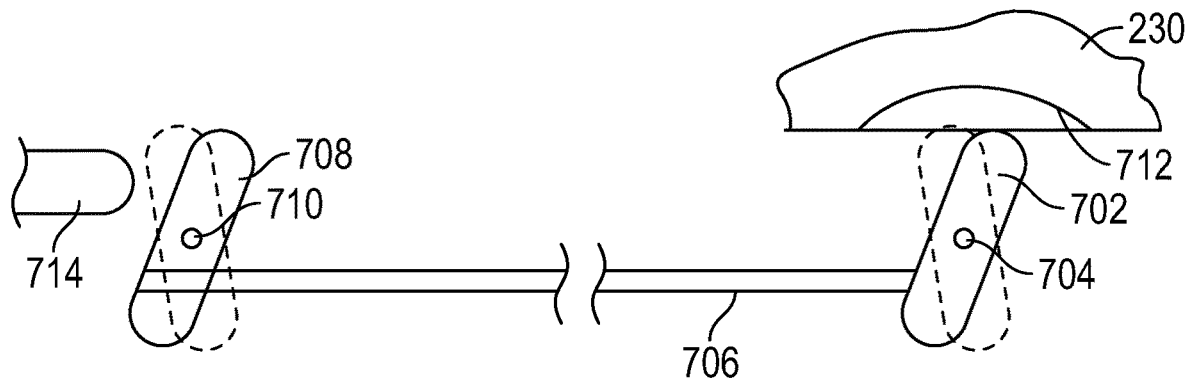
Figure 31C:
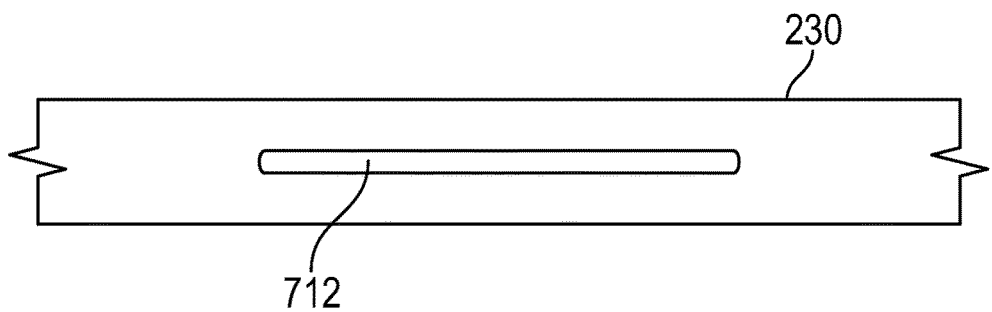

FIGS. 31A-31C illustrate a reinforcing mechanism 700 that interlocks the slats 230 to one another at or near the midpoint of the slats 230 between the rails 224. This better secures the slats 230 to one another so they cannot be decoupled from one another when a large load is applied to the slats, which provides improved security and structural integrity of the cover.

In one example, a cam 702 is rotatable about a pivot point 704. The cam 702 is connected to a lever 708 by a rod 706. The cam 702 moves into and out of engagement with a slot 712 in the adjacent slat 230 to selectively lock and unlock adjacent slats 230 to one another. The lever 704 is actuated by an element 714 arranged in the track 224, for example, and that cooperates with the lever 708 to rotate it about a pivot point 710. In one example, the element 714 is a magnet that cooperates with the lever 708 as it passes the element 714 along the rail 224. In another example, the element 714 be a ramped surface that may engage the lever 708 or an end of the rod 706. A spring 716 biases the cam 702 to an unlocked position.

Figure 32:
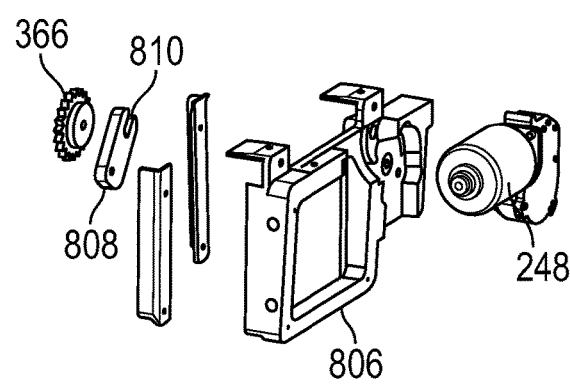
FIG. 32 illustrates another example release mechanism.

Another example release mechanism is shown in FIG. 32. The release mechanism includes a spacer 808 configured to maintain the first gear 366 in the coupled position with the gear 274 (FIG. 32A). The spacer 808 includes a slot 810 configured to receive the drive shaft 348 (FIG. 4B) of the motor 248 in an installed position. The slot 810 enables the spacer 808 to be slidingly removed away from the drive shaft 348 to an uninstalled position. Once the spacer 808 is manually removed, the first gear 366 can be manually moved axially toward the end cap 806 to the decoupled position in which the first gear 366 occupies the location wherein the spacer 808 was when in the installed position.

Figure 33:
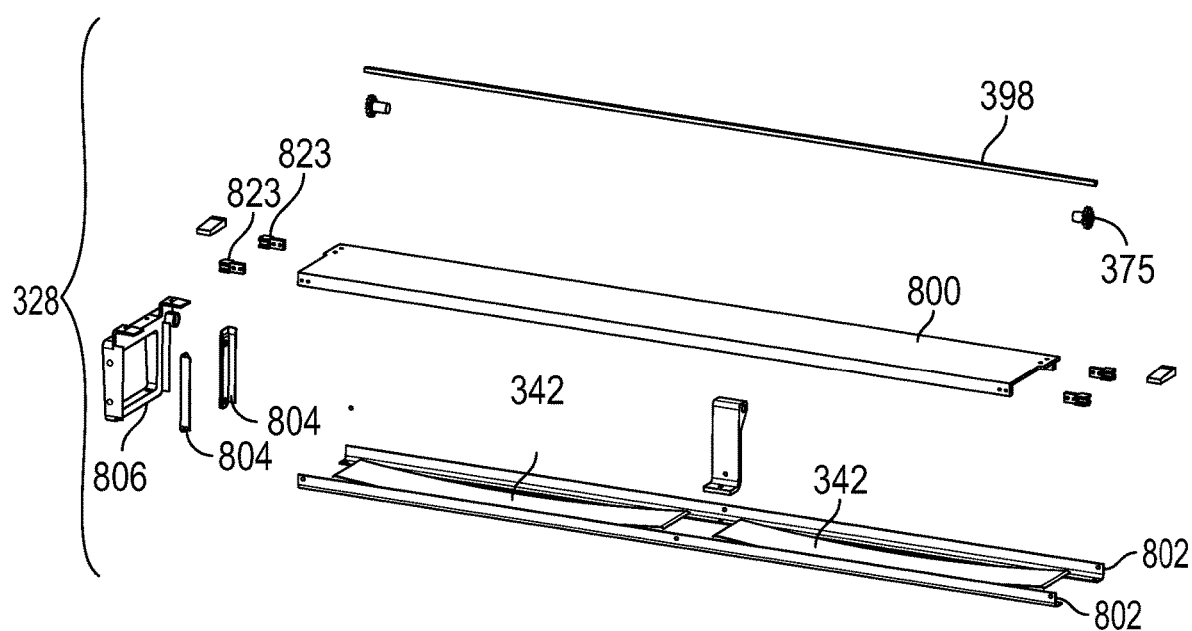
FIG. 33 depicts another example magazine.

FIG. 33 illustrates a simplified magazine 328, which may be suitable for inserting into an enclosed truck bed cavity. The rod 398 and its second gears 375 are supported for rotation between end caps 806. Rails 802 are secured between the end caps 806. Clamps (not shown) secure the center of each leaf spring 342 to the rails 802. The follower 800 supports the slats 230 and is arranged on top of the leaf springs 342, although the follower 800 is shown below the leaf springs 342 for clarity. Vertical slides 804 are mounted to the end caps 806 to provide low friction sliding surfaces for the slats 230.

Figure 34:
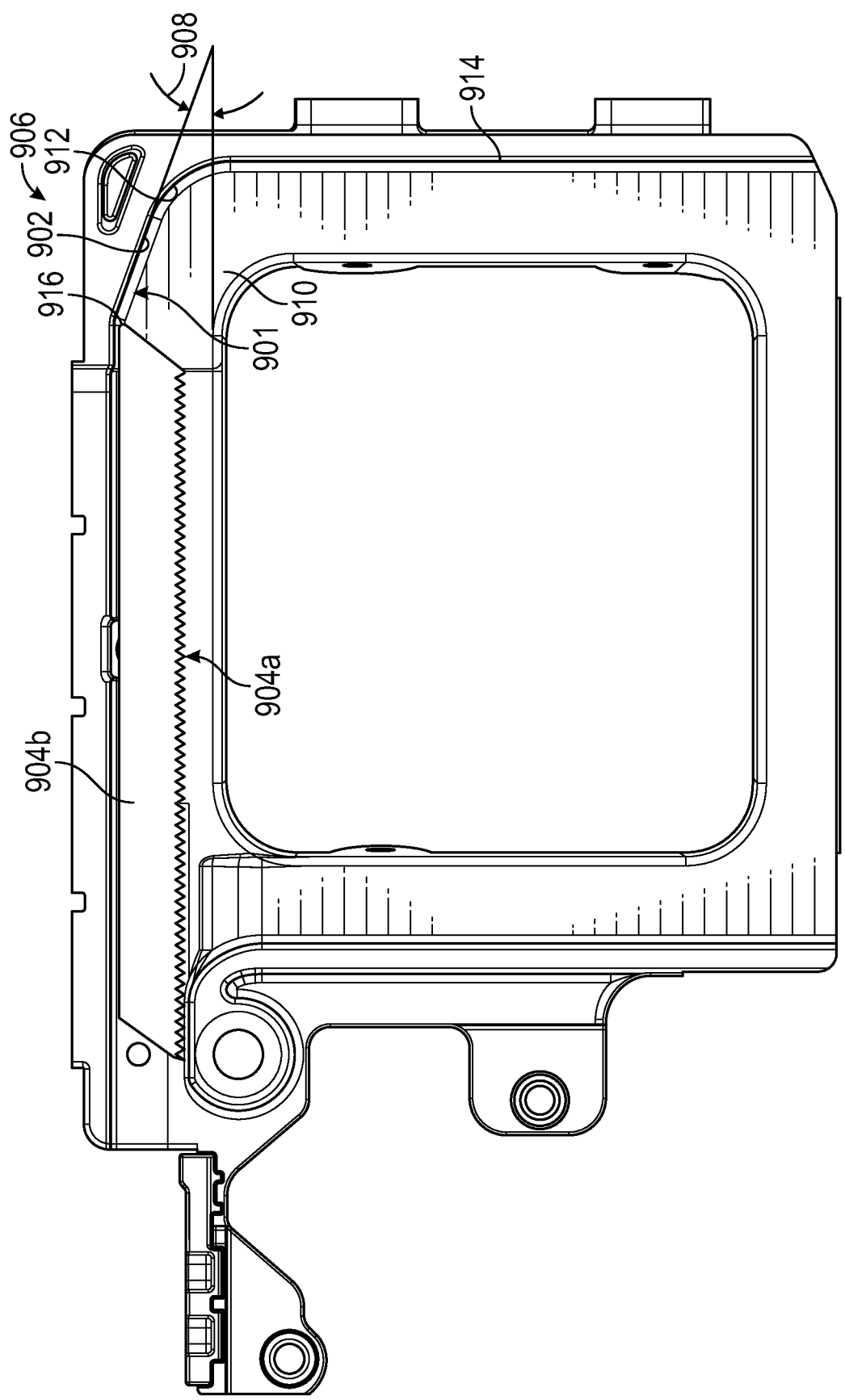
FIG. 34 is a side view of an end cap of a magazine that has a slat orientating mechanism.

As shown in FIG. 17-21B, the slats 30 must be decoupled from one another as they are stowed the magazine. The end of the slat farthest in the magazine is driven downward to tilt the uppermost slat within the magazine, as best shown in FIG. 21A. A ramp 154 is provided as the slat orienting mechanism 101 in that configuration. Another slat orienting mechanism 401 is illustrated in FIGS. 26A-26D. Turning to FIG. 34, the slat orienting mechanism 901 is provided by a ramped surface 902 that is more shallow than the ramp 154 of FIG. 21A. The end cap 904B of the slat mechanism 104A has a lateral edge 916 that slides downward along the ramped surface 902. A gentle radius 912 adjoins the ramped surface 902 and the back wall 914 to gently transition the aft end of the slat 902 into the magazine. The ramped surface 902 is at an acute angle 908 with respect to a slat width direction 910 that corresponds to the travel direction of the slats along the guide rails into the magazine.

A similar spring arrangement to that depicted in FIGS. 5 and 33 is shown in more detail in FIG. 35. Bumpers 823 are secured to the follower 800'. The bumpers 823 ride along the vertical slides 804 (FIG. 33). Here, the follower 800' is a multi-piece component to reduce weight. One end of each of the arcuate springs 142 contacts the follower 800'. The follower 800' is arranged between the springs 142 and the bottommost slat such that the follower moves upward within the magazine housing with bottommost slat. Each spring 142 is secured to the floor of the magazine by a retainer 144. The other end of the spring opposite the end engaging the follower 800' is spaced from the follower when the follower is fully raised with respect to the floor of the magazine. As additional slats are inserted into the magazine in the stowed configuration, the free ends of the springs 142 engage the follower to provide additional upward supportive spring force.

Figure 36B:
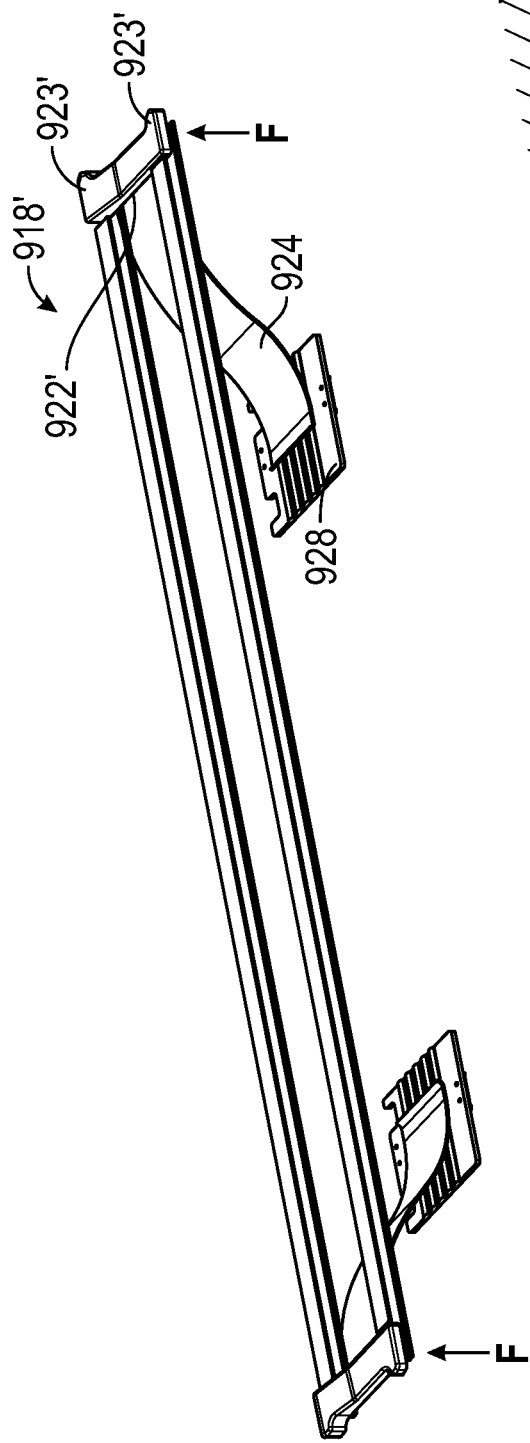
FIG. 36B is a perspective view of the spring arrangement shown in FIG. 36A.
Figure 36C:
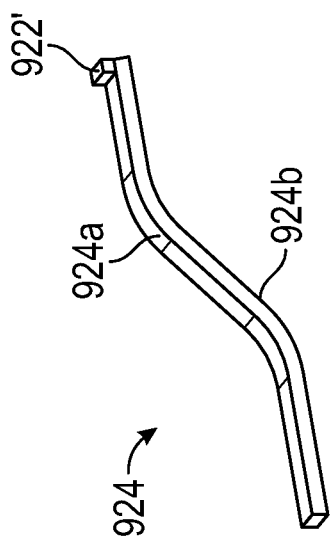
FIG. 36C is a schematic view a spring arrangement shown in FIG. 36B.

Referring to FIG. 36A, another spring arrangement is illustrated. Follower 918 includes lateral rails 920 joined to one another by braces 922. The braces 922 support bumpers 923 that engage vertical slides shown in FIGS. 11A-11C. In this arrangement, an end of the springs 924 are secured to the follower 918. The opposing ends of the springs 924 slide along a low friction surface 928 supported on the floor 926 of the magazine housing. An alternative arrangement shown in FIG. 36B in which the brace 922' and bumpers 923' are provided as a unitary structure to join the rails of the follower 918' to one another. The bumpers 923' provide a plastic ramp at the aft end of the follower 918' that is used to help set the angle of the slats while stowed in the magazine. The angle helps with the engagement when the slats are being deployed. The rails are connected with the metal block, or brace 922', over which the is arranged. The spring 924 is secured to the brace 922', best shown in FIG. 36A. As shown in FIG. 36C, each spring 924 is provided by at least two leaf springs 924a, 924b overlapping one another. This configuration keeps the spring within its elasticity characteristics during operation as the spring flattens when the slats are fully stowed within the magazine.

Figure 37:
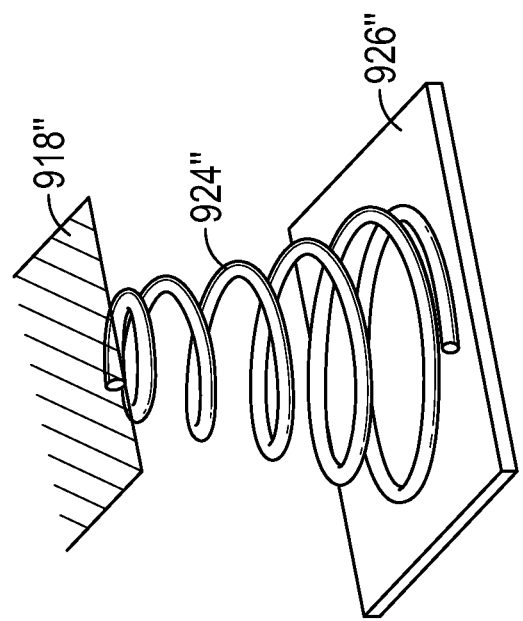
FIG. 37 illustrates a portion of another spring arrangement for the supporting slats.

Still another spring arrangement is shown in FIG. 37. This arrangement utilizes conical springs 924" arranged between the follower 918" and the floor 926". This arrangement may be suitable for cover systems having much lighter usage, such as for interior cargo applications such as the one illustrated in FIG. 47A-49. The spring 924" can nest compactly, which is useful where tight packaging is needed. Multiple conical springs can be provided to support the follower 918", as needed.

Figure 38A:
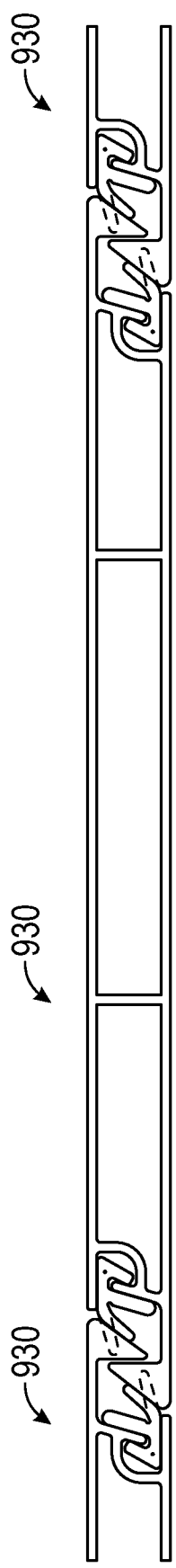
FIGS. 38A and 38B illustrate a sealing arrangement between the slats of one example cover.
Figure 38B:
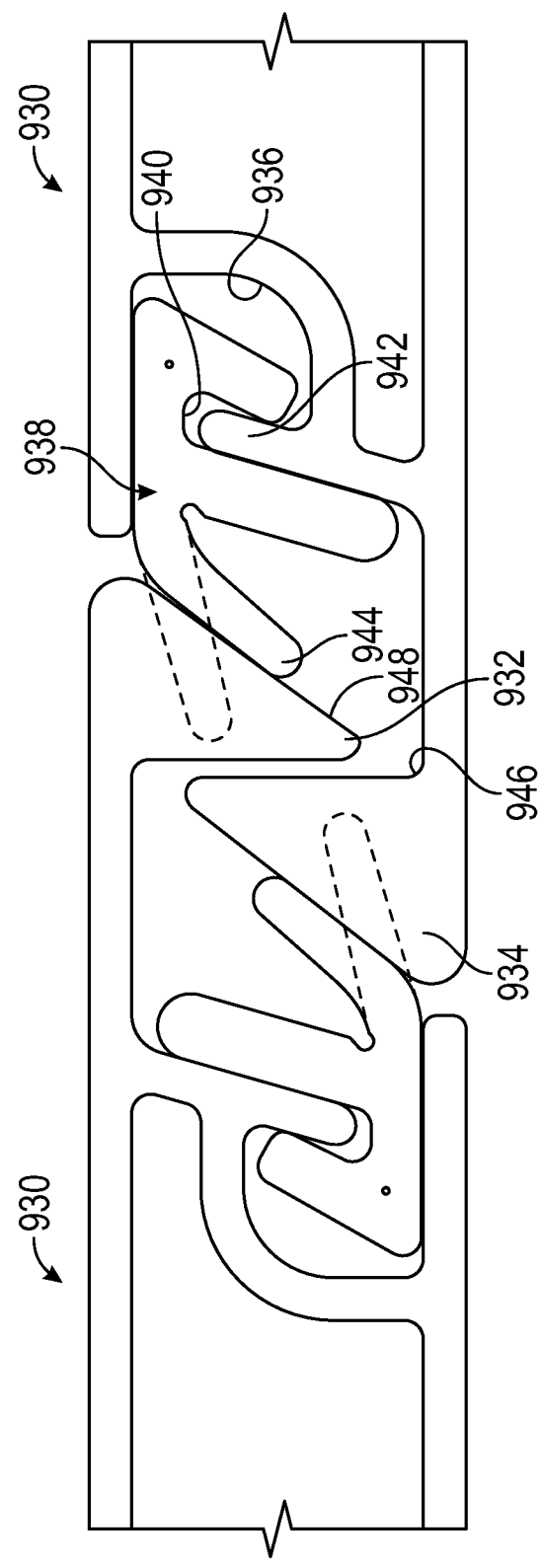
Figure 44:
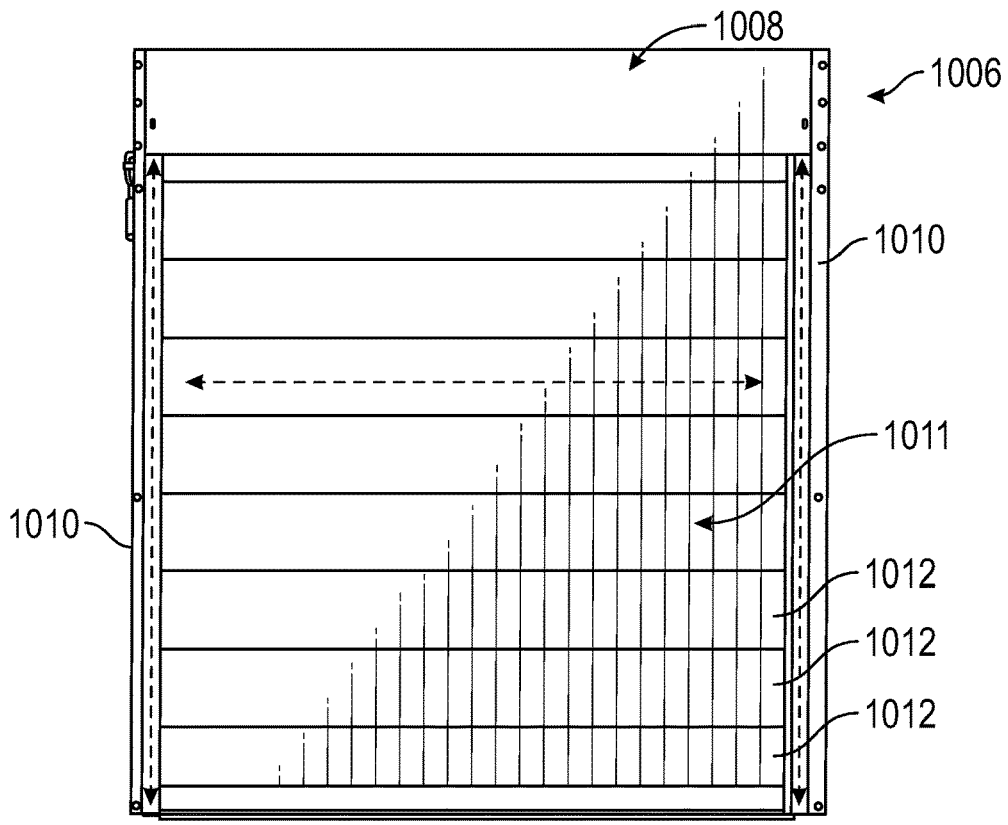
FIG. 44 is an elevational view of a cover system schematically depicting water management.
Figure 45:
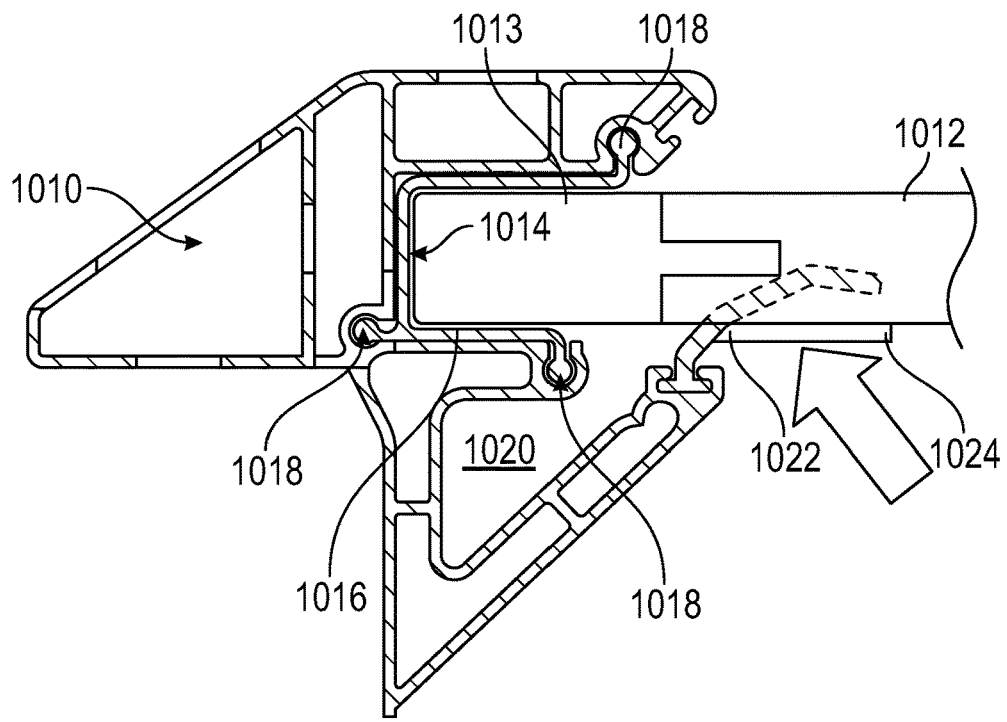
FIG. 45 is a cross-sectional view to a rail illustrating an example water management system.
Figure 46:
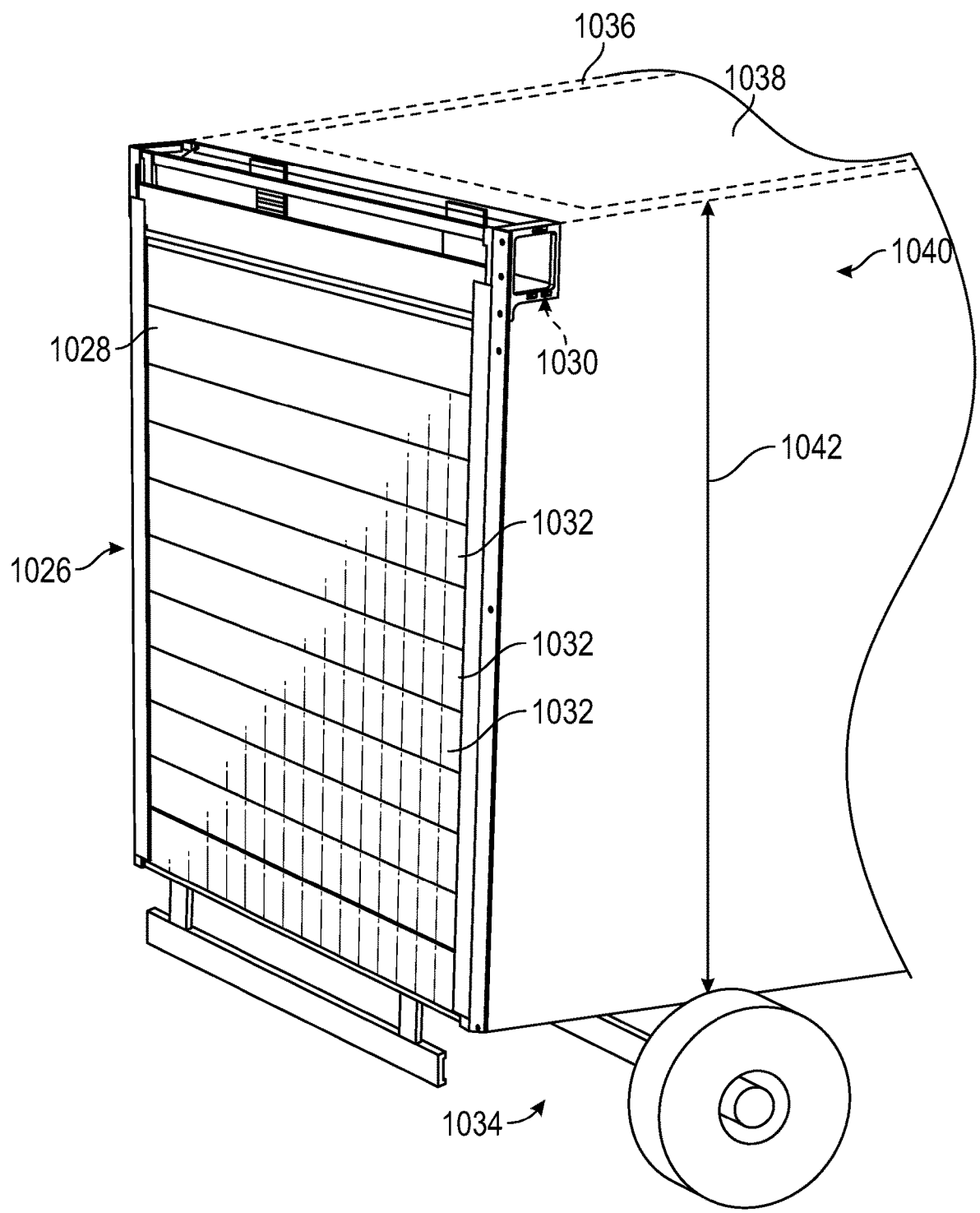
FIG. 46 depicts a cover system for use in an enclosed cargo area of a truck.
Figure 47A:
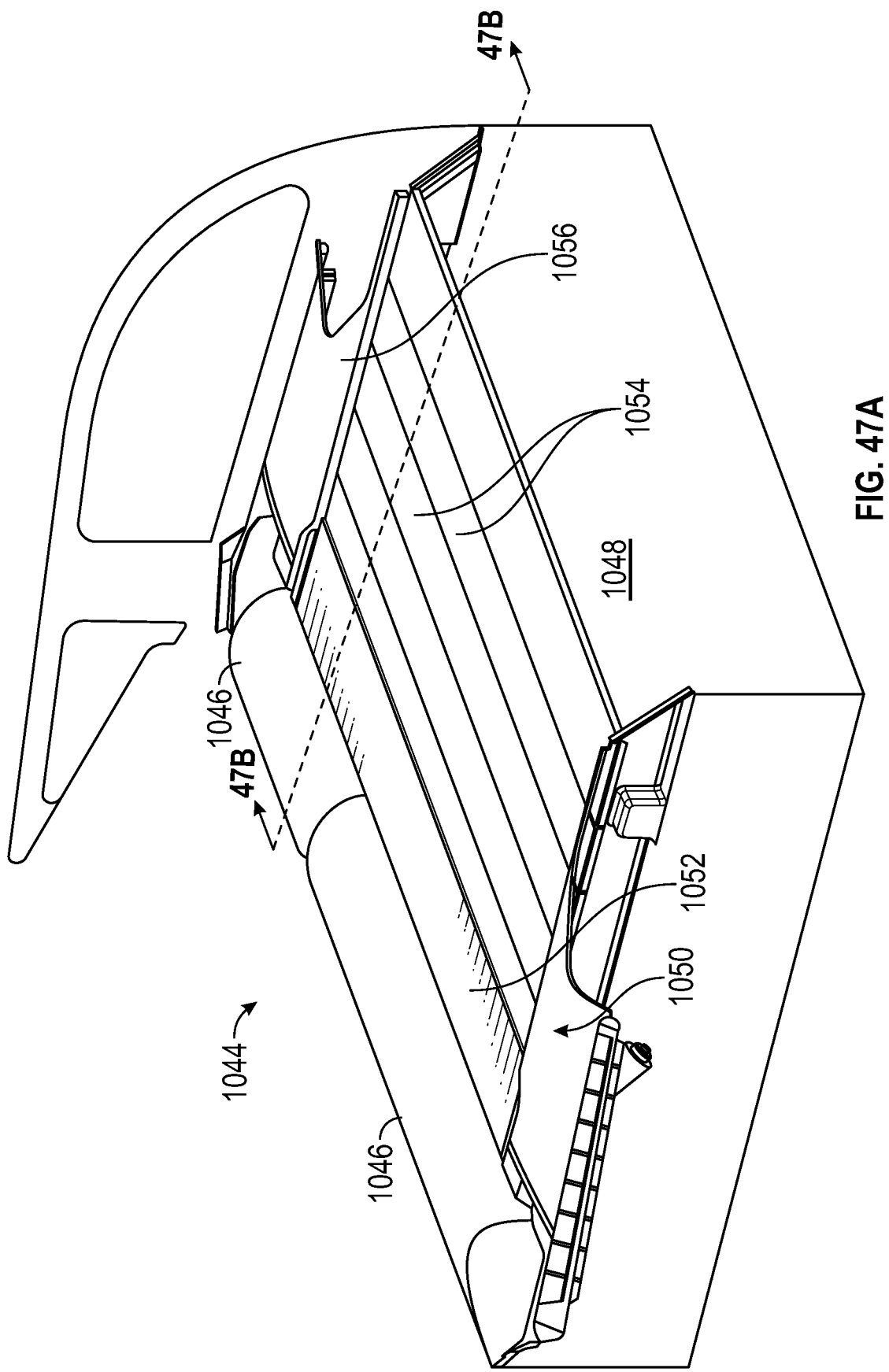
FIG. 47A schematically illustrates an interior rear view of an SUV with another cover system.
Figure 47B:
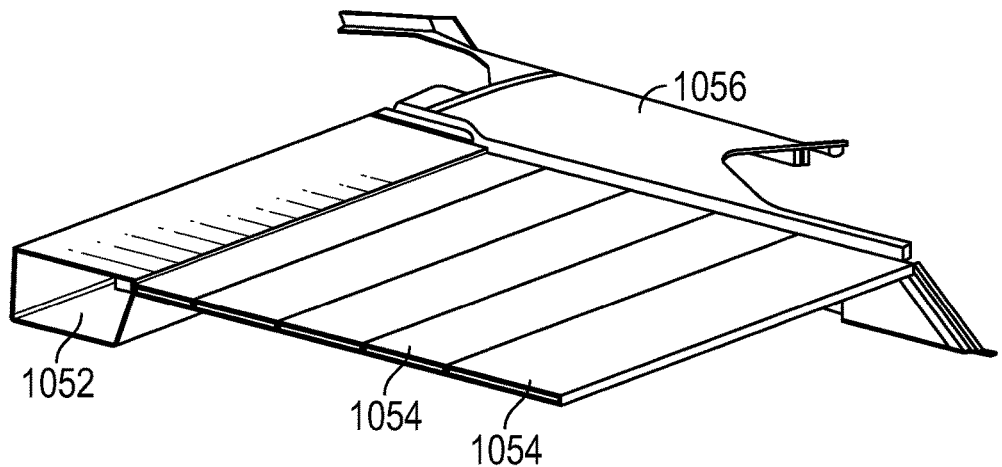
FIG. 47B is a cross-sectional view of the cover system shown in FIG. 47A taken along line 47B-47B.
Figure 47C:
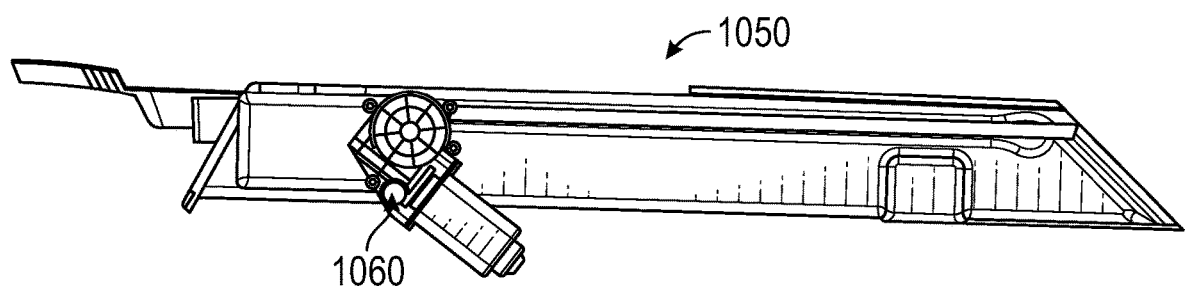
FIG. 47C illustrates a side view of the cover system shown in FIG. 47A.

One example slat sealing arrangement is illustrated in FIGS. 38A-38B. The slats 930 each include a first and second interlocking profiles 932, 934. Each of the slats 930 include a lateral groove 936 receiving a seal 938. A lateral slot 940 is provided in the seal 938 and receives a protrusion 942 from the slat 930. The seal 938 is generally F-shaped when in a relaxed, unsealed position (shown with a dashed line). A lip 944 of the seal 938 is forced inward by and against a face 948 of the first profile 932 when the slats 930 are joined to one another. In this configuration, the seal 938 has an E-shaped configuration and the channel 946 between the second profile 934 and the seal 938, which provides water management, is enclosed and sealed against water and debris However, if water does enter this channel 948, it may be directed to the guide rails for further water management as shown in FIG. 8 and FIGS. 44-45. Similarly, the same seal may be carried by the adjoining slat 930 to seal against the second profile 934.

Example end caps 950b are shown in FIGS. 39A-40B. The end cap 950b may be supported with respect to the slat body 950a in the manner similar to that shown in FIGS. 13A-13B, for example. In this example, the first profile 954 is provided as upwardly orientated triangular shape with a generally vertical wall on one side that cooperates with a generally downward vertically orientated flange providing the second profile 956 of the adjoining slat.

A first engagement area is provided between adjoining slat bodies 950a, and a second engagement area is provided between adjoining ends 950b of adjoining slats. A greater engagement is provided across the second engagement area than the first engagement area, that is, the driving force is transmitted primarily through the ends 950b rather than the slat bodies 950a. In one example, the first and second profiles 954, 956 are in direct engagement with one another when in the deployed configuration. This approach increases smoothness and quietness during operation. So, the adjoining slats are pushed and/or pulled via the complementary profiles provided by the ends 950a.

Figure 39A:
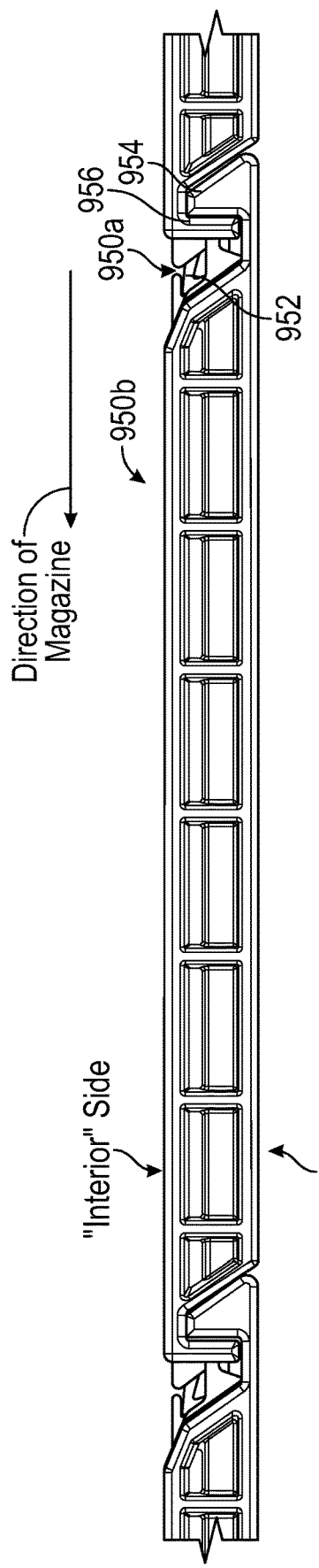
FIGS. 39A and 39B illustrate another example slat arrangement.
Figure 39B:
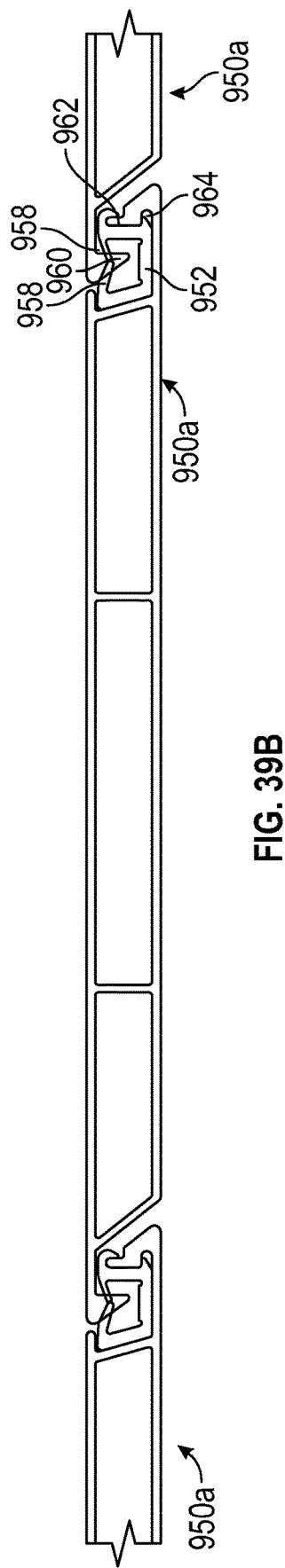

Referring to FIG. 39B, a seal 952 is provided between adjoining slat bodies 950a along the first engagement area. The slat 950a may include downwardly depending barb 960 received in a U-shaped seal 952 having opposing, inwardly canted lips 958 that seal against the barb 960 when the adjoin slats are removably coupled to one another. The seal 952 is secured by a J-shaped protrusion that forms a lateral groove 964 capturing a tab extending from the seal 952.

Figure 48:
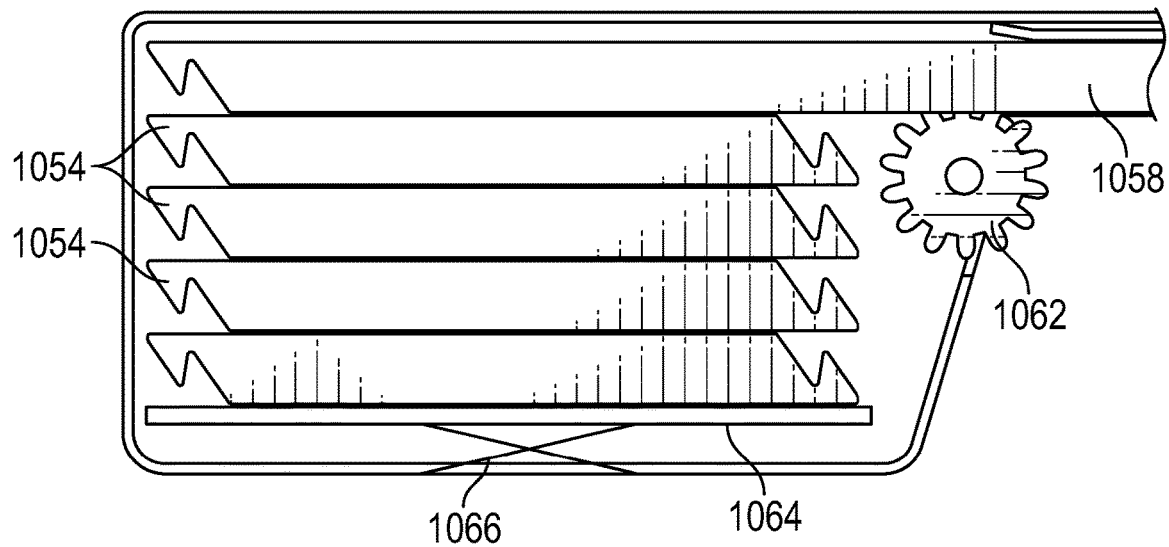
FIG. 48 illustrates a cross-sectional view of a magazine for the cover system shown in FIG. 47A-47B.
Figure 49:
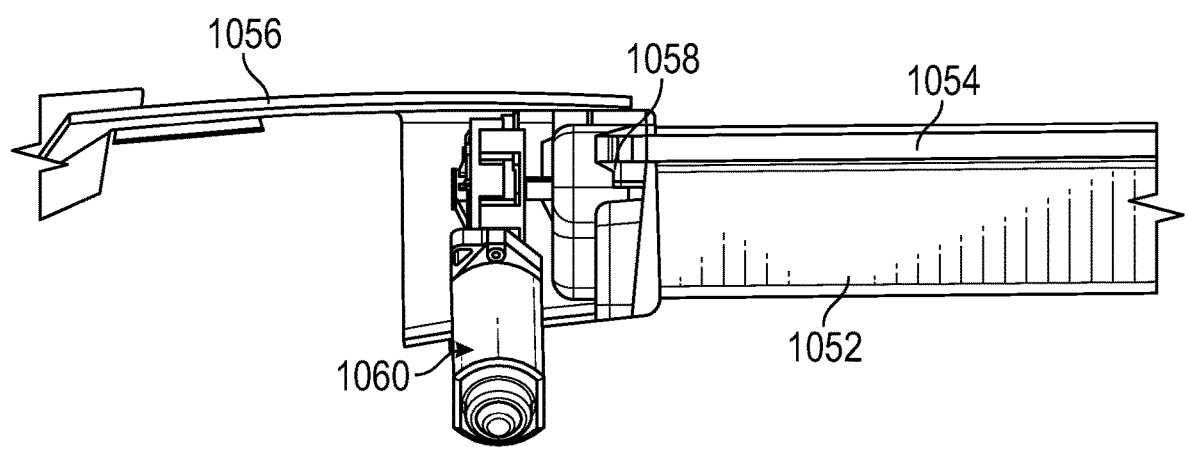
FIG. 49 depicts a rear view of the cover system shown in FIG. 47A.

Referring to FIG. 48, the protrusion 965 is configured to be received in the interior passage of the extruded slat, for example (at 86 in FIG. 13A). The second profile 956 includes a notch 963 that overlaps a portion of the adjoining end cap 950B above the portion of the end cap that has the teeth 951. As shown in FIGS. 39A-40B, the end caps 950b are used to lock the adjoining slats to one another and transmit the longitudinal driving forces from the drive assembly to the slats to the cover between the stowed and deployed configurations. The primary seal provided between the slats is accomplished by the slats 950A, while secondary sealing may be provided between the end caps 950B. Alternatively, no sealing may be provided between the end caps 950a, and in applications such as for interior use, no seals may be used whatsoever (see, e.g., FIGS. 47A-49).

Figure 41A:
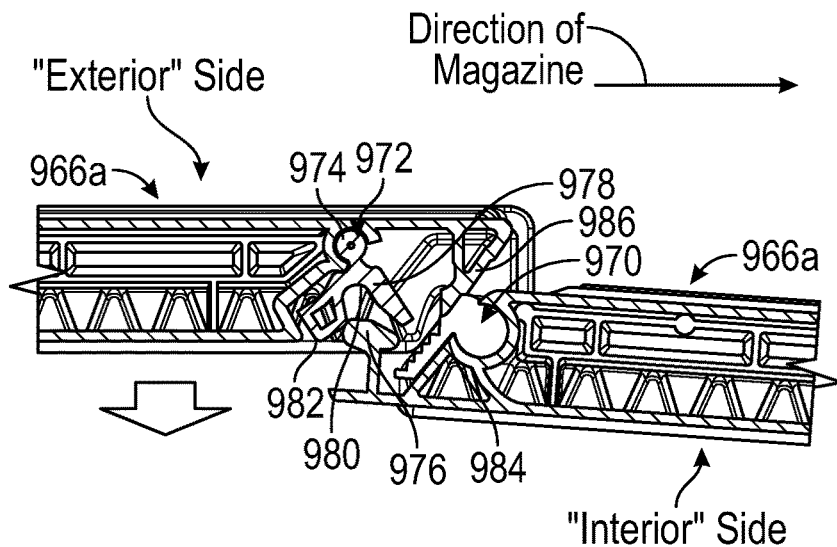
FIGS. 41A-41C depict another slat sealing arrangement with the slats shown in various stages of coupling.
Figure 41B:
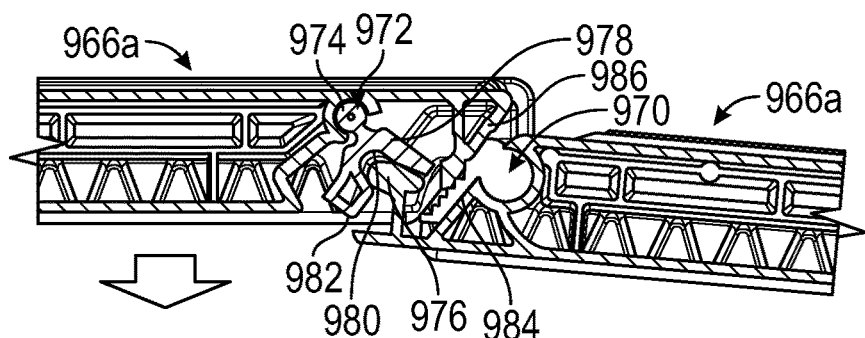
Figure 41C:
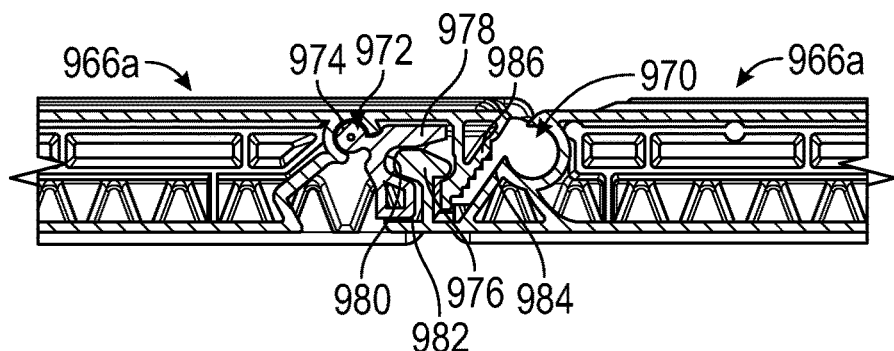

Another slat configuration is illustrated in FIGS. 41A-41C. In this configuration, first and second seals 970, 972 are provided on each of opposing sides between adjoining slats 966a. The first seal 970 is generally P-shaped with a bulb received in an arcuate channel in an omega-lock type configuration. A relatively flat arm 984 of the seal 970 is configured to seal against a face 986 of the adjoining profile of the other slat body 966a. The second seal 972 is configured like an inverted Y-shape with a bulb 974 pivotably received within a lateral slot. A protrusion extends upward in the orientation shown to a head 976. As the slats move from the position shown in FIG. 41A to the position shown in FIG. 41B, the head engages the lip 978 and rotates the second seal 972 upward so that the head 976 seats with respect to a channel 980 in the second seal 972. In this arrangement, a leg 982 of the second seal 972 is positioned beneath the head 976, capturing the head 976 between the lip 978 and the leg 982.

Figure 42A:
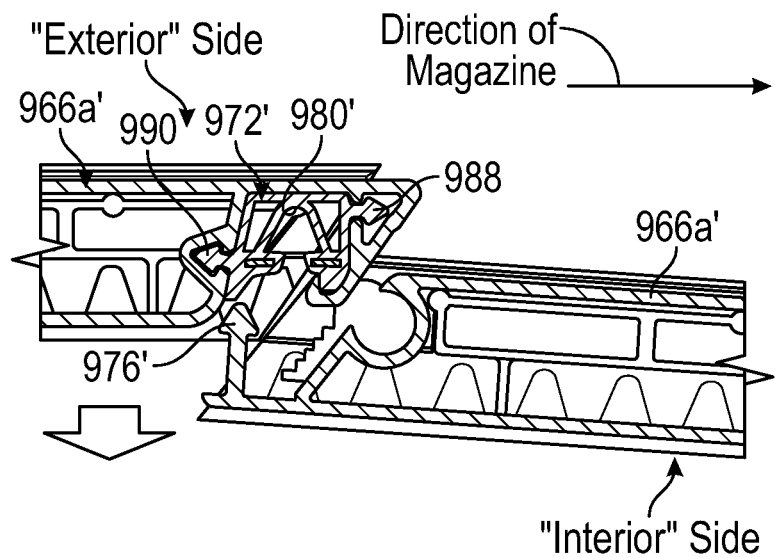
FIGS. 42A-42C depict another example sealing arrangement between the slats in various stages of coupling.
Figure 42B:
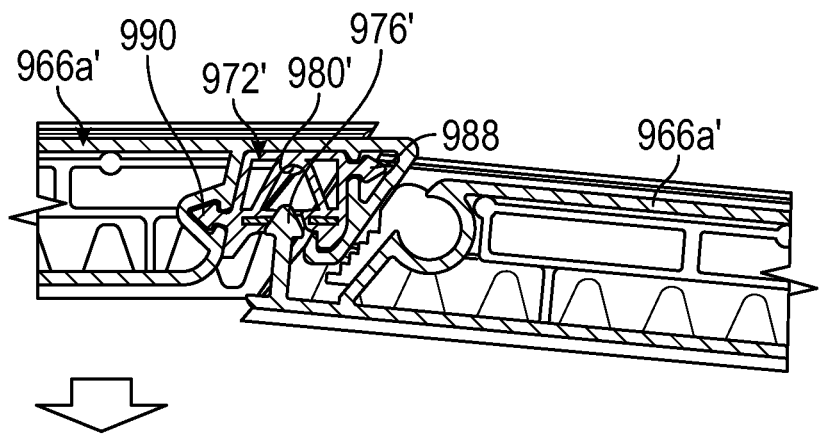
Figure 42C:
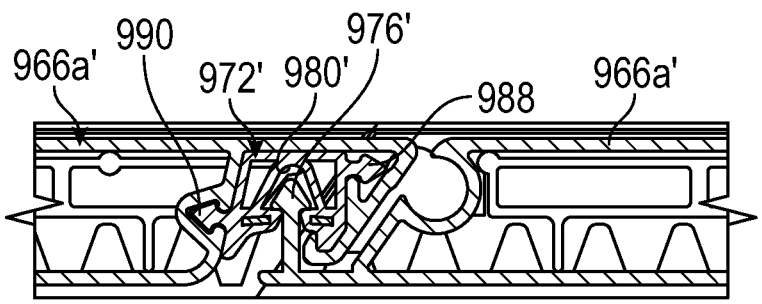

A somewhat similar sealing configuration is shown in FIGS. 42A-42C. In this arrangement, the second seal 972" is fixed within a channel of its supporting slat 966a" by barbs 988 and 990. The head 976' on the protrusion from the other slat is received within a triangular recess 980' of the second seal 972'.

Figure 43A:
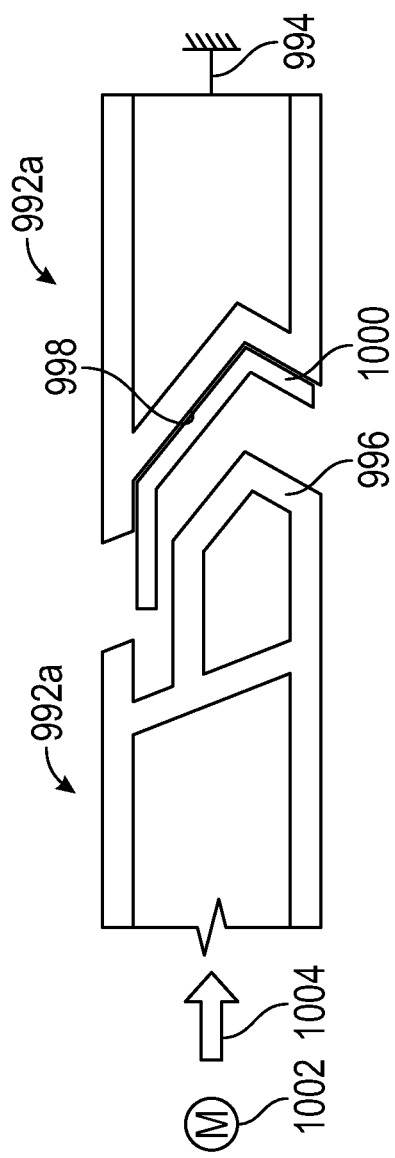
FIGS. 43A and 43B illustrate another slat sealing arrangement using a wedge configuration.
Figure 43B:
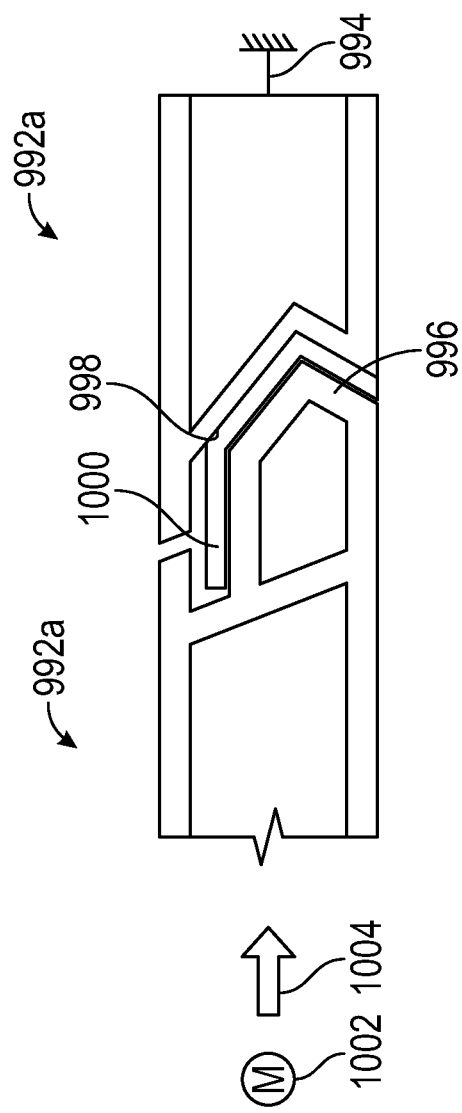

Still another sealing arrangement between slats is illustrated in FIGS. 43A-43B. In this configuration, the slats 992a are relatively loose with respect to one another until they are forced longitudinally together in the fully deployed position. In this arrangement, the adjoining slats 992a wedge against one another, much like a storm shutters. A seal 1000 is provided between complementary shaped wedge profiles 996, 998. The slats 992a are shown in a position in which they are not fully deployed in FIG. 43A. The slats 992a are driven against a stop 994 by a motor 1002 under a force 1004. The slats 992a will continue to be driven to one another until they are wedged against one another to provide a good seal as shown in FIG. 43B.

Water management for the cover system 1006 disclosed is schematically shown in FIG. 44 by the dashed arrowed lines. Generally, the water flows laterally outward from the adjoining slats 1012 of the cover 1011, and then along the guide rails 1010. As shown in FIG. 45, the guide rails 1010 each provide a track 1014 that receives the end caps 1013 for sliding longitudinal travel. A low friction inset 1016 may be arranged within the track 1014 and secured with respect to the guide rail 1010 by interlocking features 1018, which may be multiple omega-locks. A water channel 1020 may be provided beneath slats 1012 and adjoining the tracks 1014. In one example, a suitable cross-sectional area of the water channel 1020 may be at least 1.25 cm$^2$, which is sufficient to handle the amount of water during heavy rainfall during use. A seal 1022 may be arranged beneath the slats 1012 and adjoining the water channel 1020 to prevent ingress of water from the water channel 1020 into the cargo area of the vehicle. The seal 1022 provides a lip 1024 that seals the underside of the cover 1011.

The cover system 1026 may be oriented in a manner different than shown in FIGS. 1-3 for other applications. One such example is for cargo vans or delivery trucks. In such an application, the cover 1028 is arranged generally vertically and the magazine 1030 is arranged at an upper corner of a roof 1036 adjoining the rear opening of the truck 1034. A typical roof 1036 of a delivery truck includes a large translucent or transparent roof panel 1038 (i.e., non-opaque) that permits natural light to illuminate the cargo area 1040. With the disclosed cover system 1026, the slats 1032 will not substantially obstruct this panel 1038 when the cover 1028 is fully stowed (i.e., at least 80% of the panel is unobstructed), unlike the typical rollup doors used in such applications. Additionally, the fully stowed cover 1028 provides maximum package height 1042 as the cover does not impinge upon the cargo area 1040.

Another example cover system 1050, as shown in FIGS. 47A-49, is for vehicle interiors 1044 such as an SUV. In a typical arrangement, the cover system 1050 is provided behind rear seats 1046 in a cargo area 1048. The cover system provides privacy and security for anything in the cargo area 1048 and may provide a surface on which to place additional packages within the vehicle. Referring to FIGS. 47A-49, the cover system 1050 includes a magazine 1052 located adjacent to the rear seats 1046 for receiving the slats 1054 in the stowed position. The trim panels 1056 may be arranged on either side of the cover above the rails 1058 near the rear side glass to provide a finished, aesthetic appearance. A simple drive assembly 1060 moves the slats 1054 between the stowed and deployed configurations. The drive assembly 1060 may use one or more gears 1062. A follower 1064 and one or more springs 1066 support the slats 1054 in a configuration similar to that shown in FIG. 34, if desired. This can be a manual system without any motorized operation, if desired.

Figure 50A:
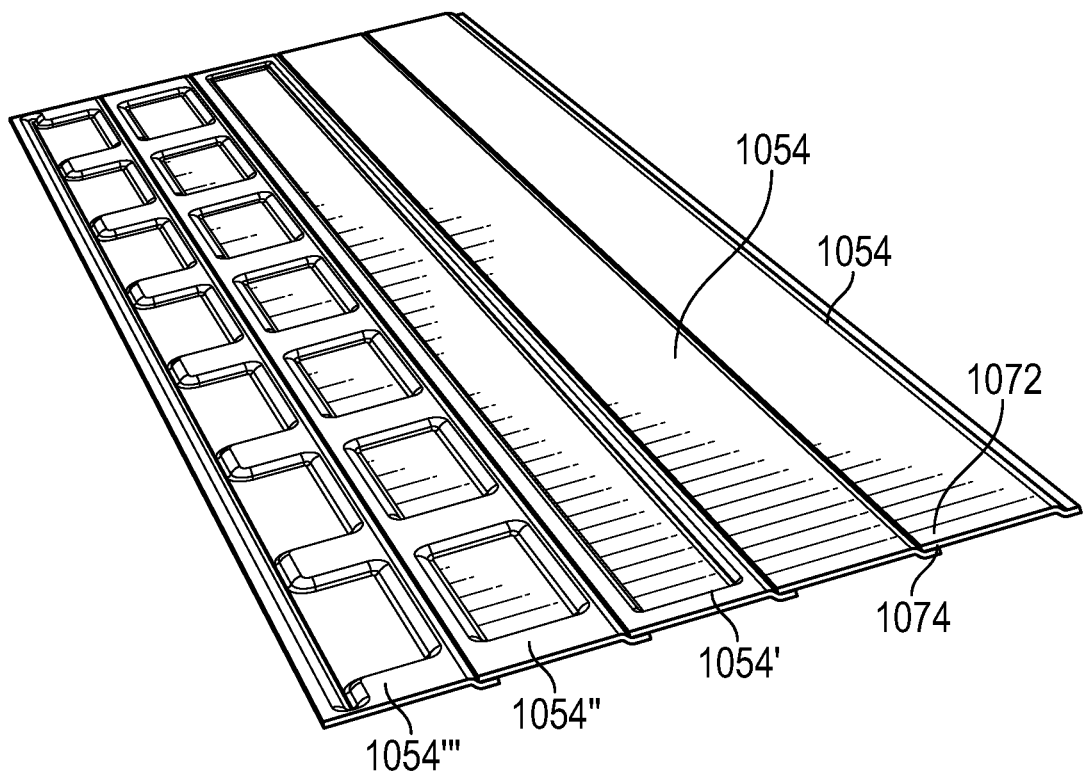
FIG. 50A illustrates multiple example slats for use in an interior cover system.
Figure 50B:
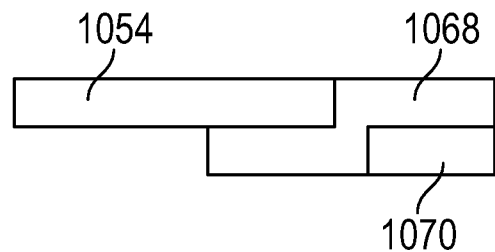
FIG. 50B schematically illustrates a slat secured to an end cap.

Multiple example slat configurations are shown in FIG. 50A. In this type of arrangement, seals may not be provided between the slats for an interior application. The adjoining slats may include simple first and second overlapping edges 1072, 1074. The slats 1054 may include reinforcing ribs similar to those slats 1054', 1054", 1054''' or any other suitable type of reinforcing rib. A plastic or composite material may be used for the slats. With this type of slat 1054, the end caps 1068 having teeth 1070 may be glued, stapled, or otherwise secured to the slat 1054.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A retractable cover system comprising:
    laterally spaced apart guide rails defining an opening and each providing a track;
    a drive assembly;
    a cover has multiple slats configured to interlock with one another in a deployed configuration, the slats cooperating with the drive assembly and slidable in the tracks between first and second positions within the opening in response to actuation of the drive assembly, the slats stacked onto one another in a stowed configuration;
    a follower supporting the slats; and
    a spring-biased pulley system configured to cooperate with the follower and bias the slats toward the tracks.

2. The retractable cover system of claim 1, comprising a leaf spring arranged beneath the follower and configured to assist the pulley system in biasing the slats toward the tracks.

3. The retractable cover system of claim 1, comprising a shaft that extends laterally along a rotational axis, the shaft includes a gear arranged at its opposing ends, wherein each slat includes an end with teeth that cooperate with the gear.

4. The retractable cover system of claim 3, comprising a motor operatively coupled to the shaft, the motor configured to rotationally drive the shaft about the rotational axis to move the slats between the deployed and stowed configurations.

5. The retractable cover system of claim 3, wherein the pulley system includes a cable configured to wrap and unwrap about the rotational axis during operation of the retractable cover system.

6. The retractable cover system of claim 3, wherein the pulley system includes a pulley coaxial with the shaft, the pulley system includes a cable cooperating with the pulley and configured to rotate the pulley about the rotational axis during operation of the retractable cover system.

7. The retractable cover system of claim 1, wherein the pulley system includes a cable with a spring tensioner.

8. The retractable cover system of claim 7, wherein the spring tensioner is a torsion spring arranged at one end of the cable.

9. The retractable cover system of claim 7, wherein the multiple slats includes first and second slats, the first slat above and adjacent to the second slat in the stowed configuration, the first slat in a horizontally overlapping orientation with the second slat in a first position, and the first slat in a horizontally planar and interlocked orientation with the second slat in a second position, wherein the spring tensioner is configured to decrease a cable tension in the cable when the first and second slats transition from the first position to the second position and increase the cable tension when the first and second slats transition from the second position to the first position.

10. The retractable cover system of claim 1, wherein the follower includes first and second sides, and pulley system includes a pair of spaced apart cables, each cable extending between the first and second sides to support the follower.

11. The retractable cover system of claim 10, comprising first and second pulleys respectively arranged at the first and second sides at each of the lateral ends of the follower.

12. The retractable cover system of claim 1, wherein the follower includes first and second sides, and pulley system includes first and second cables respectively arranged at the first and second sides at each of the lateral ends of the follower, the first and second cables wound and unwound in response to operation of the retractable cover system.

13. The retractable cover system of claim 1, wherein the pulley system includes an idler pulley operatively mounted to a magazine housing the slats in the stowed configuration, the idler pulley spaced from the follower, and a cable cooperating with the idler pulley and extending to the follower.

14. The retractable cover system of claim 1, wherein the pulley system includes an idler pulley mounted to the follower, and a cable cooperating with the idler pulley.

15. The retractable cover system of claim 1, wherein each of the slats include inner and outer surfaces, all of the outer surfaces face one direction, and all of the inner surface face another direction opposite the one direction.

16. A method of operating a retractable cover system, the method comprising:
    providing a cover system including:

laterally spaced apart guide rails defining an opening and each providing a track;

a cover has multiple slats configured to interlock with one another in a deployed configuration, the slats cooperating with the drive assembly and slidable in the tracks between first and second positions within the opening in response to actuation of the drive assembly, wherein each of the slats include inner and outer surfaces, the slats stacked onto one another in a stowed configuration, wherein all of the outer surfaces face one direction, and all of the inner surface face another direction opposite the one direction, wherein the multiple slats includes first and second slats, the first slat above and adjacent to the second slat in the stowed configuration, the first slat in a horizontally overlapping orientation with the second slat in a first position, and the first slat in a horizontally planar and interlocked orientation with the second slat in a second position;

a follower supporting the slats; and a spring-biased pulley system having a cable configured to cooperate with the follower and bias the slats toward the tracks;

deploying the slats and decreasing a cable tension in the cable when the first and second slats transition from the first position to the second position; and stowing the slats increasing the cable tension when the first and second slats transition from the second position to the first position.

17. The method of claim 16, comprising a step of biasing the follower upward toward the tracks with a leaf spring.

18. The method of claim 16, wherein the pulley system includes a torsion spring providing the cable tension.

19. The method of claim 16, comprising a step of energizing an electric motor to rotationally drive a shaft, the deploying and stowing steps performed in response to the energizing step.

20. The method of claim 16, comprising the step of deploying the slats and increasing the cable tension prior to the first and second slats transitioning from the first position to the second position.

* * * * *